(12) United States Patent
Ross et al.

(10) Patent No.: US 12,130,908 B2
(45) Date of Patent: Oct. 29, 2024

(54) PROGRESSIVE TRIGGER DATA AND DETECTION MODEL

(71) Applicant: Forcepoint, LLC, Austin, TX (US)

(72) Inventors: Alan Ross, Boston, MA (US); Tobias Johnathon Ryan, Brookline, NH (US)

(73) Assignee: Forcepoint LLC, Austin, TX (US)

( * ) Notice: Subject to any disclaimer, the term of this patent is extended or adjusted under 35 U.S.C. 154(b) by 218 days.

(21) Appl. No.: 16/864,471

(22) Filed: May 1, 2020

(65) Prior Publication Data

US 2021/0342441 A1     Nov. 4, 2021

(51) Int. Cl.
*G06F 21/55*      (2013.01)
*G06F 21/57*      (2013.01)

(52) U.S. Cl.
CPC .......... *G06F 21/552* (2013.01); *G06F 21/577* (2013.01); *G06F 2221/034* (2013.01)

(58) Field of Classification Search
CPC ................ G06F 21/552; G06F 21/577; G06F 2221/034; G06F 21/316; G06F 21/554; H04L 63/1408; H04L 63/14; H04L 63/1441; H04L 63/1433; H04L 63/1416; H04L 63/145; H04L 63/1425
See application file for complete search history.

(56) References Cited

U.S. PATENT DOCUMENTS

| | | | |
|---|---|---|---|
| 6,072,875 A | 6/2000 | Tsudik | |
| 6,678,693 B1 | 1/2004 | Shiraishi | |
| 7,107,447 B2 | 9/2006 | Sanin et al. | |
| 7,694,150 B1 | 4/2010 | Kirby | |
| 7,725,565 B2 | 5/2010 | Li et al. | |
| 7,813,944 B1 | 10/2010 | Luk et al. | |
| 7,933,960 B2 | 4/2011 | Chen et al. | |
| 8,181,253 B1 | 5/2012 | Zaitsev et al. | |
| 8,312,064 B1 | 11/2012 | Gauvin | |
| 8,424,061 B2 | 4/2013 | Rosenoer | |
| 8,484,066 B2 | 7/2013 | Miller et al. | |
| 8,490,163 B1 | 7/2013 | Harsell et al. | |
| 8,713,633 B2 | 4/2014 | Thomas | |
| 8,776,168 B1 | 7/2014 | Gibson et al. | |

(Continued)

FOREIGN PATENT DOCUMENTS

| CN | 105516127 A | * | 4/2016 |
|---|---|---|---|
| WO | 2019153581 A1 | | 8/2019 |

OTHER PUBLICATIONS

Translation of CN-105516127-A (Year: 2016).*

(Continued)

*Primary Examiner* — David Garcia Cervetti
(74) *Attorney, Agent, or Firm* — Terrile, Cannatti & Chambers, LLP; Emmanuel A. Rivera

(57) ABSTRACT

A system, method, and computer-readable medium are disclosed for detecting malicious entity behavior and providing accurate indicator of behaviors indicating occurrence of malicious behavior. Data input as to the entity behavior is received and monitored from different sources. The entity behavior is monitored over time at time periods. Detection probability is determined at each time period, where the detection probability relates to malicious behavior and increases over time. A trigger indicator of behavior is provided if the detection probability reaches a threshold value.

20 Claims, 28 Drawing Sheets

(56) References Cited

U.S. PATENT DOCUMENTS

| | | | |
|---|---|---|---|
| 8,806,646 B1 * | 8/2014 | Daswani | G06F 21/566 |
| | | | 713/168 |
| 8,806,647 B1 * | 8/2014 | Daswani | G06V 40/11 |
| | | | 713/168 |
| 8,826,443 B1 | 9/2014 | Raman et al. | |
| 8,892,690 B2 | 11/2014 | Liu et al. | |
| 8,990,930 B2 | 3/2015 | Burrell et al. | |
| 9,015,812 B2 | 4/2015 | Plattner et al. | |
| 9,015,847 B1 | 4/2015 | Kaplan et al. | |
| 9,043,329 B1 * | 5/2015 | Patton | G06F 16/951 |
| | | | 707/740 |
| 9,043,905 B1 | 5/2015 | Allen et al. | |
| 9,053,124 B1 | 6/2015 | Dornquast et al. | |
| 9,128,995 B1 | 9/2015 | Fletcher et al. | |
| 9,137,318 B2 | 9/2015 | Hong | |
| 9,141,795 B2 * | 9/2015 | Satish | G06F 21/56 |
| 9,166,999 B1 | 10/2015 | Kulkarni et al. | |
| 9,223,972 B1 | 12/2015 | Vincent et al. | |
| 9,246,941 B1 | 1/2016 | Gibson et al. | |
| 9,262,722 B1 | 2/2016 | Daniel | |
| 9,298,726 B1 | 3/2016 | Mondal et al. | |
| 9,342,553 B1 | 5/2016 | Fuller | |
| 9,369,433 B1 | 6/2016 | Paul et al. | |
| 9,407,652 B1 * | 8/2016 | Kesin | H04L 67/535 |
| 9,430,646 B1 * | 8/2016 | Mushtaq | H04L 67/02 |
| 9,485,266 B2 | 11/2016 | Baxley et al. | |
| 9,542,650 B2 | 1/2017 | Lospinoso et al. | |
| 9,596,146 B2 | 3/2017 | Coates et al. | |
| 9,607,144 B1 * | 3/2017 | Bird | H04L 63/1408 |
| 9,609,010 B2 * | 3/2017 | Sipple | H04L 63/1425 |
| 9,641,544 B1 * | 5/2017 | Treat | H04L 43/04 |
| 9,665,854 B1 | 5/2017 | Burger et al. | |
| 9,692,762 B2 | 6/2017 | Barkan et al. | |
| 9,755,913 B2 | 9/2017 | Bhide et al. | |
| 9,762,582 B1 | 9/2017 | Hockings et al. | |
| 9,798,883 B1 | 10/2017 | Gil et al. | |
| 9,935,891 B1 | 4/2018 | Stamos | |
| 9,977,824 B2 | 5/2018 | Agarwal et al. | |
| 10,096,065 B2 | 10/2018 | Little | |
| 10,108,544 B1 | 10/2018 | Duggal et al. | |
| 10,187,369 B2 | 1/2019 | Caldera et al. | |
| 10,210,283 B2 | 2/2019 | Broz et al. | |
| 10,230,740 B2 * | 3/2019 | Beatty | H04L 67/10 |
| 10,235,285 B1 | 3/2019 | Wallace | |
| 10,237,298 B1 | 3/2019 | Nguyen et al. | |
| 10,270,794 B1 | 4/2019 | Mukerji et al. | |
| 10,275,671 B1 | 4/2019 | Newman | |
| 10,282,702 B2 | 5/2019 | Paltenghe et al. | |
| 10,284,601 B1 | 5/2019 | Bar-Menachem et al. | |
| 10,320,813 B1 | 6/2019 | Ahmed et al. | |
| 10,341,391 B1 | 7/2019 | Pandey et al. | |
| 10,417,454 B1 | 9/2019 | Marom et al. | |
| 10,417,653 B2 | 9/2019 | Milton et al. | |
| 10,419,428 B2 | 9/2019 | Tunnell et al. | |
| 10,432,669 B1 | 10/2019 | Badhwar et al. | |
| 10,474,813 B1 * | 11/2019 | Ismael | G06F 21/54 |
| 10,545,738 B1 | 1/2020 | Jaeger et al. | |
| 10,579,281 B2 | 3/2020 | Cherubini et al. | |
| 10,701,093 B2 * | 6/2020 | Dean | H04L 63/1425 |
| 10,713,934 B2 | 7/2020 | Sayavong et al. | |
| 10,728,262 B1 * | 7/2020 | Vaswani | G06F 21/62 |
| 10,728,264 B2 * | 7/2020 | Bhatt | H04L 63/1433 |
| 10,754,946 B1 * | 8/2020 | Gribelyuk | G06N 20/00 |
| 10,769,908 B1 | 9/2020 | Burris et al. | |
| 10,841,338 B1 * | 11/2020 | Lin | H04L 63/20 |
| 10,878,428 B1 * | 12/2020 | Comeaux | G06Q 30/0185 |
| 10,917,319 B2 | 2/2021 | Scheib et al. | |
| 11,061,874 B1 | 7/2021 | Funk et al. | |
| 11,178,168 B1 * | 11/2021 | Lin | H04L 63/1433 |
| 11,227,047 B1 * | 1/2022 | Vashisht | G06F 21/56 |
| 11,244,044 B1 * | 2/2022 | Malik | H04W 12/128 |
| 11,386,343 B2 * | 7/2022 | Dodson | G06N 7/01 |
| 2002/0112015 A1 | 8/2002 | Haynes | |
| 2002/0123865 A1 | 9/2002 | Whitney et al. | |
| 2003/0115485 A1 * | 6/2003 | Milliken | H04L 51/212 |
| | | | 726/24 |
| 2004/0034582 A1 | 2/2004 | Gilliam et al. | |
| 2004/0044613 A1 | 3/2004 | Murakami et al. | |
| 2005/0120025 A1 | 6/2005 | Rodriguez et al. | |
| 2005/0198099 A1 | 9/2005 | Motsinger et al. | |
| 2005/0273850 A1 | 12/2005 | Freund | |
| 2006/0048209 A1 | 3/2006 | Shelest et al. | |
| 2006/0053476 A1 | 3/2006 | Bezilla et al. | |
| 2006/0112111 A1 | 5/2006 | Tseng et al. | |
| 2006/0117172 A1 | 6/2006 | Zhang et al. | |
| 2006/0129382 A1 | 6/2006 | Anand et al. | |
| 2006/0195905 A1 | 8/2006 | Fudge | |
| 2006/0206449 A1 | 9/2006 | Fletcher et al. | |
| 2006/0225124 A1 | 10/2006 | Kolawa et al. | |
| 2007/0043703 A1 | 2/2007 | Bhattacharya et al. | |
| 2007/0121522 A1 | 5/2007 | Carter | |
| 2007/0225995 A1 | 9/2007 | Moore | |
| 2007/0234409 A1 | 10/2007 | Eisen | |
| 2007/0245420 A1 * | 10/2007 | Yong | H04L 43/00 |
| | | | 726/23 |
| 2008/0126318 A1 * | 5/2008 | Frankovitz | H04L 43/00 |
| | | | 709/224 |
| 2008/0168002 A1 | 7/2008 | Kagarlis et al. | |
| 2008/0168135 A1 | 7/2008 | Redlich et al. | |
| 2008/0168453 A1 | 7/2008 | Hutson et al. | |
| 2008/0198453 A1 | 8/2008 | LaFontaine et al. | |
| 2008/0244741 A1 | 10/2008 | Gustafson et al. | |
| 2009/0006888 A1 | 1/2009 | Bernhard et al. | |
| 2009/0177979 A1 | 7/2009 | Garbow et al. | |
| 2009/0182872 A1 | 7/2009 | Hong | |
| 2009/0195401 A1 * | 8/2009 | Maroney | G06V 20/52 |
| | | | 340/686.6 |
| 2009/0228474 A1 | 9/2009 | Chiu et al. | |
| 2009/0300712 A1 | 12/2009 | Kaufmann et al. | |
| 2010/0024014 A1 | 1/2010 | Kailash et al. | |
| 2010/0057662 A1 | 3/2010 | Collier et al. | |
| 2010/0058016 A1 | 3/2010 | Nikara et al. | |
| 2010/0094767 A1 | 4/2010 | Miltonberger | |
| 2010/0094818 A1 | 4/2010 | Farrell et al. | |
| 2010/0107255 A1 | 4/2010 | Eiland et al. | |
| 2010/0115621 A1 * | 5/2010 | Staniford | H04L 63/1416 |
| | | | 726/25 |
| 2010/0146622 A1 | 6/2010 | Nordstrom et al. | |
| 2010/0205224 A1 | 8/2010 | Palanisamy et al. | |
| 2010/0228656 A1 | 9/2010 | Wasserblat et al. | |
| 2010/0235495 A1 | 9/2010 | Petersen et al. | |
| 2010/0268747 A1 * | 10/2010 | Kern | H04L 67/1095 |
| | | | 707/E17.032 |
| 2010/0275263 A1 | 10/2010 | Bennett et al. | |
| 2011/0061093 A1 | 3/2011 | Korkus et al. | |
| 2011/0167105 A1 | 7/2011 | Ramakrishnan et al. | |
| 2011/0185401 A1 * | 7/2011 | Bak | G06F 16/9024 |
| | | | 726/5 |
| 2011/0288692 A1 * | 11/2011 | Scott | H04L 63/20 |
| | | | 700/297 |
| 2011/0302656 A1 * | 12/2011 | El-Moussa | H04L 63/1416 |
| | | | 726/24 |
| 2011/0307403 A1 * | 12/2011 | Rostampour | G06Q 50/265 |
| | | | 705/325 |
| 2011/0307957 A1 | 12/2011 | Barcelo et al. | |
| 2012/0046989 A1 | 2/2012 | Baikalov et al. | |
| 2012/0047575 A1 | 2/2012 | Baikalov et al. | |
| 2012/0079107 A1 | 3/2012 | Williams et al. | |
| 2012/0110087 A1 | 5/2012 | Culver et al. | |
| 2012/0137367 A1 | 5/2012 | Dupont et al. | |
| 2012/0210158 A1 | 8/2012 | Akiyama et al. | |
| 2012/0259807 A1 | 10/2012 | Dymetman | |
| 2012/0290215 A1 | 11/2012 | Adler et al. | |
| 2013/0013550 A1 | 1/2013 | Kerby | |
| 2013/0054433 A1 | 2/2013 | Giard et al. | |
| 2013/0055367 A1 | 2/2013 | Kshirsagar et al. | |
| 2013/0081141 A1 | 3/2013 | Anurag | |
| 2013/0097662 A1 | 4/2013 | Pearcy et al. | |
| 2013/0102283 A1 | 4/2013 | Au et al. | |
| 2013/0104236 A1 | 4/2013 | Ray et al. | |
| 2013/0132551 A1 | 5/2013 | Bose et al. | |
| 2013/0174259 A1 | 7/2013 | Pearcy et al. | |

(56) References Cited

U.S. PATENT DOCUMENTS

| | | |
|---|---|---|
| 2013/0205366 A1 | 8/2013 | Luna et al. |
| 2013/0238422 A1 | 9/2013 | Saldanha |
| 2013/0290598 A1 | 10/2013 | Fiske et al. |
| 2013/0297729 A1 | 11/2013 | Suni et al. |
| 2013/0305357 A1* | 11/2013 | Ayyagari ............. H04L 41/069 726/22 |
| 2013/0305358 A1 | 11/2013 | Gathala et al. |
| 2013/0317808 A1 | 11/2013 | Kruel et al. |
| 2013/0320212 A1 | 12/2013 | Valentino et al. |
| 2013/0335219 A1* | 12/2013 | Malkowski ........ G08B 13/2491 340/539.22 |
| 2013/0340035 A1 | 12/2013 | Uziel et al. |
| 2014/0007238 A1* | 1/2014 | Magee ................. G06F 21/577 726/24 |
| 2014/0075004 A1 | 3/2014 | Van Dusen et al. |
| 2014/0096215 A1 | 4/2014 | Hessler |
| 2014/0165207 A1* | 6/2014 | Engel .................. G06F 21/566 726/25 |
| 2014/0173727 A1 | 6/2014 | Lingafelt et al. |
| 2014/0199663 A1 | 7/2014 | Sadeh-Koniecpol et al. |
| 2014/0205099 A1 | 7/2014 | Christodorescu et al. |
| 2014/0214938 A1 | 7/2014 | Bhatt et al. |
| 2014/0283075 A1 | 9/2014 | Drissel et al. |
| 2014/0325634 A1 | 10/2014 | Tekel-Johnson et al. |
| 2014/0356445 A1 | 12/2014 | Little |
| 2015/0067835 A1* | 3/2015 | Chari ................... G06F 21/50 726/22 |
| 2015/0082430 A1 | 3/2015 | Sridhara et al. |
| 2015/0101047 A1* | 4/2015 | Sridhara ............. H04L 63/145 726/23 |
| 2015/0101048 A1* | 4/2015 | Sridhara ................ G06F 21/55 726/23 |
| 2015/0113646 A1 | 4/2015 | Lee et al. |
| 2015/0154263 A1 | 6/2015 | Boddhu et al. |
| 2015/0161386 A1 | 6/2015 | Gupta et al. |
| 2015/0193631 A1* | 7/2015 | Adams .................. G06F 21/62 726/30 |
| 2015/0199511 A1 | 7/2015 | Faile, Jr. et al. |
| 2015/0199629 A1 | 7/2015 | Faile, Jr. et al. |
| 2015/0205954 A1 | 7/2015 | Jou et al. |
| 2015/0215325 A1 | 7/2015 | Ogawa |
| 2015/0220625 A1 | 8/2015 | Cartmell et al. |
| 2015/0220735 A1* | 8/2015 | Paithane ............. G06F 9/45558 726/23 |
| 2015/0256550 A1 | 9/2015 | Taylor et al. |
| 2015/0269383 A1 | 9/2015 | Lang et al. |
| 2015/0286819 A1* | 10/2015 | Coden ................ H04L 63/1425 726/23 |
| 2015/0288709 A1 | 10/2015 | Singhal et al. |
| 2015/0324559 A1 | 11/2015 | Boss et al. |
| 2015/0324563 A1 | 11/2015 | Deutschmann et al. |
| 2015/0326613 A1 | 11/2015 | Devarajan et al. |
| 2015/0350902 A1 | 12/2015 | Baxley et al. |
| 2015/0356488 A1 | 12/2015 | Eden et al. |
| 2016/0021117 A1 | 1/2016 | Harmon et al. |
| 2016/0028752 A1* | 1/2016 | Di Pietro ........... H04L 63/1416 726/23 |
| 2016/0036844 A1 | 2/2016 | Kopp et al. |
| 2016/0078362 A1 | 3/2016 | Christodorescu et al. |
| 2016/0092475 A1* | 3/2016 | Stojanovic ......... G06F 16/9038 707/805 |
| 2016/0092774 A1 | 3/2016 | Wang et al. |
| 2016/0105334 A1 | 4/2016 | Boe et al. |
| 2016/0110551 A1* | 4/2016 | Fugate ................ G06F 21/552 726/25 |
| 2016/0117937 A1 | 4/2016 | Penders et al. |
| 2016/0147380 A1 | 5/2016 | Coates et al. |
| 2016/0164922 A1 | 6/2016 | Boss et al. |
| 2016/0217378 A1* | 7/2016 | Bellala ............... G05B 23/024 |
| 2016/0224803 A1 | 8/2016 | Frank et al. |
| 2016/0226737 A1* | 8/2016 | Boubez .............. H04L 41/0686 |
| 2016/0226914 A1 | 8/2016 | Doddy et al. |
| 2016/0232353 A1 | 8/2016 | Gupta et al. |
| 2016/0247158 A1 | 8/2016 | Kolotinsky |
| 2016/0261621 A1 | 9/2016 | Srivastava et al. |
| 2016/0277360 A1 | 9/2016 | Dwyier et al. |
| 2016/0277435 A1 | 9/2016 | Salajegheh et al. |
| 2016/0286244 A1 | 9/2016 | Chang et al. |
| 2016/0300049 A1 | 10/2016 | Guedalia et al. |
| 2016/0308890 A1 | 10/2016 | Weilbacher |
| 2016/0330219 A1 | 11/2016 | Hasan |
| 2016/0330746 A1 | 11/2016 | Mehrabanzad et al. |
| 2016/0335865 A1 | 11/2016 | Sayavong et al. |
| 2016/0371489 A1 | 12/2016 | Puri et al. |
| 2017/0032274 A1 | 2/2017 | Yu et al. |
| 2017/0053280 A1 | 2/2017 | Lishok et al. |
| 2017/0063888 A1 | 3/2017 | Muddu et al. |
| 2017/0070521 A1 | 3/2017 | Bailey et al. |
| 2017/0070523 A1* | 3/2017 | Bailey .................. H04L 67/535 |
| 2017/0099311 A1* | 4/2017 | Kesin .................. H04L 67/535 |
| 2017/0104790 A1 | 4/2017 | Meyers et al. |
| 2017/0116054 A1 | 4/2017 | Boddhu et al. |
| 2017/0147941 A1* | 5/2017 | Bauer .................. G06N 20/10 |
| 2017/0155669 A1 | 6/2017 | Sudo et al. |
| 2017/0161963 A1* | 6/2017 | Green .................. G07C 5/004 |
| 2017/0171609 A1 | 6/2017 | Koh |
| 2017/0180418 A1* | 6/2017 | Shen ................... H04L 63/1466 |
| 2017/0213025 A1* | 7/2017 | Srivastav ............. G06F 21/552 |
| 2017/0220801 A1* | 8/2017 | Stockdale ............ G06F 21/552 |
| 2017/0230391 A1* | 8/2017 | Ferguson ................ G06N 7/01 |
| 2017/0230418 A1 | 8/2017 | Amar et al. |
| 2017/0251012 A1* | 8/2017 | Stockdale ............... H04L 63/10 |
| 2017/0255938 A1 | 9/2017 | Biegun et al. |
| 2017/0279616 A1 | 9/2017 | Loeb et al. |
| 2017/0279830 A1* | 9/2017 | Mermoud ............ A61M 15/009 |
| 2017/0286671 A1 | 10/2017 | Chari et al. |
| 2017/0331828 A1 | 11/2017 | Caldera et al. |
| 2017/0149815 A1 | 12/2017 | Bolgert |
| 2018/0004948 A1 | 1/2018 | Martin et al. |
| 2018/0007069 A1 | 1/2018 | Hunt et al. |
| 2018/0018456 A1 | 1/2018 | Chen et al. |
| 2018/0024901 A1 | 1/2018 | Tankersley et al. |
| 2018/0025273 A1 | 1/2018 | Jordan et al. |
| 2018/0027006 A1 | 1/2018 | Zimmermann et al. |
| 2018/0081661 A1 | 3/2018 | Gonzalez del Solar et al. |
| 2018/0082307 A1 | 3/2018 | Ochs et al. |
| 2018/0091520 A1 | 3/2018 | Camenisch et al. |
| 2018/0107528 A1 | 4/2018 | Vizer et al. |
| 2018/0121514 A1 | 5/2018 | Reisz et al. |
| 2018/0124073 A1* | 5/2018 | Scherman ............ H04L 63/1491 |
| 2018/0139227 A1 | 5/2018 | Martin et al. |
| 2018/0145995 A1 | 5/2018 | Roeh et al. |
| 2018/0150570 A1 | 5/2018 | Broyd et al. |
| 2018/0189670 A1* | 7/2018 | Wu ....................... H04L 41/149 |
| 2018/0191745 A1 | 7/2018 | Moradi et al. |
| 2018/0191766 A1 | 7/2018 | Holeman et al. |
| 2018/0191857 A1 | 7/2018 | Schooler et al. |
| 2018/0198811 A1* | 7/2018 | Bartos .................. H04L 63/302 |
| 2018/0204215 A1 | 7/2018 | Hu et al. |
| 2018/0212984 A1* | 7/2018 | Kapadia .............. H04L 63/1425 |
| 2018/0232111 A1 | 8/2018 | Jones et al. |
| 2018/0232426 A1 | 8/2018 | Gomez et al. |
| 2018/0234434 A1* | 8/2018 | Viljoen ................. G06F 21/554 |
| 2018/0241761 A1* | 8/2018 | Bania .................. H04L 63/1425 |
| 2018/0248863 A1 | 8/2018 | Kao et al. |
| 2018/0248902 A1* | 8/2018 | Dănilă-Dumitrescu ................ H04L 67/535 |
| 2018/0276541 A1 | 9/2018 | Studnitzer et al. |
| 2018/0284758 A1* | 10/2018 | Cella ....................... H04L 1/18 |
| 2018/0285363 A1 | 10/2018 | Dennis et al. |
| 2018/0288063 A1 | 10/2018 | Koottayi et al. |
| 2018/0295141 A1 | 10/2018 | Solotorevsky |
| 2018/0307943 A1* | 10/2018 | Savkli ................. G06F 18/2321 |
| 2018/0314684 A1* | 11/2018 | Johnson, Jr. ........ G06Q 10/1053 |
| 2018/0332062 A1 | 11/2018 | Ford |
| 2018/0336353 A1 | 11/2018 | Manadhata et al. |
| 2018/0341758 A1 | 11/2018 | Park et al. |
| 2018/0341889 A1 | 11/2018 | Psalmonds et al. |
| 2018/0349221 A1 | 12/2018 | Harutyunyan et al. |
| 2018/0349684 A1 | 12/2018 | Bapat et al. |
| 2019/0014153 A1 | 1/2019 | Lang et al. |
| 2019/0034625 A1 | 1/2019 | Ford et al. |
| 2019/0034813 A1 | 1/2019 | Das et al. |

(56) References Cited

U.S. PATENT DOCUMENTS

| | | | |
|---|---|---|---|
| 2019/0036946 A1* | 1/2019 | Ruvio | H04W 12/10 |
| 2019/0036969 A1 | 1/2019 | Swafford et al. | |
| 2019/0052660 A1 | 2/2019 | Cassidy et al. | |
| 2019/0081967 A1* | 3/2019 | Balabine | H04L 63/1425 |
| 2019/0095478 A1 | 3/2019 | Tankersley et al. | |
| 2019/0108330 A1* | 4/2019 | Sikder | G06F 21/44 |
| 2019/0121976 A1* | 4/2019 | Pavlyushchik | G06F 21/554 |
| 2019/0158503 A1 | 5/2019 | Bansal et al. | |
| 2019/0174319 A1 | 6/2019 | Backholm et al. | |
| 2019/0222603 A1 | 7/2019 | Yang | |
| 2019/0260780 A1* | 8/2019 | Dunn | H04L 63/1416 |
| 2019/0260804 A1* | 8/2019 | Beck | H04L 41/22 |
| 2019/0289021 A1 | 9/2019 | Ford | |
| 2019/0294482 A1 | 9/2019 | Li et al. | |
| 2019/0311105 A1 | 10/2019 | Beiter et al. | |
| 2019/0334923 A1* | 10/2019 | Most | H04L 63/1425 |
| 2019/0354703 A1 | 11/2019 | Ford | |
| 2019/0356688 A1 | 11/2019 | Ford | |
| 2019/0356699 A1 | 11/2019 | Ford | |
| 2019/0387002 A1 | 12/2019 | Ford et al. | |
| 2019/0387003 A1 | 12/2019 | Ford et al. | |
| 2019/0392419 A1 | 12/2019 | DeLuca et al. | |
| 2020/0034462 A1 | 1/2020 | Narayanaswamy et al. | |
| 2020/0036740 A1 | 1/2020 | Ford | |
| 2020/0065728 A1 | 2/2020 | Wilson et al. | |
| 2020/0077265 A1 | 3/2020 | Singh et al. | |
| 2020/0089692 A1 | 3/2020 | Tripathi et al. | |
| 2020/0117546 A1 | 4/2020 | Wong et al. | |
| 2020/0143053 A1* | 5/2020 | Gutierrez | G06F 21/554 |
| 2020/0160384 A1* | 5/2020 | Duncan | G06Q 30/0205 |
| 2020/0202115 A1* | 6/2020 | Kindaichi | B64C 39/024 |
| 2020/0334025 A1 | 10/2020 | Wang et al. | |
| 2020/0334498 A1* | 10/2020 | Pan | G06F 17/15 |
| 2020/0356665 A1* | 11/2020 | Denney | G06N 7/01 |
| 2020/0358819 A1* | 11/2020 | Bowditch | G06F 17/18 |
| 2020/0374298 A1* | 11/2020 | Sirianni | G06N 3/04 |
| 2021/0081530 A1* | 3/2021 | O'Farrell | G06F 21/554 |
| 2021/0118078 A1* | 4/2021 | Wang | G06V 10/82 |
| 2021/0168161 A1* | 6/2021 | Dunn | H04L 63/1441 |
| 2021/0185057 A1* | 6/2021 | McLean | H04L 63/1416 |
| 2021/0273973 A1* | 9/2021 | Boyer | H04L 63/1416 |
| 2021/0326436 A1* | 10/2021 | West | G06F 21/567 |
| 2022/0014533 A1* | 1/2022 | Almaz | H04L 63/1425 |
| 2022/0035927 A1* | 2/2022 | Lysecky | G06F 21/566 |
| 2022/0222355 A1* | 7/2022 | Marty | G06N 5/04 |
| 2023/0007042 A1* | 1/2023 | Haworth | H04L 63/205 |
| 2024/0089278 A1* | 3/2024 | Claireaux | G06F 21/552 |

OTHER PUBLICATIONS

S. Chambi et al., Better bitmap performance with Roaring bitmaps, arXiv:1402.6407v10 [cs.DB] (Mar. 15, 2016).

Jianguo Wang et al., An Experimental Study of Bitmap Compression vs. Inverted List Compression, SIGMOD 2017: Proceedings of the 2017 ACM Int'l Conf. on Management of Data, pp. 993-1008 (May 2017).

L. F. Lafuerza et al., Exact Solution of a Stochastic Protein Dynamics Model with Delayed Degradation, Phys. Rev. E 84, 051121, Nov. 18, 2011, pp. 1-8.

Zoubin Ghahramani, Bayesian nonparametrics and the probabilistic approach to modelling, Philosophical Transactions A of the Royal Society, vol. 371 Issue: 1984, Published Dec. 31, 2012, pp. 1-20.

Elena Zheleva et al., Higher-order Graphical Models for Classification in Social and Affiliation Networks, NIPS 2010 Workshop on Networks Across Disciplines: Theory and Applications, Whistler BC, Canada, 2010, pp. 1-7.

Varun Chandola et al., Anomaly Detection: A Survey, ACM Computing Surveys, vol. 41, No. 3, Article 15, Jul. 2009, pp. 15.1-58.1.

Judea Pearl, The Causal Foundations of Structural Equation Modeling, Technical Report R-370, Computer Science Department, University of California, Los Angeles, also Chapter 5, R. H. Hoyle (Ed.), Handbook of Structural Equation Modeling, New York, Guilford Press, Jun. 4, 2012, pp. 68-91.

Yueh-Hsuan Chiang, Towards Large-Scale Temporal Entity Matching, Dissertation Abstract, University of Wisconsin-Madison, 2013.

Furong Li, Linking Temporal Records for Profiling Entities, 2015, SIGMOD '15 Proceedings of the 2015 Acm Sigmod International Conference on Management of Data, pp. 593-605, https://users.soe.ucsc.edu/~tan/papers/2015/modf445-li.pdf.

Peter Christen et al., Adaptive Temporal Entity Resolution on Dynamic Databases, Apr. 2013, http://users.cecs.anu.edu.au/~Peter.Christen/publications/christen2013pakdd-slides.pdf.

Wikipedia, Categorical Distribution, edited Jul. 28, 2018, https://en.wikipedia.org/wiki/Categorical_distribution.

Wikipedia, One-Hot, edited May 22, 2018, https://en.wikipedia.org/wiki/One-hot.

Singh et al., Container-Based Microservice Architecture for Cloud Applications, International Conference on Computing, Communication and Automation (ICCCA2017), 2017.

Sean Barnum, Standardized Cyber Threat Intelligence Information with the Structured Threat Information expression (STIX) Whitepaper v1.1 (Feb. 20, 2014).

Xiang Sun et al., Event Detection in Social Media Data Streams, IEEE International Conference on Computer and Information Technology; Ubiquitous Computing and Communications; Dependable, Automatic and Secure Computing; Persuasive Intelligence and Computing, pp. 1711-1717, Dec. 2015.

Mesaros et al., Latent Semantic Analysis in Sound Event Detection, 19th European Signal Processing Conference (EUSIPCO 2011), pp. 1307-1311, 2011.

Crandall et al., Inferring Social Ties from Geographic Coincidences, PNAS, vol. 107, No. 52, 2010, pp. 22436-22441, 2010.

Ross et al., Bully Prevention in Positive Behavior Support, Journal of Applied Behavior Analysis, 42(4), pp. 747-759, 2009.

Matt Klein, How to Erase Your iOS Device After Too Many Failed Passcode Attempts, https://www.howtogeek.com/264369/how-to-erase-your-ios-device-after-too-many-failed-passcode-attempts/, Jul. 28, 2016.

Github, The Z3 Theorem Prover, retrieved from internet May 19, 2020, https://github.com/Z3Prover/z3.

John Backes et al., Semantic-based Automated Reasoning for AWS Access Policies using SMT, 2018 Formal Methods in Computer Aided Design (FMCAD), Oct. 30-Nov. 2, 2018 https://d1.awsstatic.com/Security/pdfs/Semantic_Based_Automated_Reasoning_for_AWS_Access_Policies_Using_SMT.pdf.

Sanjeev Goyal et al., Attack, Defence and Contagion in Networks, The Review of Economic Studies, vol. 81, Issue 4, Oct. 2014, pp. 1518-1542, https://doi.org/10.1093/restud/rdu013 (2014).

Barrere et al., Vulnerability Assessment in Autonomic Networks and Services: A Survey, IEEE, Aug. 30, 2013. vol. 16, issue. 2, pp. 988-1004.

Burns et al., Automatic Management of Network Security Policy, IEEE, Jun. 14, 2001, pp. 12-26.

Marinescu, Dan C., Cloud Computing and Computer Clouds, University of Central Florida, 2012, pp. 1-246.

* cited by examiner

PROGRESSIVE TRIGGER DATA AND DETECTION MODEL

BACKGROUND OF THE INVENTION

Field of the Invention

The present invention relates in general to the field of computers and similar technologies, and in particular to software utilized in this field. Still more particularly, it relates to a method, system and computer-usable medium for detecting entity behavior and triggering indicator of behaviors.

Description of the Related Art

Users interact with physical, system, data, and services resources of all kinds, as well as each other, on a daily basis. Each of these interactions, whether accidental or intended, poses some degree of security risk, depending on the behavior of the user. In particular, the actions of a formerly trusted user may become malicious as a result of being subverted, compromised or radicalized due to any number of internal or external factors or stressors. For example, financial pressure, political idealism, irrational thoughts, or other influences may adversely affect a user's intent and/or behavior.

Anomaly detection methods monitor behavior and actions of an entity, such as a user, for anomalies or potential security breaches. Indicator of behaviors are provided if such anomalies or breaches are detected. Oftentimes results of such solutions include many false positives. Such indicator of behavior based detection methods typically are one dimensional, univariate solutions lacking in context, correlation, and corroboration. Such methods can lack an underlying entity-centric data model, and use analytics based on raw data. Priority cannot be derived when there is no differentiation of indicator of behaviors, and arbitrary risk levels.

Anomaly detection and other statistical methods are often only executed against a single measurement, otherwise known as univariate time series, and that measurement is often the final act in a data exfiltration behavior pattern. Actual exfiltration actions are only a small part of the total behavioral detection opportunities, and only actual exfiltration actions are measured, distinguishing legitimate from malicious behavior becomes difficult.

SUMMARY OF THE INVENTION

In one embodiment the invention relates to a method for detecting entity behavior, comprising: receiving structured or unstructured raw data input from various sources related to actions of an entity; monitoring over time, the raw data input and associating the actions of the entity to particular time periods; determining a detection probability per each time period as to a triggering an indicator of behavior regarding a malicious activity, wherein the detection probability increases over time; and providing a trigger indicator of behavior if the detection probability reaches a threshold value.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: receiving structured or unstructured raw data input from various sources related to actions of an entity; monitoring over time, the raw data input and associating the actions of the entity to particular time periods; determining a detection probability per each time period as to a triggering an indicator of behavior regarding a malicious activity, wherein the detection probability increases over time; and providing a trigger indicator of behavior if the detection probability reaches a threshold value.

In another embodiment the invention relates to a computer-readable storage medium embodying computer program code, the computer program code comprising: receiving structured or unstructured raw data input from various sources related to actions of an entity; monitoring over time, the raw data input and associating the actions of the entity to particular time periods; determining a detection probability per each time period as to a triggering an indicator of behavior regarding a malicious activity, wherein the detection probability increases over time; and providing a trigger indicator of behavior if the detection probability reaches a threshold value.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
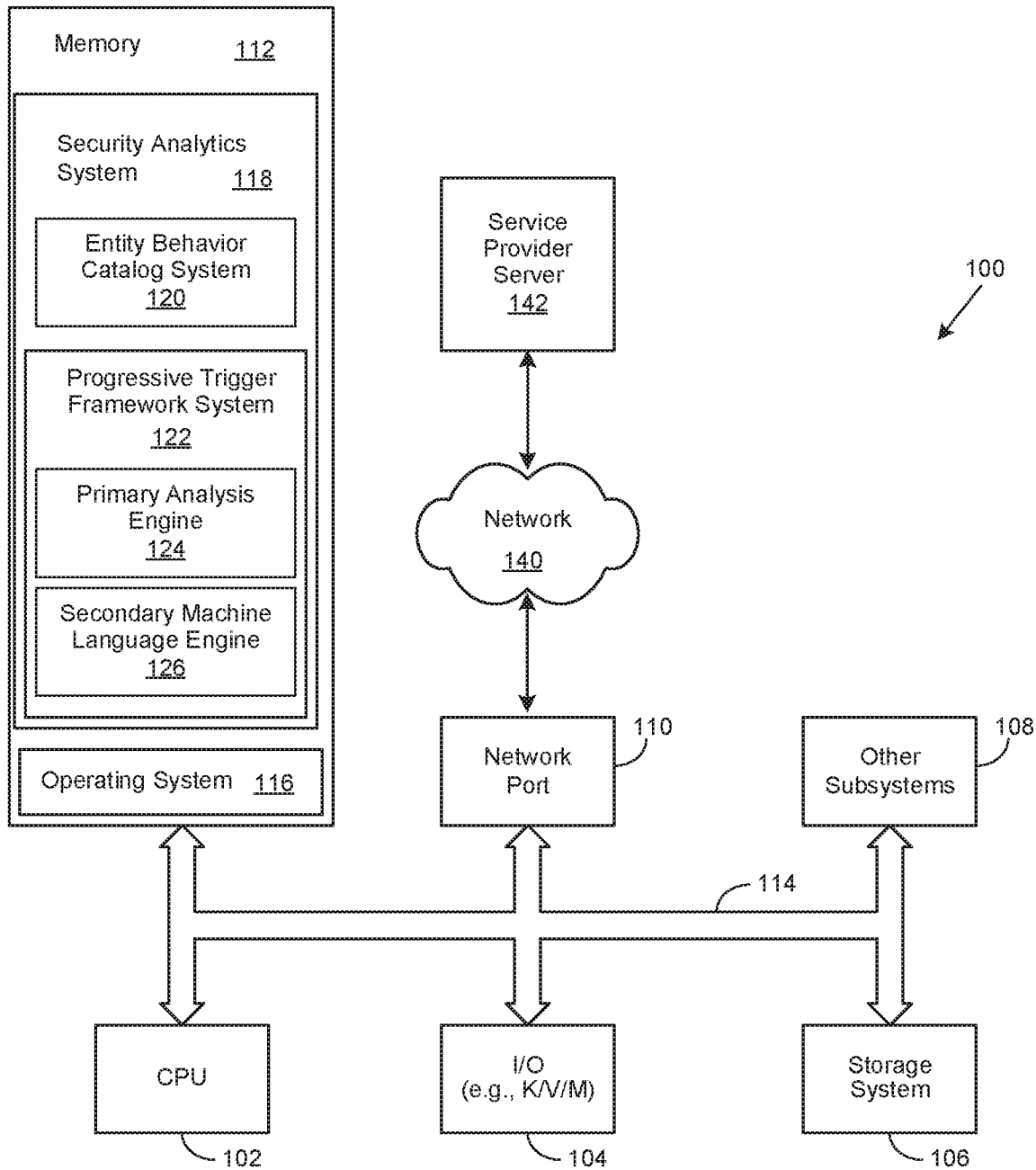
FIG. 1 depicts an exemplary client computer in which the present invention may be implemented.

A method, system and computer-usable medium are disclosed for detecting entity behavior and triggering indicator of behaviors. Certain aspects of the invention include an appreciation that the existence of any entity, whether it is an individual user, a group of users, an organization, a device, a system, a network, an account, a domain, an operation, a process, a software application, or a service, represents some degree of security risk.

Various aspects of the invention likewise include an appreciation that certain non-user entities, such as computing, communication, and surveillance devices can be a source for telemetry associated with certain events and entity behaviors. Likewise, various aspects of the invention include an appreciation that certain accounts may be global, spanning multiple devices, such as a domain-level account allowing an entity access to multiple systems. Certain aspects of the invention likewise include an appreciation that a particular account may be shared by multiple entities.

Accordingly, certain aspects of the invention include an appreciation that events or indicator of behaviors, by themselves, have a potential to be legitimate or malicious, and are often indistinguishable from noise; however, events or indicator of behaviors coupled in a pattern or probabilistically, a clearer picture is determined and more corroborated and provides more accurate indicator of behaviors.

In certain embodiments described herein, a four layer computational data model is implemented, incorporating raw data, summary data, observables, and detections. Raw data is considered as a selected set of unaltered data or filtered raw data that has been cleaned, transformed, and normalized into a Common Information Model (CIM). A CIM can include a "user name" which for example is includes field names such as "UserName", "user.name", "user_name=user", "logon_id", "username", etc. In certain implementations, the computational data model can include two requirements or pre-requisites, entities (i.e., users and devices) and the CIM. Cleaning refers to collecting only minimum necessary fields. Filtering refers to either whitelisting or excluded certain values. Transforming refers to changing field names to the CIM. Normalizing refers to making field values the same as designated by the CIM.

Summary data can be considered as the aggregation of log data that represents an entity's behavior over time. Summary data is a reduced set of raw data that is a more concise representation of behavior with a minimum quantity of key value (KV) pairs. Summary data can be used to create observables, displayed to an analyst, or used as inputs for machine learning (ML) algorithms. Summary data is derived from domain expertise or the understanding of what data is needed for eventual detections.

Observables are a set of events which can contain between "1" and "n" logs, or summary data that, by themselves, are generally not enough evidence of a malicious event to require a response, since observables can have a similar probability of being legitimate or malicious. In certain instances, a single strong observable can be enough for a detection. Patterns of observables create detections. Observables can be derived from individual logs or summary data based on domain expertise.

Detections are sets of observables that would require a response. If a detection is triggered, either an automated (i.e., dynamic) or response from an analyst is expected. A detection set can be from "1" to "n" observables. In certain implementations, detections are the smallest quantity in volume within a computational or progressive trigger framework as described herein.

The computational or progressive trigger framework provides for detection, where detection is defied for a high probability of a malicious behavior by an entity that requires a response. In certain implementations, detections can be place in a triaged order in a user interface. High probability is defined as a high risk context that exceeds a configured threshold. Risk context is a quantitative value plus a textual explanation. Computed quantitative value can be a numerical value determined by methods, and particularly methods for determining detection probability. Examples of such methods include contextual determination using simple mathematical aggregations with weighted factors and time/sequence triggers; Bayesian inference which is a numeric probability that a detection has occurred based on updated evidence (e.g., prior probability, likelihoods, hypothesis, evidence→posterior probability>detection threshold, etc.); Markov State which determines the probability of a detection given the current state of the observable set, etc. Furthermore, combinations of such methods and other decision theory algorithms can be implemented.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a storage system 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes operating system (OS) 116 and in various embodiments may also include a security analytics system 118. In one embodiment, the information handling system 100 is able to download the security analytics system 118 from the service provider server 142. In another embodiment, the security analytics system 118 is provided as a service from the service provider server 142.

In various embodiments, the security analytics system 118 performs a security analytics operation. In certain embodiments, the security analytics operation improves processor efficiency, and thus the efficiency of the information handling system 100, by facilitating security analytics functions. As will be appreciated, once the information handling system 100 is configured to perform the security analytics operation, the information handling system 100 becomes a specialized computing device specifically configured to perform the security analytics operation and is not a general purpose computing device. Moreover, the implementation of the security analytics system 118 on the information handling system 100 improves the functionality of the information handling system 100 and provides a useful and concrete result of performing security analytics functions to mitigate security risk.

In certain embodiments, the security analytics system 118 may be implemented to include an entity behavior catalog (EBC) system 120 as further described herein. Certain embodiments further provide for the security analytics system 118 include a computational or progressive trigger framework system 122. In certain embodiments, the progressive trigger framework system 122 is implemented to perform detecting entity behavior and triggering indicator of behaviors. In various embodiments, the progressive trigger framework system 122 provides for multivariate and multidimensional analytics, machine learning, high-value behavioral detections over time, and dynamic risk signals provided back to endpoint devices.

Certain embodiments provide for the progressive trigger framework system 122 to include a primary analysis engine 124. The primary analysis engine 124 can be configured to receive structured or unstructured data input (i.e., raw data) from various sources. In certain implementations, the data input (i.e., raw data) is from endpoint devices as described herein. Data received can be received from various sources, including social networks, network access, cloud access, etc. Furthermore, there can be agnostic feature as to where the data is received from. Receiving data from different sources, and agnostic as to the source of the data, can allow for more robust and high fidelity data to support the four layer computational data model.

In certain implementations, the primary analysis engine 124 perform various functions as to the received data, such as querying raw data and writing observables, querying raw data and writing summary data; querying summary data and writing observables; and querying observable, enrichment, and entity state to write detections. The primary analysis engine 124 can also be configured to send signals (dynamic risk signals) as to dynamic actions, dynamic data protection, dynamic user protection, etc. back to the data source (e.g., sending endpoint).

In certain implementations, processed data from the primary analysis engine 124 is communicated to a data stores, that can include storage system 106. Certain implementations provide for "1" to "n" data stores, summary data store, enrichment data store, observable and detection data store, entity state data store, non-entity data store, etc.

Certain embodiments provide for the progressive trigger framework system 122 to include a secondary machine language (ML) engine 126. In certain implementations, the secondary ML engine 126 queries summary data for feature vector values as further described herein. The secondary ML engine 126 further can train ML models offline, write observables form batch ML classification results, and forward ML models for online ML classification.

The progressive trigger framework system 122 further can be implemented to provide multivariate and multidimensional analytics and high value behavioral detections over time.

The following is an example of detecting entity behavior and triggering indicator of behaviors. The example involves an entity that is leaving a company. Typically, behaviors or actions of such an entity are legitimate and there is no cause to provide an indicator of behavior to the company. The entity or "leaver" may be looking at new job opportunities, which typically is of little or no concern to a company. In certain cases, there can be some malicious intent by the "leaver." Malicious behavior or actions of the "leaver" may include destroying or illegally taking data/information from the company. The methods and systems described herein are directed to minimizing "false" indicator of behaviors that can be associated with legitimate behavior; however, provide indicator of behaviors when illegitimate behavior is detected.

As discussed, an entity can either be a user or device associated with a user. In the described computational data model, an entity (e.g., user or device) and the common information are implemented. The incident response (i.e., alerting) concept of stacking data against an entity is implemented. The computational data model is used to create high-fidelity detections by stacking observables of entity to match both specified and probabilistic detection patterns.

In typical methods, observed behavior of an entity is taken over time, such as at periods $t_1$, $t_2$, $t_3$, $t_4$, $t_5$ to $t_n$. "Raw data" and "events" are monitored at each period. Examples of raw data can include user visits to an external job, applying for a job, sending resignation letter, etc. Events can include anomalous increase in visits to the job site, events with keyword matches to "jobs", "resignation", etc., events of user notifying human resources, etc. Typically, false or nuisance indicator of behaviors can be generated when such raw data and events occur at particular time periods. Such methods could require an additional action to determine if such indicator of behaviors are valid.

In the described progressive trigger approach, the example scenario implements monitoring of "raw data and summary data", "leaver/entity observables", and "other observables" at periods $t_1$, $t_2$, $t_3$, $t_4$, $t_5$ to $t_n$. For example, "raw data and summary data" at $t_1$ can be that "user's activities are normal." "Raw data and summary data" at $t_2$ can be that "user's summary data indicates an increase in job site activity." User activities indicating the user viewing of job site, and the "leaver/entity observable" is observed from a URL summarization of the job site. For example, at $t_3$ "raw data and summary data" can include "user views open jobs on the job site." User activities indicating the user is looking at jobs. A "leaver/entity observable" observed as a URL fuzzy match to the job site. Fuzzy matching may require knowledge of keywords, URL structure, and variations of the string field being matching for similarity. Progressively, this could mean near exact pattern matches for well-known sites or variables, or it could mean taking the URL structure of job sites, job applications, job viewing, resume posting, etc., and utilize deep learning to figure it out for us. This can be, progressively, a fairly simple analytic to a complex algorithm, depending on the use case.

Progression takes place by monitoring at successive time periods up to $t_n$. For example, eventually at $t_n$ "raw data and summary data" is "user leaves the company." At each time period $t_1$, $t_2$, $t_3$, $t_4$, $t_5$ to $t_n$, a "detection probability" is assigned indicating whether to provide a trigger or indicator of behavior. For example, 0% detection probability at $t_1$; $y_1$% detection probability at $t_2$; $y_2$% detection probability at $t_3$; $y_3$% detection probability at $t_4$; and $y_4$% detection probability at $t_5$; and $y_1$% detection probability at t. In this case, no trigger or detection (i.e., indicator of behavior, incident) is created; however, as time periods progress, the risk or detection probability can increase, such that a detection or trigger can be created.

The same leaver and data theft scenario is described in a different progression. The progression as described above takes place with the same monitored "raw data and summary data" and "leaver/entity observables" monitored at periods at periods $t_1$, $t_2$, $t_3$, $t_4$, $t_5$ to $t_n$. In the described progressive trigger approach, "other observables" are also monitored. At "raw data and summary data" at $t_5$ is "user sends resignation notice by email" indicating an activity that "user resigns from employment. The "leaver/entity observables" at $t_5$ is observed from an email scrape fuzzy or natural language match to "resignation letter". In this progression, at period $t_5$ the "other observables' is "user observed uploading data (company) to a USB drive for the first time." In most cases, such an observable may be routine and legitimate; however, in this case, taking into account that the entity has submitted a resignation letter and now is downloading company data, an indicator of behavior should be triggered. Detection probably $y_4$% at $t_5$ is increased. A detection should be triggered.

The same leaver and data theft scenario is described in a different progression. In this progression, "other observables" of the "user observed uploading data (company) to a USB drive" which may be "for the first time," is seen at time (period) before $t_5$. For example, this "other observables" taking place sometime between periods $t_2$ and $t_4$. Should an indicator of behavior be triggered? In certain implementations, a threshold can be set as to the detection probability at that point. As discussed, over time the detection probability ($y_n$) can increase. If the detection probability ($y_n$) reaches a set threshold value, an indicator of behavior can be triggered at a particular time. Therefore, if there are different "other observables" that could potentially trigger an indicator of behavior, a trigger point setting is determined based on a set threshold value for the detection probability ($y_n$).

In certain implementations, the detection probability ($y_n$) can be the result of one of many probabilistic techniques, such as a Bayesian belief network, Markov state, exact pattern match, etc. Furthermore, in certain implementations, a "state" can be indicated that the detection probability ($y_n$) relates to a higher risk, but a decision to trigger an indicator of behavior has not occurred.

Certain implementations provide for an endpoint device or the progressive trigger framework system 122 of the information handling system 100 to monitor "leaver/entity observables" and "other observables." Certain implementations provide for the trigger framework system 122 to determine detection probability ($y_n$).

In determining entity or user behavior, "summary data" of "raw data and summary data" can be representative over time and baselined to come up with "normal user" behavior. The use of specified behavior patterns can be implemented; however, if such behavior patterns are unknown, probabilistic behavior patterns can be implemented.

When components in probabilistic behavior patterns are unknown, phase stacking can be used. Phases can be defined as stages in a chain of data theft or data theft kill chain. For example, a data theft kill chain can include the following phases in order: initial access, execution, persistence, privilege escalation, defense evasion, credential access, discovery, lateral movement, collection, command & control, exfiltration and impact. In phase stacking, each phase is converted to a numerical value in a feature vector of predicators. For example, the feature vector is $X=[X_{initial}, X_{access}, X_{execution}, X_{persistence}, X_{privilege\ escalation}, X_{defense\ evasion}, X_{credential\ access}, X_{discovery}, X_{lateral\ movement}, X_{collection}, X_{command\ \&\ control}, X_{exfiltration}, X_{impact}]$. A weighting function can be used to populate the feature vector, where the values are between 0 and 1. An example can be $x=[0, 0, 0, 0, 0.8, 0.9, 0.5, 0, 0, 0.8, 0]$. The weighted vector can be used for inputs to predict a probability of an unspecified behavior pattern match.

Figure 2:
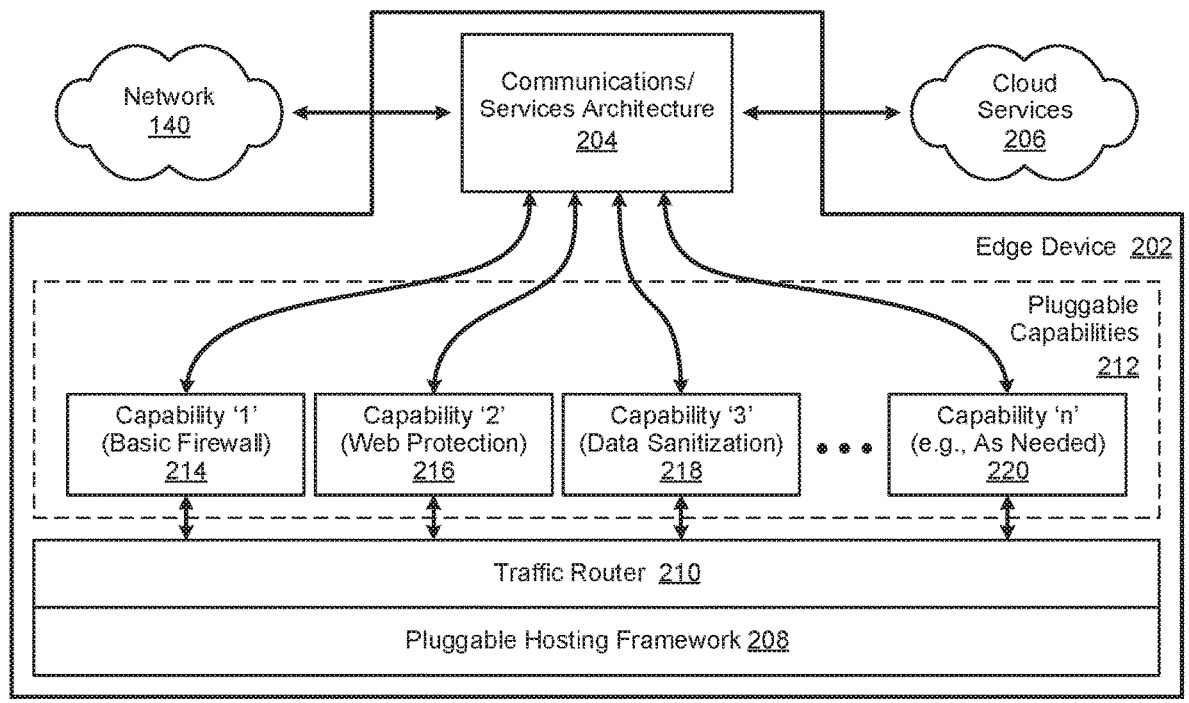
FIG. 2 is a simplified block diagram of an edge device.

FIG. 2 is a simplified block diagram of an edge device implemented in accordance with an embodiment of the invention. As used herein, an edge device, such as the edge device 202 shown in FIG. 2, broadly refers to a device providing an entry point into a network 140. Examples of such edge devices 202 may include routers, routing switches, integrated access devices (IADs), multiplexers, wide-area network (WAN) access devices, and network security appliances. In certain embodiments, the network 140 may be a private network (e.g., an enterprise network), a semi-public network (e.g., a service provider core network), or a public network (e.g., the Internet).

Skilled practitioners of the art will be aware that edge devices 202 are often implemented as routers that provide authenticated access to faster, more efficient backbone and core networks. Furthermore, current industry trends include making edge devices 202 more intelligent, which allows core devices to operate at higher speed as they are not burdened with additional administrative overhead. Accordingly, such edge devices 202 often include Quality of Service (QoS) and multi-service functions to manage different types of traffic. Consequently, it is common to design core networks with switches that use routing protocols such as Open Shortest Path First (OSPF) or Multiprotocol Label Switching (MPLS) for reliability and scalability. Such approaches allow edge devices 202 to have redundant links to the core network, which not only provides improved reliability, but enables enhanced, flexible, and scalable security capabilities as well.

In certain embodiments, the edge device 202 may be implemented to include a communications/services architecture 204, various pluggable capabilities 212, a traffic router 210, and a pluggable hosting framework 208. In certain embodiments, the communications/services architecture 202 may be implemented to provide access to and from various networks 140, cloud services 206, or a combination thereof. In certain embodiments, the cloud services 206 may be provided by a cloud infrastructure familiar to those of skill in the art. In certain embodiments, the edge device 202 may be implemented to provide support for a variety of generic services, such as directory integration, logging interfaces, update services, and bidirectional risk/context flows associated with various analytics. In certain embodiments, the edge device 202 may be implemented to provide temporal information, described in greater detail herein, associated with the provision of such services.

In certain embodiments, the edge device 202 may be implemented as a generic device configured to host various network communications, data processing, and security management capabilities. In certain embodiments, the pluggable hosting framework 208 may be implemented to host such capabilities in the form of pluggable capabilities 212. In certain embodiments, the pluggable capabilities 212 may include capability '1' 214 (e.g., basic firewall), capability '2' 216 (e.g., general web protection), capability '3' 218 (e.g., data sanitization), and so forth through capability 'n' 220, which may include capabilities needed for a particular operation, process, or requirement on an as-needed basis. In certain embodiments, such capabilities may include the performance of operations associated with managing an adaptive trust Profile (ATP), described in greater detail herein. In certain embodiments, such operations may include the provision of associated temporal information (e.g., time stamps).

In certain embodiments, the pluggable capabilities 212 may be sourced from various cloud services 206. In certain embodiments, the pluggable hosting framework 208 may be implemented to provide certain computing and communication infrastructure components, and foundation capabilities, required by one or more of the pluggable capabilities 212. In certain embodiments, the pluggable hosting framework 208 may be implemented to allow the pluggable capabilities 212 to be dynamically invoked. Skilled practitioners of the art will recognize that many such embodiments are possible. Accordingly, the foregoing is not intended to limit the spirit, scope or intent of the invention.

Figure 3:
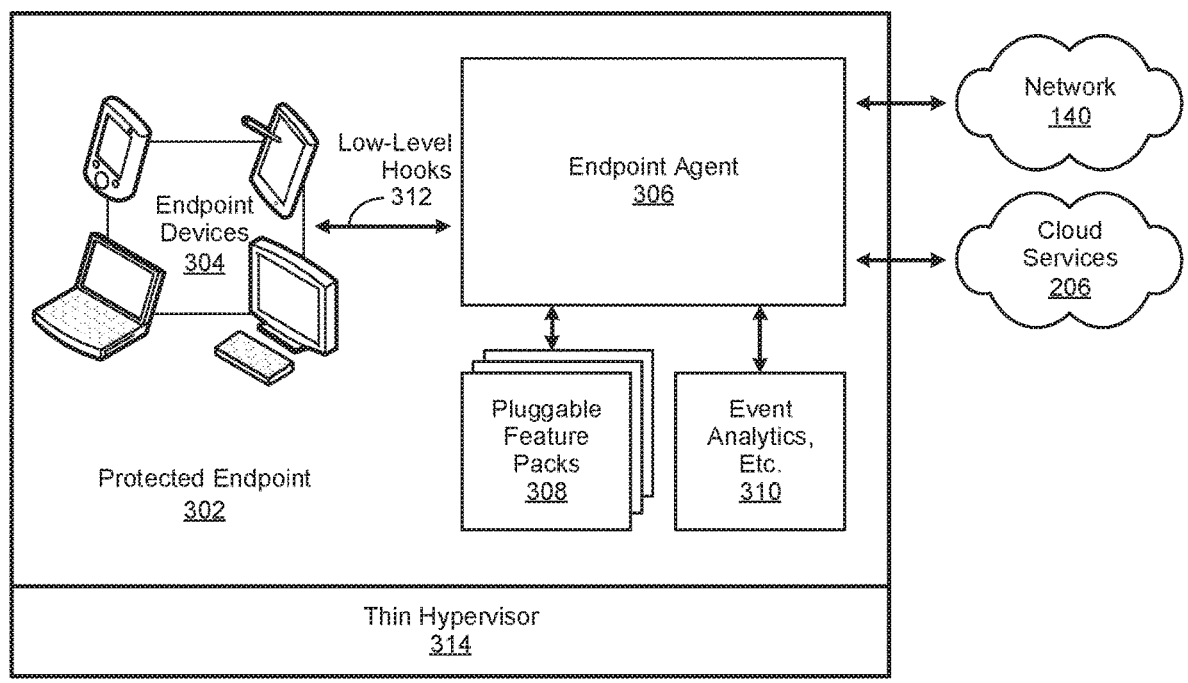
FIG. 3 is a simplified block diagram of an endpoint agent.

FIG. 3 is a simplified block diagram of an endpoint agent implemented in accordance with an embodiment of the invention. As used herein, an endpoint agent 306 broadly refers to a software agent used in combination with an endpoint device 304 to establish a protected endpoint 302. Skilled practitioners of the art will be familiar with software agents, which are computer programs that perform actions on behalf of a user or another program. In various approaches, a software agent may be autonomous or work together with another agent or a user. In certain of these approaches the software agent is implemented to autonomously decide if a particular action is appropriate for a given event, such as an observed entity behavior.

As implemented in detecting entity behavior and triggering indicator of behaviors, protected endpoint 302 provides for data ingest and forwarding; counters, rules, enrichment, and indicator of behaviors; endpoint-appropriate analytics; policy enforcement; and rich datasets.

An endpoint device 304, as likewise used herein, refers to an information processing system such as a personal computer, a laptop computer, a tablet computer, a personal digital assistant (PDA), a smart phone, a mobile telephone, a digital camera, a video camera, or other device capable of storing, processing and communicating data. In certain embodiments, the communication of the data may take place in real-time or near-real-time. As used herein, real-time broadly refers to processing and providing information within a time interval brief enough to not be discernable by a user. As an example, a cellular phone conversation may be used to communicate information in real-time, while an instant message (IM) exchange may be used to communicate information in near real-time. In certain embodiments, the communication of the information may take place asynchronously. For example, an email message may be stored on an endpoint device 304 when it is offline. In this example, the information may be communicated to its intended recipient once the endpoint device 304 gains access to a network 140.

A protected endpoint 302, as likewise used herein, broadly refers to a policy-based approach to network security that typically requires endpoint devices 304 to comply with certain criteria before they are granted access to network resources. As an example, a given endpoint device 304 may be required to have a particular operating system (OS), or version thereof, a Virtual Private Network (VPN) client, anti-virus software with current updates, and so forth. In certain embodiments, the protected endpoint 302 may be implemented to perform operations associated with providing real-time resolution of the identity of an entity at a particular point in time, as described in greater detail herein. In certain embodiments, the protected endpoint 302 may be implemented to provide temporal information, such as timestamp information, associated with such operations.

In certain embodiments, the real-time resolution of the identity of an entity at a particular point in time may be based upon contextual information associated with a given entity behavior. As used herein, contextual information broadly refers to any information, directly or indirectly, individually or in combination, related to a particular entity behavior. In certain embodiments, entity behavior may include an entity's physical behavior, cyber behavior, or a combination thereof. As likewise used herein, physical behavior broadly refers to any entity behavior occurring within a physical realm. More particularly, physical behavior may include any action enacted by an entity that can be objectively observed, or indirectly inferred, within a physical realm.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable entity behavior broadly refers to any behavior exhibited or enacted by an entity that can be electronically observed.

Cyber behavior, as used herein, broadly refers to any behavior occurring in cyberspace, whether enacted by an individual user, a group of users, or a system acting at the behest of an individual user, a group of users, or an entity. More particularly, cyber behavior may include physical, social, or mental actions that can be objectively observed, or indirectly inferred, within cyberspace. As an example, a user may use an endpoint device 304 to access and browse a particular website on the Internet. In this example, the individual actions performed by the user to access and browse the website constitute a cyber behavior. As another example, a user may use an endpoint device 304 to download a data file from a particular system at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, which makes them electronically-observable.

As likewise used herein, cyberspace broadly refers to a network 140 environment capable of supporting communication between two or more entities. In certain embodiments, the entity may be a user, an endpoint device 304, or various resources, described in greater detail herein. In certain embodiments, the entities may include various endpoint devices 304 or resources operating at the behest of an entity, such as a user. In certain embodiments, the communication between the entities may include audio, image, video, text, or binary data.

As likewise used herein, an entity broadly refers to something that exists as itself, whether physically or abstractly. In certain embodiments, an entity may be an individual user, a group, an organization, or a government. In certain embodiments, an entity may likewise be an item, a device, such as endpoint and edge devices, a network, a domain, an operation, or a process. In certain embodiments, an entity may be a resource, such as a geographical location or formation, a physical facility, a venue, a system, a data store, or a service, such as a service operating in a cloud environment.

As described in greater detail herein, the contextual information may include a user's authentication factors. Contextual information may likewise include various temporal identity resolution factors, such as identification factors associated with the entity, the date/time/frequency of various entity behaviors, the entity's location, the entity's role or position in an organization, their associated access rights, and certain user gestures employed by a user in the enactment of a user behavior. Other contextual information may likewise include various user interactions, whether the interactions are with an endpoint device 304, a network 140, a resource, or another user. In certain embodiments, entity behaviors, and their related contextual information, may be collected at particular points of observation, and at particular points in time, described in greater detail herein. In certain embodiments, a protected endpoint 302 may be implemented as a point of observation for the collection of entity behavior and contextual information.

In certain embodiments, the endpoint agent 306 may be implemented to universally support a variety of operating systems, such as Apple Macintosh®, Microsoft Windows®, Linux®, Android® and so forth. In certain embodiments, the endpoint agent 306 may be implemented to interact with the endpoint device 304 through the use of low-level hooks 312 at the operating system level. It will be appreciated that the use of low-level hooks 312 allows the endpoint agent 306 to subscribe to multiple events through a single hook. Consequently, multiple functionalities provided by the endpoint agent 306 can share a single data stream, using only those portions of the data stream they may individually need. Accordingly, system efficiency can be improved and operational overhead reduced.

In certain embodiments, the endpoint agent 306 may be implemented to provide a common infrastructure for pluggable feature packs 308. In various embodiments, the pluggable feature packs 308 may provide certain security management functionalities. Examples of such functionalities may include various anti-virus and malware detection, data loss protection (DLP), insider threat detection, and so forth. In certain embodiments, the security management functionalities may include one or more functionalities associated with providing real-time resolution of the identity of an entity at a particular point in time, as described in greater detail herein.

In certain embodiments, a particular pluggable feature pack 308 is invoked as needed by the endpoint agent 306 to provide a given functionality. In certain embodiments, individual features of a particular pluggable feature pack 308 are invoked as needed. It will be appreciated that the ability to invoke individual features of a pluggable feature pack 308, without necessarily invoking all such features, will likely improve the operational efficiency of the endpoint agent 306 while simultaneously reducing operational overhead. Accordingly, the endpoint agent 306 can self-optimize in certain embodiments by using the common infrastructure and invoking only those pluggable components that are applicable or needed for a given user behavior.

In certain embodiments, the individual features of a pluggable feature pack 308 are invoked by the endpoint agent 306 according to the occurrence of a particular user behavior. In certain embodiments, the individual features of a pluggable feature pack 308 are invoked by the endpoint agent 306 according to the occurrence of a particular temporal event, described in greater detail herein. In certain embodiments, the individual features of a pluggable feature pack 308 are invoked by the endpoint agent 306 at a particular point in time. In these embodiments, the method by which a given user behavior, temporal event, or point in time is selected is a matter of design choice.

In certain embodiments, the individual features of a pluggable feature pack 308 may be invoked by the endpoint agent 306 according to the context of a particular user behavior. As an example, the context may be the user enacting the user behavior, their associated risk classification, which resource they may be requesting, the point in time the user behavior is enacted, and so forth. In certain embodiments, the pluggable feature packs 308 may be sourced from various cloud services 206. In certain embodiments, the pluggable feature packs 308 may be dynamically sourced from various cloud services 206 by the endpoint agent 306 on an as-need basis.

In certain embodiments, the endpoint agent 306 may be implemented with additional functionalities, such as event analytics 310. In certain embodiments, the event analytics 310 functionality may include analysis of various user behaviors, described in greater detail herein. In certain embodiments, the endpoint agent 306 may be implemented with a thin hypervisor 314, which can be run at Ring −1, thereby providing protection for the endpoint agent 306 in the event of a breach. As used herein, a thin hypervisor broadly refers to a simplified, OS-dependent hypervisor implemented to increase security. As likewise used herein, Ring −1 broadly refers to approaches allowing guest operating systems to run Ring 0 (i.e., kernel) operations without affecting other guests or the host OS. Those of skill in the art will recognize that many such embodiments and examples are possible. Accordingly, the foregoing is not intended to limit the spirit, scope or intent of the invention.

Figure 4:
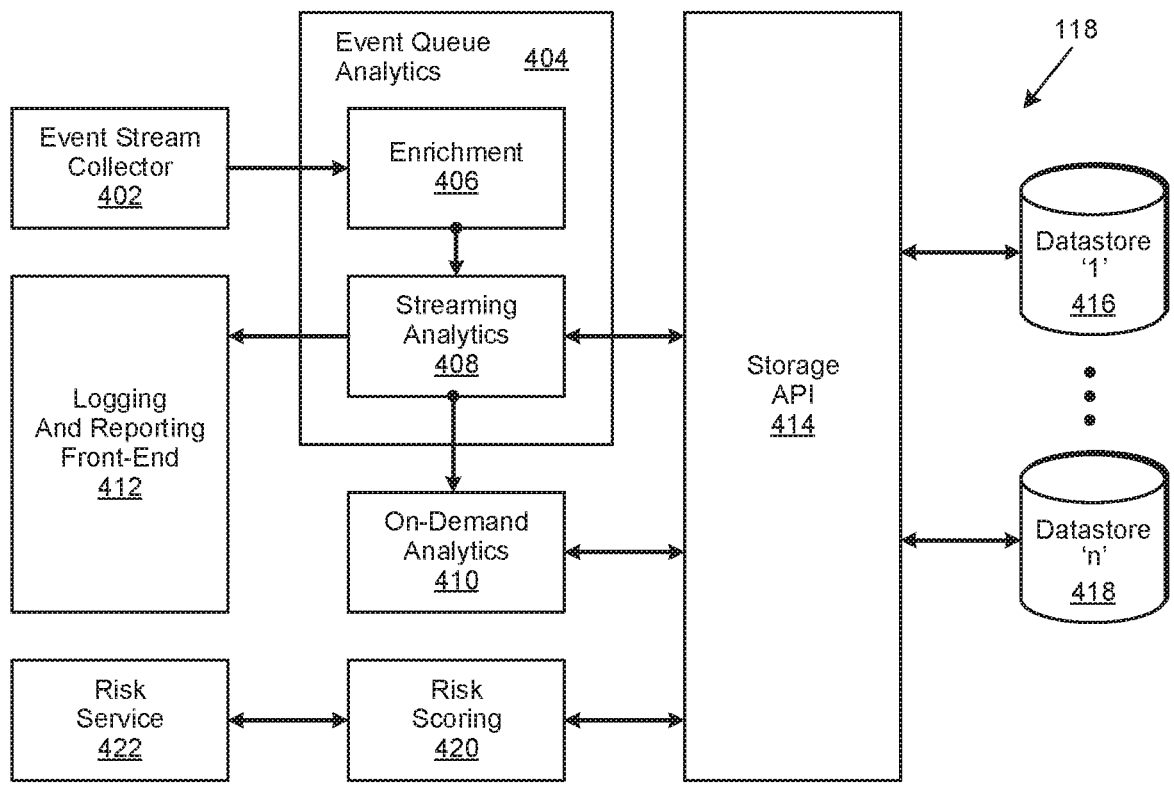
FIG. 4 is a simplified block diagram of a security analytics system.

FIG. 4 is a simplified block diagram of a security analytics system implemented in accordance with an embodiment of the invention. In certain embodiments, the security analytics system 118 shown in FIG. 4 may include an event queue analytics 404 module, described in greater detail herein. In certain embodiments, the event queue analytics 404 subsystem may be implemented to include an enrichment 406 module and a streaming analytics 408 module. In certain embodiments, the security analytics system 118 may be implemented to provide log storage, reporting, and analytics capable of performing streaming 408 and on-demand 410 analytics operations. In certain embodiments, such operations may be associated with defining and managing an adaptive trust profile (ATP), detecting entity behavior that may be of analytic utility, adaptively responding to mitigate risk, or a combination thereof, as described in greater detail herein. In certain embodiments, entity behavior of analytic utility may be determined to be anomalous, abnormal, unexpected, malicious, or some combination thereof, as described in greater detail herein.

In certain embodiments, the security analytics system 118 may be implemented to provide a uniform platform for storing events and contextual information associated with various entity behaviors and performing longitudinal analytics. As used herein, longitudinal analytics broadly refers to performing analytics of entity behaviors occurring over a particular period of time. As an example, an entity may iteratively attempt to access certain proprietary information stored in various locations. In addition, the attempts may occur over a brief period of time. To continue the example, the fact that the information the entity is attempting to access is proprietary, that it is stored in various locations, and the attempts are occurring in a brief period of time, in combination, may indicate the entity behavior enacted by the entity is suspicious. As another example, certain entity identifier information (e.g., a user name) associated with an entity may change over time. In this example, a change in the entity's user name, during a particular period of time or at a particular point in time, may represent suspicious entity behavior.

In certain embodiments, the security analytics system 118 may be implemented to be scalable. In certain embodiments, the security analytics system 118 may be implemented in a centralized location, such as a corporate data center. In these embodiments, additional resources may be added to the security analytics system 118 as needs grow. In certain embodiments, the security analytics system 118 may be implemented as a distributed system. In these embodiments, the security analytics system 118 may span multiple information handling systems. In certain embodiments, the security analytics system 118 may be implemented in a cloud environment. In certain embodiments, the security analytics system 118 may be implemented in a virtual machine (VM) environment. In such embodiments, the VM environment may be configured to dynamically and seamlessly scale the security analytics system 118 as needed. Skilled practitioners of the art will recognize that many such embodiments are possible. Accordingly, the foregoing is not intended to limit the spirit, scope or intent of the invention.

In certain embodiments, an event stream collector 402 may be implemented to collect event and related contextual information, described in greater detail herein, associated with various entity behaviors. In these embodiments, the method by which the event and contextual information is selected to be collected by the event stream collector 402 is a matter of design choice. In certain embodiments, the event and contextual information collected by the event stream collector 402 may be processed by an enrichment module 406 to generate enriched entity behavior information. In certain embodiments, the enrichment may include certain contextual information related to a particular entity behavior or event. In certain embodiments, the enrichment may include certain temporal information, such as timestamp information, related to a particular entity behavior or event.

In certain embodiments, enriched entity behavior information may be provided by the enrichment module 406 to a streaming 408 analytics module. In turn, the streaming 408 analytics module may provide some or all of the enriched entity behavior information to an on-demand 410 analytics module. As used herein, streaming 408 analytics broadly refers to analytics performed in near real-time on enriched entity behavior information as it is received. Likewise, on-demand 410 analytics broadly refers herein to analytics performed, as they are requested, on enriched entity behavior information after it has been received. In certain embodiments, the enriched entity behavior information may be associated with a particular event. In certain embodiments, the enrichment 406 and streaming analytics 408 modules may be implemented to perform event queue analytics 404 operations, as described in greater detail herein.

In certain embodiments, the on-demand 410 analytics may be performed on enriched entity behavior associated with a particular interval of, or point in, time. In certain embodiments, the streaming 408 or on-demand 410 analytics may be performed on enriched entity behavior associated with a particular user, group of users, one or more non-user entities, or a combination thereof. In certain embodiments, the streaming 408 or on-demand 410 analytics may be performed on enriched entity behavior associated with a particular resource, such as a facility, system, datastore, or service. Those of skill in the art will recognize that many such embodiments are possible. Accordingly, the foregoing is not intended to limit the spirit, scope or intent of the invention.

In certain embodiments, the results of various analytics operations performed by the streaming 408 or on-demand 410 analytics modules may be provided to a storage Application Program Interface (API) 414. In turn, the storage API 412 may be implemented to provide access to various datastores '1' 416 through 'n' 418, which in turn are used to store the results of the analytics operations. In certain embodiments, the security analytics system 118 may be implemented with a logging and reporting front-end 412, which is used to receive the results of analytics operations performed by the streaming 408 analytics module. In certain embodiments, the datastores '1' 416 through 'n' 418 may variously include a datastore of entity identifiers, temporal events, or a combination thereof.

In certain embodiments, the security analytics system 118 may include a risk scoring 420 module implemented to perform risk scoring operations, described in greater detail herein. In certain embodiments, functionalities of the risk scoring 420 module may be provided in the form of a risk management service 422. In certain embodiments, the risk management service 422 may be implemented to perform operations associated with defining and managing an adaptive trust profile (ATP), as described in greater detail herein. In certain embodiments, the risk management service 422 may be implemented to perform operations associated with detecting entity behavior that may be of analytic utility and adaptively responding to mitigate risk, as described in greater detail herein. In certain embodiments, the risk management service 422 may be implemented to provide the results of various analytics operations performed by the streaming 406 or on-demand 408 analytics modules. In certain embodiments, the risk management service 422 may be implemented to use the storage API 412 to access various enhanced cyber behavior and analytics information stored on the datastores '1' 414 through 'n' 416. Skilled practitioners of the art will recognize that many such embodiments are possible. Accordingly, the foregoing is not intended to limit the spirit, scope or intent of the invention.

Figure 5:
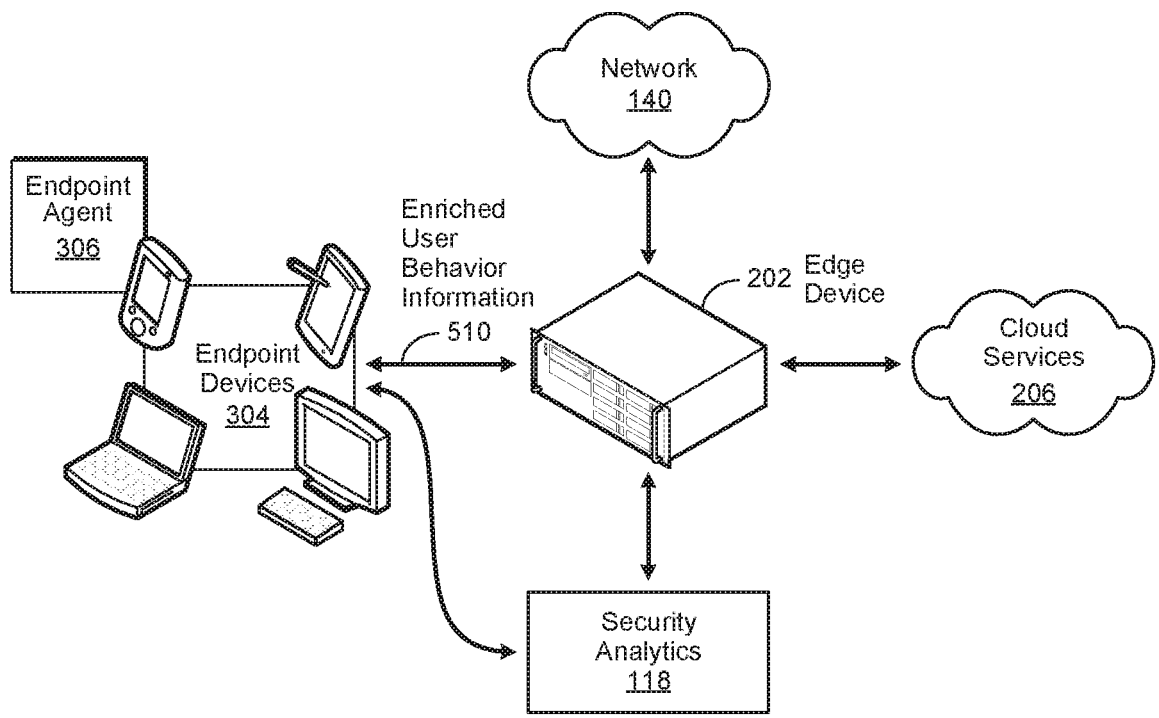
FIG. 5 is a simplified block diagram of a security analytics system.

FIG. 5 is a simplified block diagram of the operation of a security analytics system implemented in accordance with an embodiment of the invention. In certain embodiments, the security analytics system 118 may be implemented to perform operations associated with detecting entity behavior that may be of analytic utility, as described in greater detail herein. In certain embodiments, the security analytics system 118 may be implemented in combination with one or more endpoint agents 306, one or more edge devices 202, various cloud services 206, and a network 140 to perform such operations.

In certain embodiments, the network edge device 202 may be implemented in a bridge, a firewall, or a passive monitoring configuration. In certain embodiments, the edge device 202 may be implemented as software running on an information handling system. In certain embodiments, the network edge device 202 may be implemented to provide integrated logging, updating and control. In certain embodiments, the edge device 202 may be implemented to receive network requests and context-sensitive user behavior information in the form of enriched user behavior information 510, described in greater detail herein, from an endpoint agent 306, likewise described in greater detail herein.

In certain embodiments, the security analytics system 118 may be implemented as both a source and a sink of user behavior information. In certain embodiments, the security analytics system 118 may be implemented to serve requests for user/resource risk data. In certain embodiments, the edge device 202 and the endpoint agent 306, individually or in combination, may provide certain entity behavior information to the security analytics system 118 using either push or pull approaches familiar to skilled practitioners of the art.

As described in greater detail herein, the edge device 202 may be implemented in certain embodiments to receive enriched user behavior information 510 from the endpoint agent 306. It will be appreciated that such enriched user behavior information 510 will likely not be available for provision to the edge device 202 when an endpoint agent 306 is not implemented for a corresponding endpoint device 304. However, the lack of such enriched user behavior information 510 may be accommodated in various embodiments, albeit with reduced functionality related to operations associated with defining and managing an entity profile, detecting entity behavior that may be normal or of analytic utility, mitigating associated risk, or a combination thereof.

In certain embodiments, a given user behavior may be enriched by an associated endpoint agent 306 attaching contextual information to a request. In certain embodiments, the context is embedded within a network request, which is then provided as enriched user behavior information 510. In certain embodiments, the contextual information may be concatenated, or appended, to a request, which in turn may be provided as enriched user behavior information 510. In these embodiments, the enriched user behavior information 510 may be unpacked upon receipt and parsed to separate the request and its associated contextual information. Certain embodiments of the invention reflect an appreciation that one possible disadvantage of such an approach is that it may perturb certain Intrusion Detection System and/or Intrusion Detection Prevention (IDS/IDP) systems implemented on a network 140.

In certain embodiments, new flow requests may be accompanied by a contextual information packet sent to the edge device 202. In these embodiments, the new flow requests may be provided as enriched user behavior information 510. In certain embodiments, the endpoint agent 306 may also send updated contextual information to the edge device 202 once it becomes available. As an example, an endpoint agent 306 may share a list of files that have been read by a current process at any point in time once the information has been collected. To continue the example, such a list of files may be used to determine which data the endpoint agent 306 may be attempting to exfiltrate.

In certain embodiments, point analytics processes executing on the edge device 202 may request a particular service. As an example, risk scores associated with a particular event on a per-user basis may be requested. In certain embodiments, the service may be requested from the security analytics system 118. In certain embodiments, the service may be requested from various cloud services 206.

In certain embodiments, contextual information associated with a particular entity behavior may be attached to various network service requests. In certain embodiments, the request may be wrapped and then handled by proxy. In certain embodiments, a small packet of contextual information associated with an entity behavior may be sent with a service request. In certain embodiments, service requests may be related to Domain Name Service (DNS), web browsing activity, email, and so forth, all of which are essentially requests for service by an endpoint device 304. In certain embodiments, such service requests may be associated with temporal event information, described in greater detail herein. Consequently, such requests can be enriched by the addition of entity behavior contextual information (e.g., UserAccount, interactive/automated, data-touched, temporal event information, etc.). Accordingly, the edge device 202 can then use this information to manage the appropriate response to submitted requests.

In certain embodiments, the security analytics system 118 may be implemented in different operational configurations. In certain embodiments, the security analytics system 118 may be implemented by using the endpoint agent 306. In certain embodiments, the security analytics system 118 may be implemented by using endpoint agent 306 in combination with the edge device 202. In certain embodiments, the cloud services 206 may likewise be implemented for use by the endpoint agent 306, the edge device 202, and the security analytics system 118, individually or in combination. In these embodiments, the security analytics system 118 may be primarily oriented to performing risk assessment operations related to entity actions, software program actions, data accesses, or a combination thereof. In certain embodiments, software program actions may be treated as a proxy for the entity.

In certain embodiments, the endpoint agent 306 may be implemented to update the security analytics system 118 with user behavior and associated contextual information, thereby allowing an offload of certain analytics processing overhead. In certain embodiments, this approach allows for longitudinal risk scoring, which assesses risk associated with certain user behavior during a particular interval of time. In certain embodiments, the security analytics system 118 may be implemented to access risk scores associated with the same user account, but accrued on different endpoint devices 304. It will be appreciated that such an approach may prove advantageous when an adversary is "moving sideways" through a network environment, using different endpoint devices 304 to collect information.

In certain embodiments, the security analytics system 118 may be primarily oriented to applying risk mitigations in a way that maximizes security effort return-on-investment (ROI). In certain embodiments, this approach may be accomplished by providing additional contextual and entity behavior information associated with security requests. As an example, a web gateway may not concern itself with why a particular file is being requested by a certain entity at a particular point in time. Accordingly, if the file cannot be identified as malicious or harmless, there is no context available to determine how, or if, to proceed. To extend the example, the edge device 202 and security analytics system 118 may be coupled such that requests can be contextualized and fitted into a framework that evaluates their associated risk. Certain embodiments of the invention reflect an appreciation that such an approach works well with web-based data loss protection (DLP) approaches, as each transfer is no longer examined in isolation, but in the broader context of an identified entity's actions, at a particular time, on the network 140.

As another example, the security analytics system 118 may be implemented to perform risk scoring processes to decide whether to block or allow unusual flows. In various embodiments, the risk scoring processes may be implemented to include certain aspects of eXtensible Access Control Markup Language (XACML) approaches known to skilled practitioners of the art. In certain embodiments, XACML obligations may be implemented to block or allow unusual flows. In certain embodiments, an XACML obligation may be implemented as a directive from a policy decision point (PDP) to a policy enforcement point (PEP) regarding what must be performed before or after a flow is approved. Certain embodiments of the invention reflect an appreciation that such an approach is highly applicable to defending against point-of-sale (POS) malware, a breach technique that has become increasingly more common in recent years. Certain embodiments of the invention likewise reflect an appreciation that while various edge device 202 implementations may not stop all such exfiltrations, they may be able to.

In certain embodiments, the security analytics system 118 may be primarily oriented to maximally leverage contextual information associated with various entity behaviors within the system. In certain embodiments, data flow tracking is performed by one or more endpoint agents 306, which allows the quantity and type of information associated with particular hosts to be measured. In turn, this information may be used to determine how the edge device 202 handles requests. By contextualizing such entity behavior on the network 140, the security analytics system 118 can provide intelligent protection, making decisions that make sense in the broader context of an organization's activities. Certain embodiments of the invention reflect an appreciation that one advantage to such an approach is that information flowing through an organization, and the networks they employ, should be trackable, and substantial data breaches preventable. Skilled practitioners of the art will recognize that many such embodiments and examples are possible. Accordingly, the foregoing is not intended to limit the spirit, scope or intent of the invention.

Figure 6A:
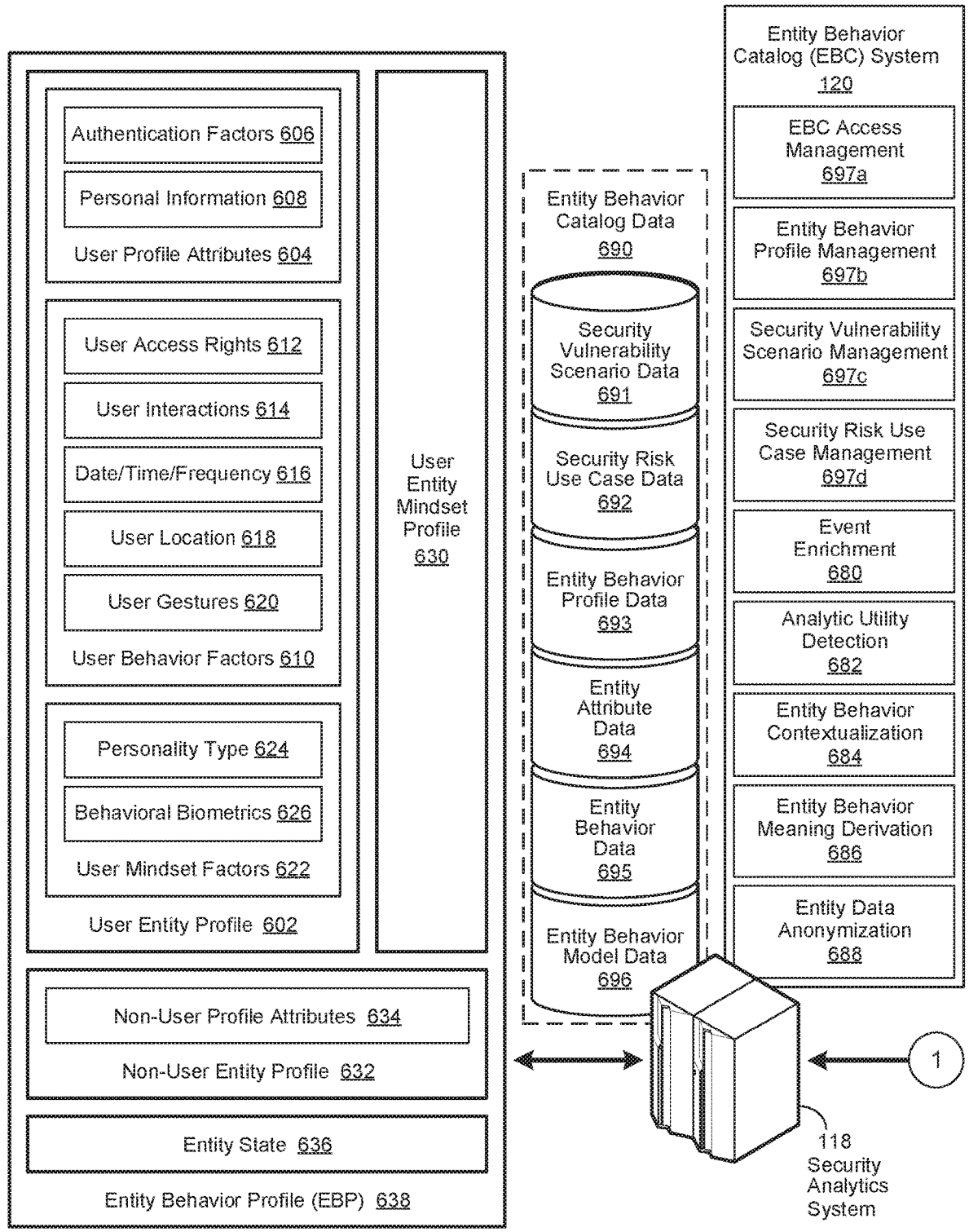
FIGS. 6a and 6b show a simplified block diagram of an entity behavior profile (EBP) and a prepopulated EBP.
Figure 6B:
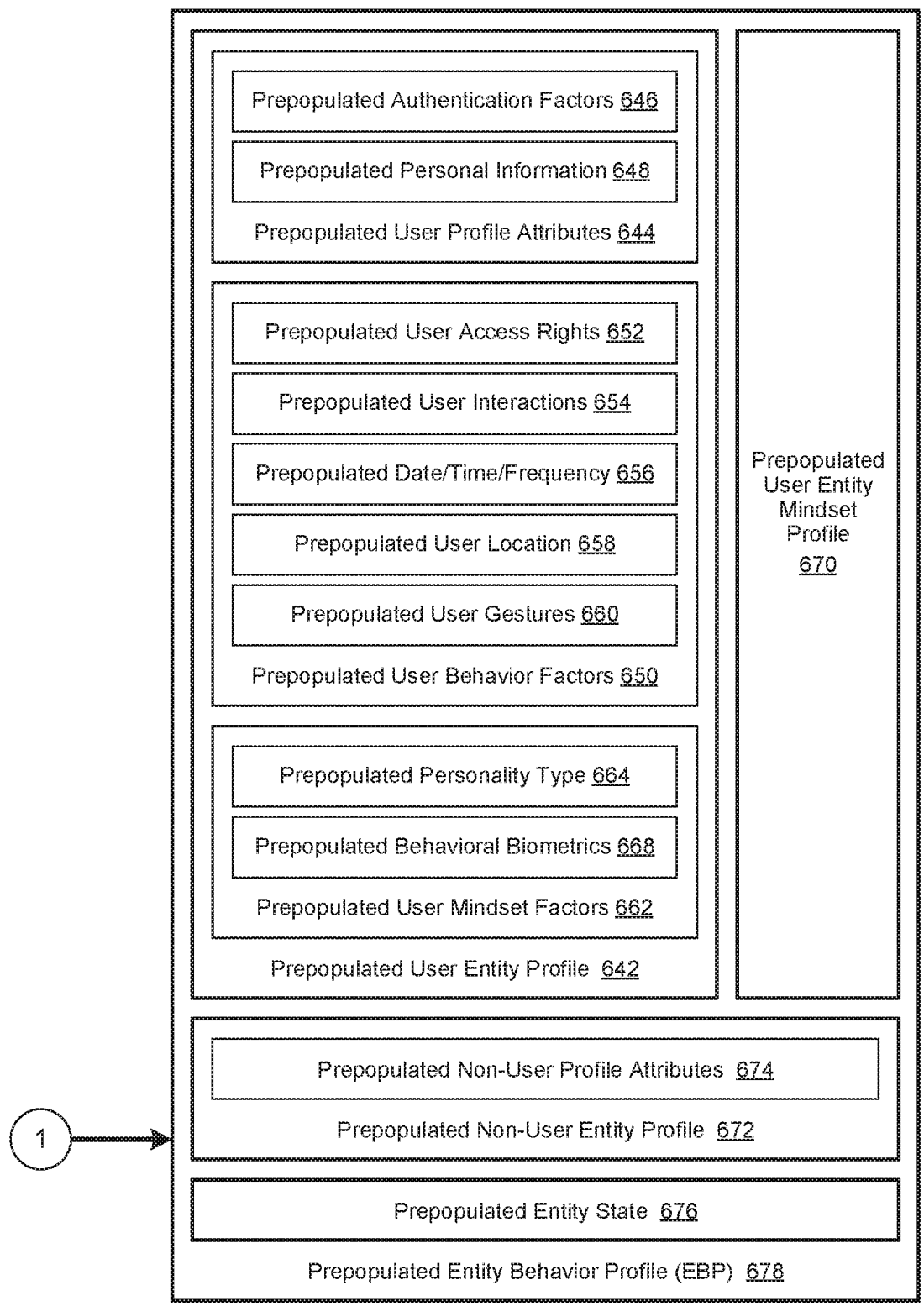

FIGS. 6a and 6b show a simplified block diagram of an entity behavior profile (EBP) and a prepopulated EBP entity behavior profile implemented in accordance with an embodiment of the invention. As used herein, an entity behavior profile 638 broadly refers to a collection of information that uniquely describes a particular entity's identity and their associated behavior, whether the behavior occurs within a physical realm or cyberspace. In certain embodiments, an EBP 638 may be used to adaptively draw inferences regarding the trustworthiness of a particular entity. In certain embodiments, as described in greater detail herein, the drawing of the inferences may involve comparing a new entity behavior to known past behaviors enacted by the entity. In certain embodiments, new entity behavior of analytic utility may represent entity behavior that represents a security risk. As likewise used herein, an entity broadly refers to something that exists as itself, whether physically or abstractly. In certain embodiments, an entity may be a user entity, a non-user entity, or a combination thereof. In certain embodiments, the identity of an entity may be known or unknown.

As used herein, a user entity broadly refers to an entity capable of enacting a user entity behavior, as described in greater detail herein. Examples of a user entity include an individual person, a group of people, an organization, or a government. As likewise used herein, a non-user entity broadly refers to an entity whose identity can be described and may exhibit certain behavior, but is incapable of enacting a user entity behavior. Examples of a non-user entity include an item, a device, such as endpoint and edge devices, a network, an account, a domain, an operation, a process, and an event. Other examples of a non-user entity include a resource, such as a geographical location or formation, a physical facility, a venue, a system, a software application, a data store, and a service, such as a service operating in a cloud environment.

Certain embodiments of the invention reflect an appreciation that being able to uniquely identity a device may assist in establishing whether or not a particular login is legitimate. As an example, user impersonations may not occur at the user's endpoint, but instead, from another device or system. Certain embodiments of the invention likewise reflect an appreciation that profiling the entity behavior of a particular device or system may assist in determining whether or not it is acting suspiciously.

In certain embodiments, an account may be local account, which runs on a single machine. In certain embodiments, an account may be a global account, providing access to multiple resources. In certain embodiments, a process may be implemented to run in an unattended mode, such as when backing up files or checking for software updates. Certain embodiments of the invention reflect an appreciation that it is often advantageous to track events at the process level as a method of determining which events are associated with background processes and which are initiated by a user entity.

In certain embodiments, an EBP 638 may be implemented to include a user entity profile 602, an associated user entity mindset profile 630, a non-user entity profile 632, and an entity state 636. As used herein, a user entity profile 602 broadly refers to a collection of information that uniquely describes a user entity's identity and their associated behavior, whether the behavior occurs within a physical realm or cyberspace. In certain embodiments, as described in greater detail herein, the user entity profile 602 may include user profile attributes 604, user behavior factors 610, user mindset factors 622, or a combination thereof. In certain embodiments, the user profile attributes 604 may include certain user authentication factors 606, described in greater detail herein, and personal information 608.

As used herein, a user profile attribute 604 broadly refers to data or metadata that can be used, individually or in combination with other user profile attributes 604, user behavior factors 610, or user mindset factors 622, to ascertain the identity of a user entity. In various embodiments, certain user profile attributes 604 may be uniquely associated with a particular user entity. In certain embodiments, the personal information 608 may include non-sensitive personal information associated with a user entity, such as their name, title, position, role, and responsibilities. In certain embodiments, the personal information 608 may likewise include technical skill level information, peer information, expense account information, paid time off (PTO) information, data analysis information, insider information, misconfiguration information, third party information, or a combination thereof. In certain embodiments, the personal information 608 may contain sensitive personal information associated with a user entity. As used herein, sensitive personal information (SPI), also commonly referred to as personally identifiable information (PII), broadly refers to any information usable to ascertain the identity of a user entity, either by itself, or in combination with other information, such as contextual information described in greater detail herein.

Examples of SPI may include the full or legal name of a user entity, initials or nicknames, place and date of birth, home and business addresses, personal and business telephone numbers, their gender, and other genetic information. Additional examples of SPI may include government-issued identifiers, such as a Social Security Number (SSN) or a passport number, vehicle registration plate and serial numbers, and driver's license numbers. Other examples of SPI may include certain email addresses and social media identifiers, credit and debit card numbers, and other digital identity information. Yet other examples of SPI may include employer-issued identifiers, financial transaction information, credit scores, electronic medical records (EMRs), insurance claim information, personal correspondence, and so forth. Further examples of SPI may include user authentication factors 606, such as biometrics, user identifiers and passwords, and personal identification numbers (PINs).

In certain embodiments, the SPI may include information considered by an individual user, a group of users, or an organization (e.g., a company, a government or non-government organization, etc.), to be confidential or proprietary. One example of such confidential information is protected health information (PHI). As used herein, PHI broadly refers to any information associated with the health status, provision of health care, or payment for health care that is created or collected by a "covered entity," or an associate thereof, that can be linked to a particular individual. As used herein, a "covered entity" broadly refers to health plans, healthcare clearinghouses, healthcare providers, and others, who may electronically communicate any health-related information associated with a particular individual. Examples of such PHI may include any part of a patient's medical record, healthcare record, or payment history for medical or healthcare services.

As used herein, a user behavior factor 610 broadly refers to information associated with a user entity's behavior, whether the behavior occurs within a physical realm or cyberspace. In certain embodiments, user behavior factors 610 may include the user entity's access rights 612, the user entity's interactions 614, and the date/time/frequency 616 of when the interactions 614 are enacted. In certain embodiments, the user behavior factors 610 may likewise include the user entity's location 618, and the gestures 620 used by the user entity to enact the interactions 614.

In certain embodiments, the user entity gestures 620 may include key strokes on a keypad, a cursor movement, a mouse movement or click, a finger swipe, tap, or other hand gesture, an eye movement, or some combination thereof. In certain embodiments, the user entity gestures 620 may likewise include the cadence of the user's keystrokes, the motion, force and duration of a hand or finger gesture, the rapidity and direction of various eye movements, or some combination thereof. In certain embodiments, the user entity gestures 620 may include various audio or verbal commands performed by the user.

As used herein, user mindset factors 622 broadly refer to information used to make inferences regarding the mental state of a user entity at a particular point in time, during the occurrence of an event or an enactment of a user behavior, or a combination thereof. As likewise used herein, mental state broadly refers to a hypothetical state corresponding to the way a user entity may be thinking or feeling. Likewise, as used herein, an event broadly refers to the occurrence of an action performed by an entity. In certain embodiments, the user entity mindset factors 622 may include a personality type 624. Examples of known approaches for determining a personality type 624 include Jungian types, Myers-Briggs type indicators, Keirsey Temperament Sorter, Socionics, Enneagram of Personality, and Eyseneck's three-factor model.

In certain embodiments, the user mindset factors 622 may include various behavioral biometrics 626. As used herein, a behavioral biometric broadly refers to a physiological indication of a user entity's mental state. Examples of behavioral biometrics 626 may include a user entity's blood pressure, heart rate, respiratory rate, eye movements and iris dilation, facial expressions, body language, tone and pitch of voice, speech patterns, and so forth.

Certain embodiments of the invention reflect an appreciation that certain user behavior factors 610, such as user entity gestures 620, may provide additional information related to inferring a user entity's mental state. As an example, a user entering text at a quick pace with a rhythmic cadence may indicate intense focus. Likewise, an individual user intermittently entering text with forceful keystrokes may indicate the user is in an agitated state. As another example, the user may intermittently enter text somewhat languorously, which may indicate being in a thoughtful or reflective state of mind. As yet another example, the user may enter text with a light touch with an uneven cadence, which may indicate the user is hesitant or unsure of what is being entered.

Certain embodiments of the invention likewise reflect an appreciation that while the user entity gestures 620 may provide certain indications of the mental state of a particular user entity, they may not provide the reason for the user entity to be in a particular mental state. Likewise, certain embodiments of the invention include an appreciation that certain user entity gestures 620 and behavioral biometrics 626 are reflective of an individual user's personality type 624. As an example, aggressive, forceful keystrokes combined with an increased heart rate may indicate normal behavior for a particular user when composing end-of-month performance reviews. In various embodiments, certain user entity behavior factors 610, such as user gestures 620, may be correlated with certain contextual information, as described in greater detail herein.

In certain embodiments, a security analytics system 118, described in greater detail herein, may be implemented to include an entity behavior catalog (EBC) system 120. In certain embodiments, the EBC system 120 may be implemented to generate, manage, store, or some combination thereof, information related to the behavior of an associated entity. In various embodiments, the EBC system 120 may be implemented as a cyber behavior catalog. In certain of these embodiments, the cyber behavior catalog may be implemented to generate, manage, store, or some combination thereof, information related to cyber behavior, described in greater detail herein, enacted by an associated entity. In various embodiments, as likewise described in greater detail herein, the information generated, managed, stored, or some combination thereof, by such a cyber behavior catalog, may be related to cyber behavior enacted by a user entity, a non-user entity, or a combination thereof.

In certain embodiments, the EBC system 120 may be implemented to use a user entity profile 602 in combination with an entity state 636 to generate a user entity mindset profile 630. As used herein, entity state 636 broadly refers to the context of a particular event or entity behavior. In certain embodiments, the entity state 636 may be a long-term entity state or a short-term entity state. As used herein, a long-term entity state 636 broadly relates to an entity state 636 that persists for an extended interval of time, such as six months or a year. As likewise used herein, a short-term entity state 636 broadly relates to an entity state 636 that occurs for a brief interval of time, such as a few minutes or a day. In various embodiments, the method by which an entity state's 636 associated interval of time is considered to be long-term or short-term is a matter of design choice.

As an example, a particular user may have a primary work location, such as a branch office, and a secondary work location, such as their company's corporate office. In this example, the user's primary and secondary offices respectively correspond to the user's location 618, whereas the presence of the user at either office corresponds to an entity state 636. To continue the example, the user may consistently work at their primary office Monday through Thursday, but at their company's corporate office on Fridays. To further continue the example, the user's presence at their primary work location may be a long-term entity state 636, while their presence at their secondary work location may be a short-term entity state 636. Accordingly, a date/time/frequency 616 user entity behavior factor 614610 can likewise be associated with user behavior respectively enacted on those days, regardless of their corresponding locations. Consequently, the long-term user entity state 636 on Monday through Thursday will typically be "working at the branch office" and the short-term entity state 636 on Friday will likely be "working at the corporate office."

As likewise used herein, a user entity mindset profile 630 broadly refers to a collection of information that reflects an inferred mental state of a user entity at a particular time during the occurrence of an event or an enactment of a user behavior. As an example, certain information may be known about a user entity, such as their name, their title and position, and so forth, all of which are user profile attributes 604. Likewise, it may be possible to observe a user entity's associated user behavior factors 610, such as their interactions with various systems, when they log-in and log-out, when they are active at the keyboard, the rhythm of their keystrokes, and which files they typically use.

Certain embodiments of the invention reflect an appreciation these behavior factors 610 can be considered to be a behavioral fingerprint. In certain embodiments, the user behavior factors 610 may change, a little or a lot, from day to day. These changes may be benign, such as when a user entity begins a new project and accesses new data, or they may indicate something more concerning, such as a user entity who is actively preparing to steal data from their employer. In certain embodiments, the user behavior factors 610 may be implemented to ascertain the identity of a user entity. In certain embodiments, the user behavior factors 610 may be uniquely associated with a particular entity.

In certain embodiments, observed user behaviors may be used to build a user entity profile 602 for a particular user or other entity. In addition to creating a model of a user's various attributes and observed behaviors, these observations can likewise be used to infer things that are not necessarily explicit. Accordingly, in certain embodiments, a behavioral fingerprint may be used in combination with an EBP 638 to generate an inference regarding an associated user entity. As an example, a particular user may be observed eating a meal, which may or may not indicate the user is hungry. However, if it is also known that the user worked at their desk throughout lunchtime and is now eating a snack during a mid-afternoon break, then it can be inferred they are indeed hungry.

As likewise used herein, a non-user entity profile 632 broadly refers to a collection of information that uniquely describes a non-user entity's identity and their associated behavior, whether the behavior occurs within a physical realm or cyberspace. In various embodiments, the non-user entity profile 632 may be implemented to include certain non-user profile attributes 634. As used herein, a non-user profile attribute 634 broadly refers to data or metadata that can be used, individually or in combination with other non-user profile attributes 634, to ascertain the identity of a non-user entity. In various embodiments, certain non-user profile attributes 634 may be uniquely associated with a particular non-user entity.

In certain embodiments, the non-user profile attributes 634 may be implemented to include certain identity information, such as a non-user entity's network, Media Access Control (MAC), or physical address, its serial number, associated configuration information, and so forth. In various embodiments, the non-user profile attributes 634 may be implemented to include non-user behavior information associated with interactions between certain user and non-user entities, the type of those interactions, the data exchanged during the interactions, the date/time/frequency of such interactions, and certain services accessed or provided.

In certain embodiments, the EBC system 120 may be implemented to include an EBC access management 697a, an EBP management 697b, a security vulnerability scenario management 697c, a security risk use case management 697d, an event enrichment 680, an analytic utility detection 682, an entity behavior contextualization 684, an entity behavior meaning derivation 686, and an entity data anonymization 688 module or a combination thereof. In various embodiments, the EBC access management 122 module may be implemented to provide access to certain functionalities performed by the EBC system 120, as described in greater detail herein. In various embodiments, the EBP management 124 module may be implemented to perform certain EBP management operations, described in greater detail herein. In various embodiments, the security vulnerability scenario management 126 module may be implemented to perform certain security vulnerability scenario management operations, described in greater detail herein.

In various embodiments, the event enrichment 680 module may be implemented to perform certain event enrichment operations, described in greater detail herein. In various embodiments, the analytic utility detection 682 module may be implemented to perform certain analytic utility detection operations, as described in greater detail herein. In various embodiments, as described in greater detail herein, the entity behavior contextualization 684 module may be implemented to perform certain contextualization operations, as described in greater detail herein. As likewise described in greater detail herein, the entity behavior meaning derivation 686 module may be implemented in various embodiments to perform certain behavior meaning derivation operations. In certain embodiments, the entity data anonymization 688 module may be implemented various embodiments to perform certain data anonymization operations. In various embodiments, the EBC access management 122, EBP management 124, security vulnerability scenario management 126, security risk use case management 128, event enrichment 680, analytic utility detection 682, entity behavior contextualization 684, entity behavior meaning derivation 686, and entity data anonymization 688 modules, or a combination thereof, may be implemented to provide an EBC reference architecture for performing certain EBC operations, described in greater detail herein.

In various embodiments, as described in greater detail herein, the EBP system 120 may be implemented to use certain data associated with an EBP 638 to derive an inference for contextualizing an electronically-observable behavior of a corresponding entity. In certain embodiments, the EBP system 120 may be implemented to use a user entity profile 602 in combination with a user entity mindset profile 632 and an associated entity state 636 to infer a user entity's intent. In certain embodiments, the EBP system 120 may be implemented to use various data stored in a repository of EBP data 690 to perform such an inference. In certain embodiments, the repository of EBP data 690 may include various EBPs 638, prepopulated EBPs 678, and associated contextual information, described in greater detail herein.

In various embodiments, the EBC system 120 may be implemented to use certain data associated with an EBP 638 to provide a probabilistic measure of whether a particular electronically-observable event is of analytic utility. In certain embodiments, an electronically-observable event that is of analytic utility may be determined to be anomalous, abnormal, unexpected, or malicious. To continue the prior example, a user may typically work out of their company's corporate office on Fridays. Furthermore, various user mindset factors 622 within their associated user entity profile 602 may indicate that the user is typically relaxed and methodical when working with customer data. Moreover, the user's user entity profile 602 indicates that such user interactions 614 with customer data typically occur on Monday mornings and the user rarely, if ever, copies or downloads customer data. However, the user may decide to interact with certain customer data late at night, on a Friday, while in their company's corporate office. As they do so, they exhibit an increased heart rate, rapid breathing, and furtive keystrokes while downloading a subset of customer data to a flash drive.

Consequently, their user entity mindset profile 630 may reflect a nervous, fearful, or guilty mindset, which is inconsistent with the entity state 634 of dealing with customer data in general. More particularly, downloading customer data late at night on a day the user is generally not in their primary office results in an entity state 634 that is likewise inconsistent with the user's typical user behavior. As a result, the EBC system 120 may infer that the user's behavior may represent a security threat. Those of skill in the art will recognize that many such embodiments and examples are possible. Accordingly, the foregoing is not intended to limit the spirit, scope or intent of the invention.

Certain embodiments of the invention reflect an appreciation that the quantity, and relevancy, of information contained in a particular EBP 638 may have a direct bearing on its analytic utility when attempting to determine the trustworthiness of an associated entity and whether or not they represent a security risk. As used herein, the quantity of information contained in a particular EBP 638 broadly refers to the variety and volume of EBP elements it may contain, and the frequency of their respective instances, or occurrences, related to certain aspects of an associated entity's identity and behavior. As used herein, an EBP element broadly refers to any data element stored in an EBP 638, as described in greater detail herein. In various embodiments, an EBP element may be used to describe a particular aspect of an EBP, such as certain user profile attributes 604, user behavior factors 610, user mindset factors 622, user entity mindset profile 630, non-user profile attributes 634, and entity state 636.

In certain embodiments, statistical analysis may be performed on the information contained in a particular EBP 638 to determine the trustworthiness of its associated entity and whether or not they represent a security risk. For example, a particular authentication factor 606, such as a biometric, may be consistently used by a user entity for authenticating their identity to their endpoint device. To continue the example, a user ID and password may be used by the same, or a different user entity, in an attempt to access the endpoint device. As a result, the use of a user ID and password may indicate a security risk due to its statistical infrequency. As another example, a user entity may consistently access three different systems on a daily basis in their role as a procurement agent. In this example, the three systems may include a financial accounting system, a procurement system, and an inventory control system. To continue the example, an attempt by the procurement agent to access a sales forecast system may appear suspicious if never attempted before, even if the purpose for accessing the system is legitimate.

As likewise used herein, the relevancy of information contained in a particular EBP 638 broadly refers to the pertinence of the EBP elements it may contain to certain aspects of an associated entity's identity and behavior. To continue the prior example, an EBP 638 associated with the procurement agent may contain certain user profile attributes 604 related to their title, position, role, and responsibilities, all or which may be pertinent to whether or not they have a legitimate need to access the sales forecast system. In certain embodiments, the user profile attributes 604 may be implemented to include certain job description information. To further continue the example, such job description information may have relevance when attempting to determine whether or not the associated entity's behavior is suspicious. In further continuance of the example, job description information related to the procurement agent may include their responsibility to check sales forecast data, as needed, to ascertain whether or not to procure certain items. In these embodiments, the method by which it is determined whether the information contained in a particular EBP 638 is of sufficient quantity and relevancy is a matter of design choice.

Various embodiments of the invention likewise reflect an appreciation that accumulating sufficient information in an EBP 638 to make such a determination may take a certain amount of time. Likewise, various embodiments of the invention reflect an appreciation that the effectiveness or accuracy of such a determination may rely upon certain entity behaviors occurring with sufficient frequency, or in identifiable patterns, or a combination thereof, during a particular period of time. As an example, there may not be sufficient occurrences of a particular type of entity behavior to determine if a new entity behavior is inconsistent with known past occurrences of the same type of entity behavior.

Various embodiments of the invention reflect an appreciation that a sparsely-populated EBP 638 may likewise result in exposure to certain security vulnerabilities. Various embodiments of the invention likewise reflect an appreciation that an EBP 638 may be particularly sparsely populated when first implemented. Furthermore, the relevance of such sparsely-populated information initially contained in an EBP 638 first implemented may not prove very useful when using an EBP 638 to determine the trustworthiness of an associated entity and whether or not they represent a security risk. Accordingly, certain embodiments reflect an appreciation that the implementation of a prepopulated EBP 678 may provide a sufficient quantity of relevant information to improve the analytic utility of an EBP 638 when initially implemented. As used herein, a prepopulated EBP 678 broadly refers to a collection of information that generically describes a particular entity's expected behavior, whether the behavior occurs within a physical realm or cyberspace.

In certain embodiments, an entity's expected behavior may be determined by using one or more existing EBPs 638 associated with similarly situated entities as a reference when generating a prepopulated EBP 678. As used herein, similarly situated entities broadly refer to entities whose associated EBP 638 contain one or more EBP elements sharing substantively similar entity characteristics associated with a target entity. As likewise used herein, entity characteristics broadly refer to characteristics that can be used to distinguish certain attributes associated with a particular entity. Likewise, substantively similar entity characteristics, as used herein, broadly refer to at least one equivalent entity characteristic, such as the same job title, same job description, same role, one or more of the same duties or responsibilities, and so forth.

In various embodiments, certain personal information 608, described in greater detail herein, may be anonymized, as likewise described in greater detail herein, and used as an entity characteristic. Examples of such anonymized entity characteristics may include name, gender, geographic location, citizenship, country of origin, and so forth. In certain embodiments, certain user mindset factors 622, such as an entity's personality type 624, may likewise be anonymized and used as an entity characteristic. In certain embodiments, EBPs 638 respectively associated with a collection of distinct entities may be processed to determine their respective entity characteristics. In certain embodiments, the resulting entity characteristics may be used to segment the collection of distinct entities into one or more groups of similarly situated entities.

In various embodiments, a particular entity characteristic may correspond to a user profile attribute, a user behavior factor, or a user mindset factor contained in an EBP 638 associated with one or more similarly situated entities. As an example, an organization may employ five financial analysts, each of which has an associated EBP 638 containing information related to their observed behavior. In this example, the information respectively related to the observed behavior of the financial analysts may be aggregated and normalized to determine, in general, the expected behavior of a financial analyst.

To continue the example, the resulting information related to the expected behavior of a financial analyst can then be used as baseline behavior information for populating a prepopulated EBP 678, which in turn can be associated with a newly-hired financial analyst as their EBP 638. It will be appreciated that the implementation of such baseline behavioral information in certain embodiments may provide a basis for comparing an entity's expected behavior to their observed behavior, and as a result, assist in the identification of suspicious behavior.

As another example, a security analytics system 118 may be implemented to provide various security services, described in greater detail herein, for a large public school system. In this example, one of the employees of the school system is their head dietician. One entity characteristic of the head dietician is they are a senior administrator in a public school system. Another entity characteristic is they are responsible for defining cost-effective, nutritional meals for students. Yet another entity characteristic is they are responsible for managing a multi-million dollar budget. Yet still another entity characteristic is they manage a staff numbering in the hundreds. An additional entity characteristic is they are authorized to access the school districts enterprise resource planning (ERP) system and make adjustments to budget projections.

In this example, the first entity characteristic may be used to identify a group of similarly situated entities whose associated EBP 638 signify they are an administrator in a public school system. Likewise, the second entity characteristic may be used to further refine the group of similarly situated entities to identify those entities whose associated EBP 638 signify they have the role of dietician in a school system, with associated meal planning responsibilities. In turn, the third entity characteristic may likewise be used to yet further refine the group of similarly situated entities to identify those entities whose associated EBP 638 signify they have a yearly budget responsibility exceeding one million dollars.

Additionally, the fourth entity characteristic may be used to yet still further refine the group of similarly situated entities to identify those entities whose associated EBP 638 signify they manage at least one hundred staff members. Finally, the fifth entity characteristic may be used to yet still further refine the group of similarly situated entities to identify those entities whose associated EBP 638 signify they have the right to access systems related to making revisions to their budget projections. To continue the example, the EBPs 638 associated with the resulting group of similarly situated entities may then be used as the basis to generate a prepopulated EBP 678 for the head dietician that matches their associated entity characteristics.

Certain embodiments of the invention reflect an appreciation that it may not always be possible to identify a similarly situated entity who's associated EBP 638 signify they have the same entity characteristics as a target entity. Accordingly, the EBPs 638 associated with two or more similarly situated entities may be used in certain embodiments to generate a prepopulated EBP 678 when their respective EBPs 638 signify they have at least one of the same entity characteristics as the target entity.

To continue the preceding example, a first similarly situated entity may have an associated EBP 638 signifying they are an administrator in a public school system, they have the role of dietician in a school system, with associated meal planning responsibilities, and they have a yearly budget responsibility exceeding one million dollars. Likewise, a second similarly situated entity may have an associated EBP 638 signifying they are an administrator in a public school system, they manage at least one hundred staff members, and they have the right to access systems related to making revisions to their budget projections. In continuance of this example the EBPs 638 respectively associated with the first and second similarly situated entities may be processed to generate a prepopulated EBP 678 for the head dietician that matches their associated entity characteristics.

Certain embodiments of the invention reflect an appreciation that the two or more similarly situated entities whose respective EBPs 638 are used to generate a prepopulated EBP 678 may or may not be associated. In further continuance of the preceding example, the first and second similarly situated entities may be associated with the same school system. Conversely, the first and second similarly situated entities may be associated with different school systems. Skilled practitioners of the art will recognize that many such embodiments and examples are possible. Accordingly, the foregoing is not intended to limit the spirit, scope, or intent of the invention.

In various embodiments, a prepopulated EBP 678 may be implemented to include certain parameters describing an entity's expected behavior. In various embodiments, certain entity characteristic information, such as job titles, descriptions, roles, duties, responsibilities, and so forth, may be used to define such parameters in a prepopulated EBP 678. In certain embodiments, such entity attribute information may be stored in a repository of entity attribute data 690. In various embodiments, a prepopulated EBP 678 may be implemented as an EBP 638 template. In certain of these embodiments, the EBP 638 template defines which information related to an entity's identity and behavioral will be collected by the EBP 638.

In certain embodiments, the information contained in, or referenced by, a prepopulated EBP 678 may be normalized across multiple entities. In various embodiments, certain personally-identifiable information (PII), described in greater detail herein, associated with such entities may be anonymized before its inclusion in a prepopulated EBP 678. In certain embodiments, the anonymization of such PII information may be performed by an entity data anonymization 688 module.

In certain embodiments, a prepopulated EBP 678 may be implemented to mirror the structure of a corresponding EBP 638. For example, as shown in FIG. 6a, an EBP 638 may be implemented to contain a user entity profile 602, a user entity mindset profile 630, a non-user entity profile 632, and an entity state 636. As likewise shown in FIG. 6b, a corresponding prepopulated EBP 678 may be implemented to contain a prepopulated user entity profile 642, a prepopulated user entity mindset profile 670, a prepopulated non-user entity profile 672, and a prepopulated entity state 676.

As shown in FIG. 6a, the user entity profile 602 of the EBP 638 may include certain user profile attributes 604, user behavior factors 610 and user mindset factors 622. Likewise, as shown in FIG. 6a, the user profile attributes 604 may include certain EBP elements related to authentication factors 606 and personal information 608. As likewise shown in FIG. 6a, the user behavior factors 610 may include certain EBP elements related to user access rights 612, user interactions 614, date/time/frequency 616, user location 618, and user gestures 620. Likewise, the user mindset factors 622 shown in FIG. 6a may include certain EBP elements related to personality type 624 and behavioral biometrics 626, while the non-user entity profile 632 may include certain EBP elements related to non-user profile attributes 634.

Likewise, as shown in FIG. 6b, the corresponding prepopulated EBP 678 may include certain prepopulated user profile attributes 644, prepopulated user behavior factors 650, and prepopulated user mindset factors 662. Likewise, as shown in FIG. 6b, the prepopulated user profile attributes 604 may include certain prepopulated EBP elements related to prepopulated authentication factors 646 and prepopulated personal information 648. As likewise shown in FIG. 6b, the corresponding prepopulated user behavior factors 610 may include certain prepopulated EBP elements related to prepopulated user access rights 652, prepopulated user interactions 654, prepopulated date/time/frequency 656, prepopulated user location 658, and prepopulated user gestures 660. Likewise, the prepopulated user mindset factors 622 shown in FIG. 6b may include certain prepopulated EBP elements related to prepopulated personality type 664 and prepopulated behavioral biometrics 668, while the prepopulated non-user entity profile 672 may include certain prepopulated EBP elements related to prepopulated non-user profile attributes 674.

As used herein, a prepopulated EBP element broadly refers to any data element stored in a prepopulated EBP 678. In certain embodiments, an EBP element stored in an EBP 638 associated with a particular entity may be used as a prepopulated EBP element in a corresponding prepopulated EBP 678. In certain embodiments one or more EBP elements respectively stored in one or more associate EBPs 638 may be used, individually or in combination, as prepopulated EBP elements in a prepopulated EBP 678. In certain embodiments, the entity data anonymization 688 module may be used to perform anonymization operations to anonymize certain EBP elements prior to being used as prepopulated EBP elements in a prepopulated EBP 678. Skilled practitioners of the art will recognize that many such embodiments are possible. Accordingly, the foregoing is not intended to limit the spirit, scope, or intent of the invention.

Figure 7A:
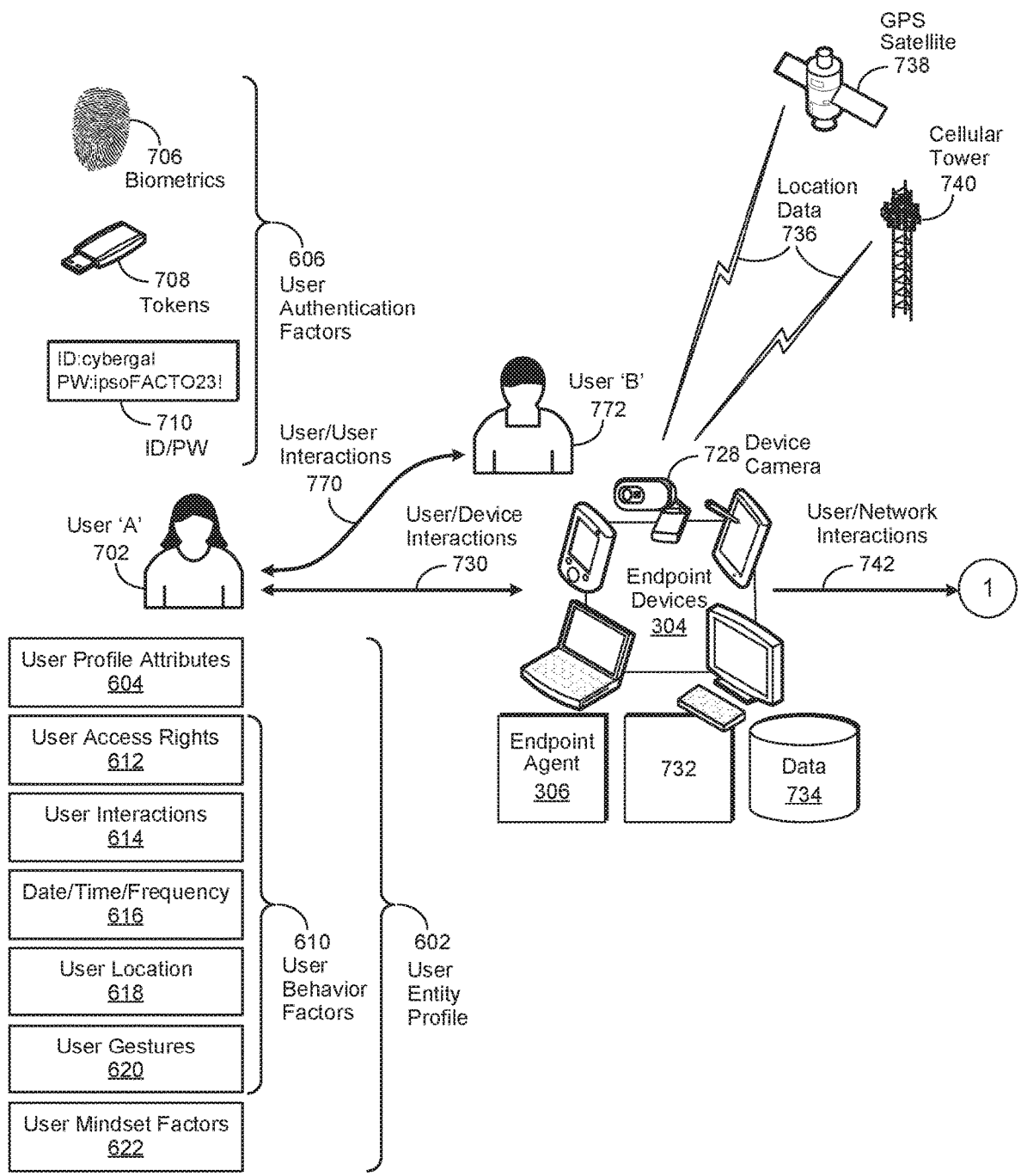
FIGS. 7a and 7b show a block diagram of a security analytics system environment.
Figure 7B:
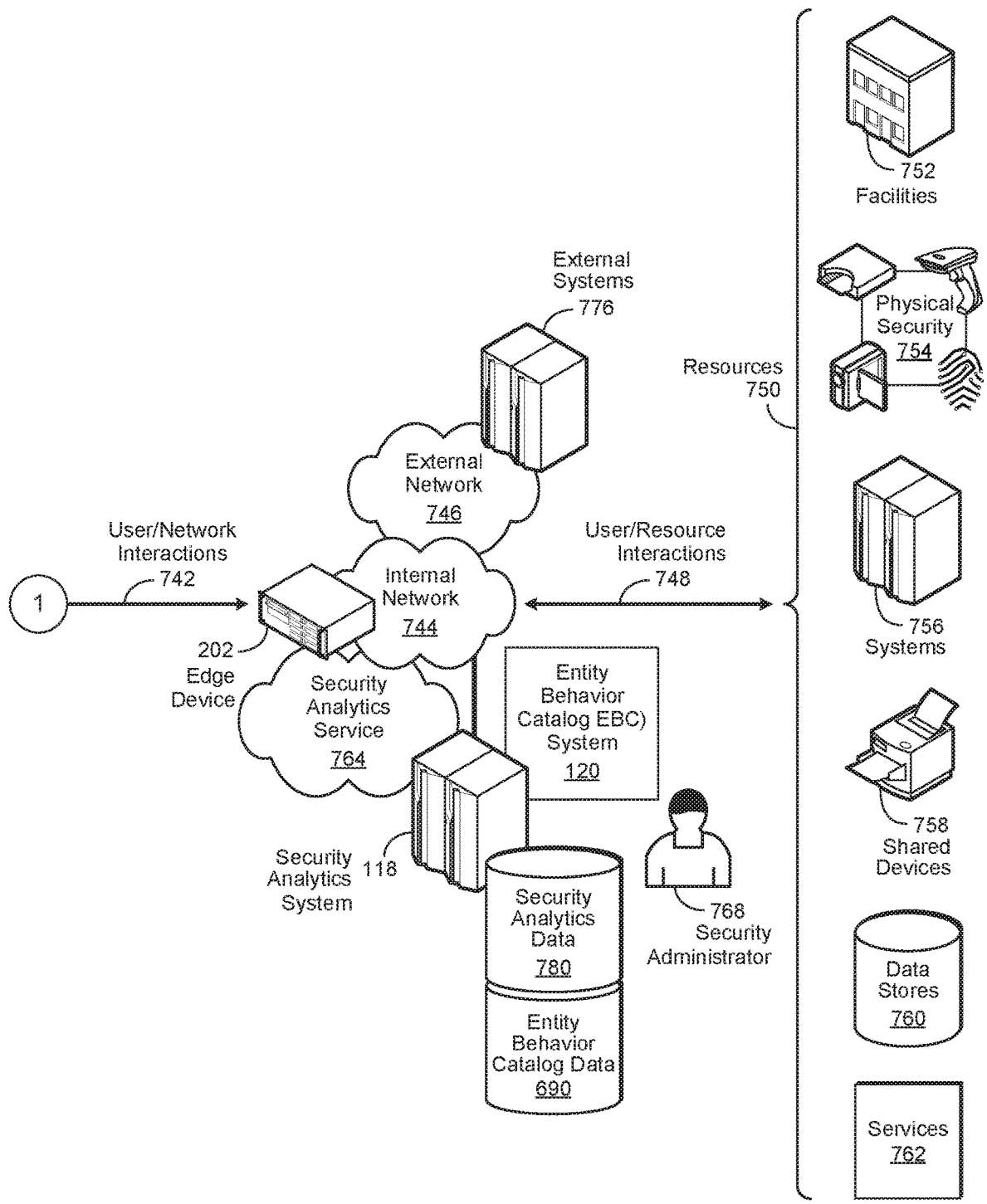

FIGS. 7a and 7b show a block diagram of a security analytics environment implemented in accordance with an embodiment of the invention. In certain embodiments, a security analytics system 118 may be implemented with an entity behavior catalog (EBC) system 120, described in greater detail herein. In certain embodiments, analyses performed by the security analytics system 118 may be used to identify behavior associated with a particular entity that may be of analytic utility. In certain embodiments, as likewise described in greater detail herein, the EBC system 120 may be used in combination with the security analytics system 120 to perform such analyses. In various embodiments, certain data stored in a repository of security analytics data, or a repository of EBC data 690, or both, may be used by the security analytics system 118, or the EBC system 120, or both, to perform the analyses.

In certain embodiments, the entity behavior of analytic utility may be identified at a particular point in time, during the occurrence of an event, the enactment of a user or non-user entity behavior, or a combination thereof. As used herein, an entity broadly refers to something that exists as itself, whether physically or abstractly. In certain embodiments, an entity may be a user entity, a non-user entity, or a combination thereof. In certain embodiments, a user entity may be an individual user, such as user 'A' 702 or 'B' 772, a group, an organization, or a government. In certain embodiments, a non-user entity may likewise be an item, a device, such as endpoint 304 and edge 202 devices, a network, such as an internal 744 and external 746 networks, a domain, an operation, or a process. In certain embodiments, a non-user entity may be a resource 750, such as a geographical location or formation, a physical facility 752, such as a venue, various physical security devices 754, a system 756, shared devices 758, such as printer, scanner, or copier, a data store 760, or a service 762, such as a service 762 operating in a cloud environment.

As likewise used herein, an event broadly refers to the occurrence of an action performed by an entity. In certain embodiments, the action may be directly associated with an entity behavior, described in greater detail herein. As an example, a first user may attach a binary file infected with a virus to an email that is subsequently sent to a second user.

In this example, the act of attaching the binary file to the email is directly associated with an entity behavior enacted by the first user. In certain embodiments, the action may be indirectly associated with an entity behavior. To continue the example, the recipient of the email may open the infected binary file, and as a result, infect their computer with malware. To further continue the example, the act of opening the infected binary file is directly associated with an entity behavior enacted by the second user. However, the infection of the email recipient's computer by the infected binary file is indirectly associated with the described entity behavior enacted by the second user.

In various embodiments, certain user authentication factors 606 may be used to authenticate the identity of a user entity. In certain embodiments, the user authentication factors 606 may be used to ensure that a particular user entity, such as user 'A' 702 or 'B' 772, is associated with their corresponding user entity profile 602, rather than a user entity profile 602 associated with another user. In certain embodiments, the user authentication factors 606 may include a user's biometrics 706 (e.g., a fingerprint or retinal scan), tokens 708 (e.g., a dongle containing cryptographic keys), user identifiers and passwords (ID/PW) 710, and personal identification numbers (PINs).

In certain embodiments, information associated with such user entity behavior may be stored in a user entity profile 602, described in greater detail herein. In certain embodiments, the user entity profile 602 may be stored in a repository of entity behavior catalog (EBC) data 690. In certain embodiments, as likewise described in greater detail herein, the user entity profile 602 may include user profile attributes 604, user behavior factors 610, user mindset factors 622, or a combination thereof. As used herein, a user profile attribute 604 broadly refers to data or metadata that can be used, individually or in combination with other user profile attributes 604, user behavior factors 610, or user mindset factors 622, to ascertain the identity of a user entity. In various embodiments, certain user profile attributes 604 may be uniquely associated with a particular user entity.

As likewise used herein, a user behavior factor 610 broadly refers to information associated with a user's behavior, whether the behavior occurs within a physical realm or cyberspace. In certain embodiments, the user behavior factors 610 may include the user's access rights 612, the user's interactions 614, and the date/time/frequency 616 of those interactions 614. In certain embodiments, the user behavior factors 610 may likewise include the user's location 618 when the interactions 614 are enacted, and the user gestures 620 used to enact the interactions 614.

In various embodiments, certain date/time/frequency 616 user behavior factors 610 may be implemented as ontological or societal time, or a combination thereof. As used herein, ontological time broadly refers to how one instant in time relates to another in a chronological sense. As an example, a first user behavior enacted at 12:00 noon on May 17, 2017 may occur prior to a second user behavior enacted at 6:39 PM on May 18, 2018. Skilled practitioners of the art will recognize one value of ontological time is to determine the order in which various user behaviors have been enacted.

As likewise used herein, societal time broadly refers to the correlation of certain user profile attributes 604, user behavior factors 610, user mindset factors 622, or a combination thereof, to one or more instants in time. As an example, user 'A' 702 may access a particular system 756 to download a customer list at 3:47 PM on Nov. 3, 2017. Analysis of their user behavior profile indicates that it is not unusual for user 'A' 702 to download the customer list on a weekly basis.

However, examination of their user behavior profile also indicates that user 'A' 702 forwarded the downloaded customer list in an email message to user 'B' 772 at 3:49 PM that same day. Furthermore, there is no record in their user behavior profile that user 'A' 702 has ever communicated with user 'B' 772 in the past. Moreover, it may be determined that user 'B' 872 is employed by a competitor. Accordingly, the correlation of user 'A' 702 downloading the customer list at one point in time, and then forwarding the customer list to user 'B' 772 at a second point in time shortly thereafter, is an example of societal time.

In a variation of the prior example, user 'A' 702 may download the customer list at 3:47 PM on Nov. 3, 2017. However, instead of immediately forwarding the customer list to user 'B' 772, user 'A' 702 leaves for a two week vacation. Upon their return, they forward the previously-downloaded customer list to user 'B' 772 at 9:14 AM on Nov. 20, 2017. From an ontological time perspective, it has been two weeks since user 'A' 702 accessed the system 756 to download the customer list. However, from a societal time perspective, they have still forwarded the customer list to user 'B' 772, despite two weeks having elapsed since the customer list was originally downloaded.

Accordingly, the correlation of user 'A' 702 downloading the customer list at one point in time, and then forwarding the customer list to user 'B' 772 at a much later point in time, is another example of societal time. More particularly, it may be inferred that the intent of user 'A' 702 did not change during the two weeks they were on vacation. Furthermore, user 'A' 702 may have attempted to mask an intended malicious act by letting some period of time elapse between the time they originally downloaded the customer list and when they eventually forwarded it to user 'B' 772. From the foregoing, those of skill in the art will recognize that the use of societal time may be advantageous in determining whether a particular entity behavior is of analytic utility. As used herein, mindset factors 622 broadly refer to information used to infer the mental state of a user at a particular point in time, during the occurrence of an event, an enactment of a user behavior, or combination thereof.

In certain embodiments, the security analytics system 118 may be implemented to process certain entity attribute information, described in greater detail herein, associated with providing resolution of the identity of an entity at a particular point in time. In various embodiments, the security analytics system 118 may be implemented to use certain entity identifier information, likewise described in greater detail herein, to ascertain the identity of an associated entity at a particular point in time. In various embodiments, the entity identifier information may include certain temporal information, described in greater detail herein. In certain embodiments, the temporal information may be associated with an event associated with a particular point in time.

In certain embodiments, the security analytics system 118 may be implemented to use information associated with certain entity behavior elements to resolve the identity of an entity at a particular point in time. An entity behavior element, as used herein, broadly refers to a discrete element of an entity's behavior during the performance of a particular operation in a physical realm, cyberspace, or a combination thereof. In certain embodiments, such entity behavior elements may be associated with a user/device 730, a user/network 742, a user/resource 748, a user/user 770 interaction, or a combination thereof.

As an example, user 'A' 702 may use an endpoint device 304 to browse a particular web page on a news site on an external system 776. In this example, the individual actions performed by user 'A' 702 to access the web page are entity behavior elements that constitute an entity behavior, described in greater detail herein. As another example, user 'A' 702 may use an endpoint device 304 to download a data file from a particular system 756. In this example, the individual actions performed by user 'A' 702 to download the data file, including the use of one or more user authentication factors 606 for user authentication, are entity behavior elements that constitute an entity behavior. In certain embodiments, the user/device 730 interactions may include an interaction between a user, such as user 'A' 702 or 'B' 772, and an endpoint device 304.

In certain embodiments, the user/device 730 interaction may include interaction with an endpoint device 304 that is not connected to a network at the time the interaction occurs. As an example, user 'A' 702 or 'B' 772 may interact with an endpoint device 304 that is offline, using applications 732, accessing data 734, or a combination thereof, it may contain. Those user/device 730 interactions, or their result, may be stored on the endpoint device 304 and then be accessed or retrieved at a later time once the endpoint device 304 is connected to the internal 744 or external 746 networks. In certain embodiments, an endpoint agent 306 may be implemented to store the user/device 730 interactions when the user device 304 is offline.

In certain embodiments, an endpoint device 304 may be implemented with a device camera 728. In certain embodiments, the device camera 728 may be integrated into the endpoint device 304. In certain embodiments, the device camera 728 may be implemented as a separate device configured to interoperate with the endpoint device 304. As an example, a webcam familiar to those of skill in the art may be implemented receive and communicate various image and audio signals to an endpoint device 304 via a Universal Serial Bus (USB) interface.

In certain embodiments, the device camera 728 may be implemented to capture and provide user/device 730 interaction information to an endpoint agent 306. In various embodiments, the device camera 728 may be implemented to provide surveillance information related to certain user/device 730 or user/user 770 interactions. In certain embodiments, the surveillance information may be used by the security analytics system 118 to detect entity behavior associated with a user entity, such as user 'A' 702 or user 'B' 772 that may be of analytic utility.

In certain embodiments, the endpoint device 304 may be used to communicate data through the use of an internal network 744, an external network 746, or a combination thereof. In certain embodiments, the internal 744 and the external 746 networks may include a public network, such as the Internet, a physical private network, a virtual private network (VPN), or any combination thereof. In certain embodiments, the internal 744 and external 746 networks may likewise include a wireless network, including a personal area network (PAN), based on technologies such as Bluetooth. In various embodiments, the wireless network may include a wireless local area network (WLAN), based on variations of the IEEE 802.11 specification, commonly referred to as WiFi. In certain embodiments, the wireless network may include a wireless wide area network (WWAN) based on an industry standard including various 3G, 4G and 5G technologies.

In certain embodiments, the user/user 770 interactions may include interactions between two or more user entities, such as user 'A' 702 and 'B' 772. In certain embodiments, the user/user interactions 770 may be physical, such as a face-to-face meeting, via a user/device 730 interaction, a user/network 742 interaction, a user/resource 748 interaction, or some combination thereof. In certain embodiments, the user/user 770 interaction may include a face-to-face verbal exchange. In certain embodiments, the user/user 770 interaction may include a written exchange, such as text written on a sheet of paper. In certain embodiments, the user/user 770 interaction may include a face-to-face exchange of gestures, such as a sign language exchange.

In certain embodiments, temporal event information associated with various user/device 730, user/network 742, user/resource 748, or user/user 770 interactions may be collected and used to provide real-time resolution of the identity of an entity at a particular point in time. Those of skill in the art will recognize that many such examples of user/device 730, user/network 742, user/resource 748, and user/user 770 interactions are possible. Accordingly, the foregoing is not intended to limit the spirit, scope or intent of the invention.

In various embodiments, the security analytics system 118 may be implemented to process certain contextual information in the performance of certain security analytic operations. As used herein, contextual information broadly refers to any information, directly or indirectly, individually or in combination, related to a particular entity behavior. In certain embodiments, entity behavior may include a user entity's physical behavior, cyber behavior, or a combination thereof. As likewise used herein, a user entity's physical behavior broadly refers to any user behavior occurring within a physical realm, such as speaking, gesturing, facial patterns or expressions, walking, and so forth. More particularly, such physical behavior may include any action enacted by an entity user that can be objectively observed, or indirectly inferred, within a physical realm. In certain embodiments, the objective observation, or indirect inference, of the physical behavior may be performed electronically.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable user behavior broadly refers to any behavior exhibited or enacted by a user entity that can be observed through the use of an electronic device (e.g., an electronic sensor), a computing device or system (e.g., an endpoint 304 or edge 202 device, a physical security device 754, a system 756, a shared device 758, etc.), computer instructions (e.g., a software application), or a combination thereof.

Cyber behavior, as used herein, broadly refers to any behavior occurring in cyberspace, whether enacted by an individual user, a group of users, or a system acting at the behest of an individual user, a group of users, or other entity. More particularly, cyber behavior may include physical, social, or mental actions that can be objectively observed, or indirectly inferred, within cyberspace. As an example, a user may use an endpoint device 304 to access and browse a particular website on the Internet. In this example, the individual actions performed by the user to access and browse the website constitute a cyber behavior. As another example, a user may use an endpoint device 304 to download a data file from a particular system 756 at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, which makes them electronically-observable.

In certain embodiments, the contextual information may include location data 736. In certain embodiments, the endpoint device 304 may be configured to receive such location data 736, which is used as a data source for determining the user's location 618. In certain embodiments, the location data 736 may include Global Positioning System (GPS) data provided by a GPS satellite 738. In certain embodiments, the location data 736 may include location data 736 provided by a wireless network, such as from a cellular network tower 740. In certain embodiments (not shown), the location data 736 may include various Internet Protocol (IP) or other network address information assigned to the endpoint 304 or edge 202 device. In certain embodiments (also not shown), the location data 736 may include recognizable structures or physical addresses within a digital image or video recording.

In certain embodiments, the endpoint devices 304 may include an input device (not shown), such as a keypad, magnetic card reader, token interface, biometric sensor, and so forth. In certain embodiments, such endpoint devices 304 may be directly, or indirectly, connected to a particular facility 752, physical security device 754, system 756, or shared device 758. As an example, the endpoint device 304 may be directly connected to an ingress/egress system, such as an electronic lock on a door or an access gate of a parking garage. As another example, the endpoint device 304 may be indirectly connected to a physical security device 754 through a dedicated security network.

In certain embodiments, the security analytics system 118 may be implemented to perform various risk-adaptive protection operations. Risk-adaptive, as used herein, broadly refers to adaptively responding to risks associated with an electronically-observable entity behavior. In various embodiments, the security analytics system 118 may be implemented to perform certain risk-adaptive protection operations by monitoring certain entity behaviors, assess the corresponding risk they may represent, individually or in combination, and respond with an associated response. In certain embodiments, such responses may be based upon contextual information, described in greater detail herein, associated with a given entity behavior.

In certain embodiments, various information associated with a user entity profile 602, likewise described in greater detail herein, may be used to perform the risk-adaptive protection operations. In certain embodiments, the user entity profile 602 may include user profile attributes 604, user behavior factors 610, user mindset factors 622, or a combination thereof. In these embodiments, the information associated with a user entity profile 602 used to perform the risk-adaptive protection operations is a matter of design choice.

In certain embodiments, the security analytics system 118 may be implemented as a stand-alone system. In certain embodiments, the security analytics system 118 may be implemented as a distributed system. In certain embodiment, the security analytics system 118 may be implemented as a virtual system, such as an instantiation of one or more virtual machines (VMs). In certain embodiments, the security analytics system 118 may be implemented as a security analytics service 764. In certain embodiments, the security analytics service 764 may be implemented in a cloud environment familiar to those of skill in the art. In various embodiments, the security analytics system 118 may use data stored in a repository of security analytics data 880 in the performance of certain security analytics operations, described in greater detail herein. Those of skill in the art will recognize that many such embodiments are possible. Accordingly, the foregoing is not intended to limit the spirit, scope or intent of the invention.

Figure 8:
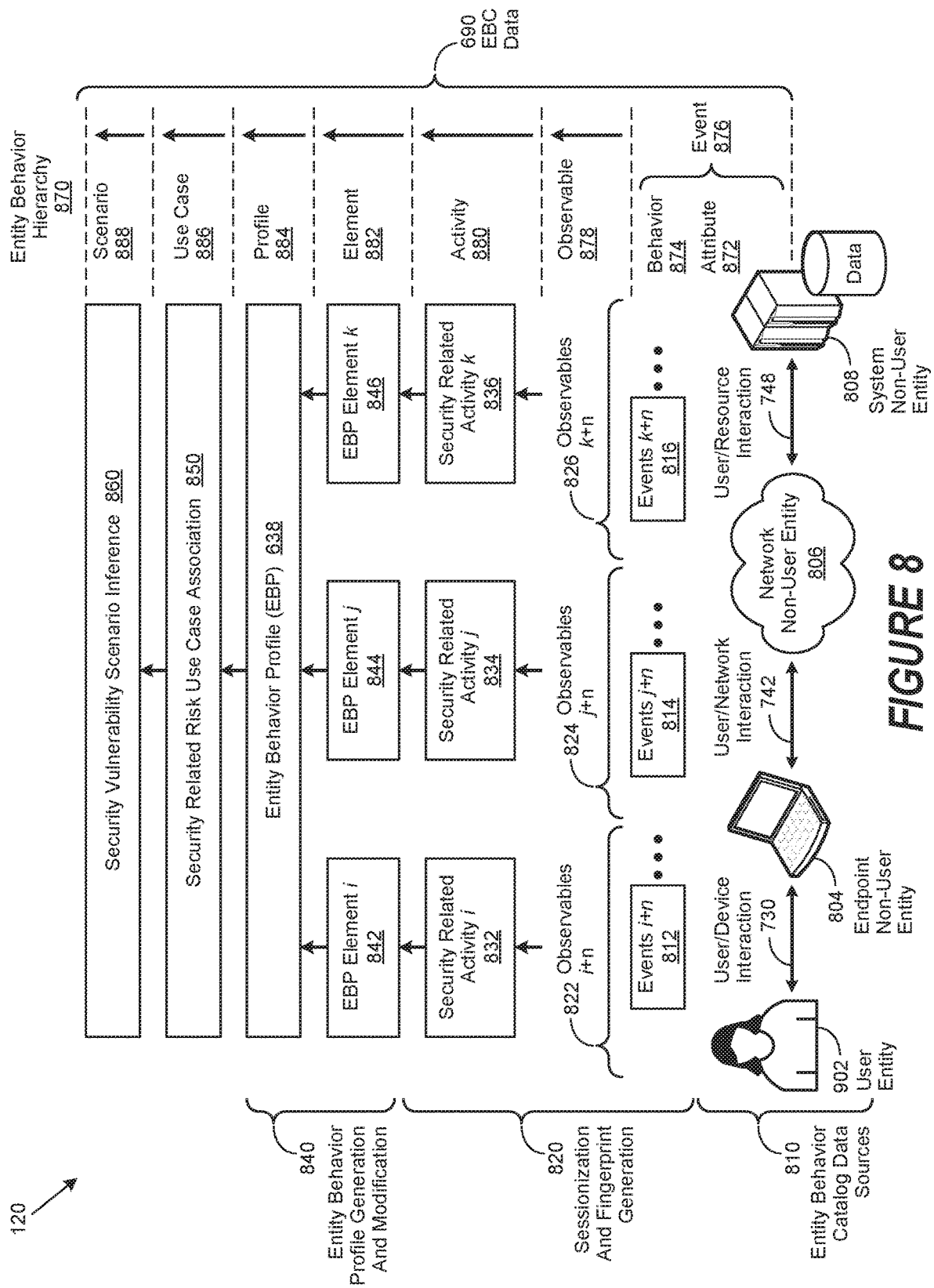
FIG. 8 is a simplified block diagram showing the mapping of an event to a security vulnerability scenario.

FIG. 8 is a simplified block diagram showing the mapping of an event to a security vulnerability scenario implemented in accordance with an embodiment of the invention. In certain embodiments, an entity behavior catalog (EBC) system 120 may be implemented to identify a security related activity, described in greater detail herein. In certain embodiments, the security related activity may be based upon an observable, likewise described in greater detail herein. In certain embodiments, the observable may include event information corresponding to electronically-observable behavior enacted by an entity. In certain embodiments, the event information corresponding to electronically-observable behavior enacted by an entity may be received from an electronic data source, such as the EBC data sources 810 shown in FIGS. 6*a*, 8, 16, and 17*b*.

In certain embodiments, as likewise described in greater detail herein, the EBC system 120 may be implemented to identify a particular event of analytic utility by analyzing an associated security related activity. In certain embodiments, the EBC system 120 may be implemented to generate entity behavior catalog data based upon an identified event of analytic utility associated with a particular security related activity. In various embodiments, the EBC system 120 may be implemented to associate certain entity behavior data it may generate with a predetermined abstraction level, described in greater detail herein.

In various embodiments, the EBC system 120 may be implemented to use certain EBC data 690 and an associated abstraction level to generate a hierarchical set of entity behaviors 870, described in greater detail herein. In certain embodiments, the hierarchical set of entity behaviors 870 generated by the EBC system 120 may represent an associated security risk, likewise described in greater detail herein. Likewise, as described in greater detail herein, the EBC system 120 may be implemented in certain embodiments to store the hierarchical set of entity behaviors 870 and associated abstraction level information within a repository of EBC data 690. In certain embodiments, the repository of EBC data 690 may be implemented to provide an inventory of entity behaviors for use when performing a security operation, likewise described in greater detail herein.

Referring now to FIG. 8, the EBC system 120 may be implemented in various embodiments to receive certain event information, described in greater detail herein, corresponding to an event associated with an entity interaction. As used herein, event information broadly refers to any information directly or indirectly related to an event. As likewise used herein, an event broadly refers to the occurrence of at least one action performed by an entity. In certain embodiments, the at least one action performed by an entity may include the enactment of an entity behavior, described in greater detail herein. In certain embodiments, the entity behavior may include an entity's physical behavior, cyber behavior, or a combination thereof, as likewise described in greater detail herein.

Likewise, as used herein, an entity interaction broadly refers to an action influenced by another action enacted by an entity. As an example, a first user entity may perform an action, such as sending a text message to a second user entity, who in turn replies with a response. In this example, the second user entity's action of responding is influenced by the first user entity's action of sending the text message. In certain embodiments, an entity interaction may include the occurrence of at least one event enacted by one entity when interacting with another, as described in greater detail herein. In certain embodiments, an event associated with an entity interaction may include at least one entity attribute, described in greater detail herein, and at least one entity behavior, likewise described in greater detail herein.

In certain embodiments, an entity attribute and an entity behavior may be respectively abstracted to an entity attribute 872 and an entity behavior 874 abstraction level. In certain embodiments, an entity attribute 872 and an entity behavior 874 abstraction level may then be associated with an event 876 abstraction level. In certain embodiments, the entity attribute 872, entity behavior 874, and event 876 abstraction levels may in turn be associated with a corresponding entity behavior hierarchy 870, as described in greater detail herein.

In various embodiments, the event information may be received from certain EBC data sources 810, such as a user 802 entity, an endpoint 804 non-user entity, a network 806 non-user entity, or a system 808 non-user entity. In certain embodiments, one or more events may be associated with a particular entity interaction. As an example, as shown in FIG. 8, one or more events i+n 812 may be associated with a user/device 730 interaction between a user 802 entity and an endpoint 904 non-user entity. Likewise, one or more events j+n 814 may be associated with a user/network 742 interaction between a user 802 entity and a network 806 non-user entity. As likewise shown in FIG. 8, one or more events k+n 916 816 may be associated with a user/resource 748 interaction between a user 802 entity and a system 808 non-user entity.

In certain embodiments, details of an event, such as events i+n 812, j+n 814, and k+n 816, may be included in their associated event information. In various embodiments, as described in greater detail herein, analytic utility detection operations may be performed on such event information to identify events of analytic utility. In various embodiments, certain event information associated with an event determined to be of analytic utility may be used to derive a corresponding observable. As used herein, an observable broadly refers to an event of analytic utility whose associated event information may include entity behavior that may be anomalous, abnormal, unexpected, malicious, or some combination thereof, as described in greater detail herein.

As an example, the details contained in the event information respectively corresponding to events i+n 812, j+n 814, and k+n 816 may be used to derive observables i+n 822, j+n 824, and k+n 826. In certain embodiments, the resulting observables i+n 822, j+n 824, and k+n 826 may then be respectively associated with a corresponding observable 878 abstraction level. In certain embodiments, the observable 878 abstraction level may in turn be associated with a corresponding entity behavior hierarchy 870, as described in greater detail herein.

In certain embodiments, the resulting observables may in turn be processed to generate an associated security related activity. As used herein, a security related activity broadly refers to an abstracted description of an interaction between two entities, described in greater detail herein, which may represent anomalous, abnormal, unexpected, malicious entity behavior. For example, observables i+n 822, j+n 824, and k+n 826 may in turn be processed to generate corresponding security related activities i 832, j 834, and k 836. In certain embodiments, the resulting security related activities, i 832, j 834, and k 836 may then be respectively associated with a corresponding security related activity 880 abstraction level. In certain embodiments, the security related activity 880 abstraction level may in turn be associated with a corresponding entity behavior hierarchy 870, as described in greater detail herein.

In various embodiments, sessionization and fingerprint generation operations 820, described in greater detail herein, may be performed to associate certain events, observables, and security related activities, or a combination thereof, with a corresponding session, likewise described in greater detail herein. As an example, events i+n 812, j+n 814, k+n 816, observables i+n 822, j+n 824, k+n 826, and security related activities i 832, j 834, k 836 may be associated with corresponding sessions. In certain embodiments, a security related activity may be processed with associated contextual information, described in greater detail herein, to generate a corresponding EBP element.

For example, security related activities i 832, j 834, and k 836 may be processed with associated contextual information to generate corresponding EBP elements i 842, j 844, and k 846. In various embodiments, the resulting EBP elements i 842, j 844, and k 846 may then be associated with a corresponding EBP element 882 abstraction level. In certain embodiments, the EBP element 882 abstraction level may in turn be associated with a corresponding entity behavior hierarchy 870, as described in greater detail herein.

In certain embodiments, EBP generation and modification 840 operations may be performed to associate one or more EBP elements with a particular EBP 638. As an example, EBP elements i 842, j 844, and k 946 may be associated with a particular EBP 638, which may likewise be respectively associated with the various entities involved in the user/device 730, user/network 742, or user/resource 748 interactions. In these embodiments, the method by which the resulting EBP elements i 842, j 844, and k 846 are associated with a particular EBP 638 is a matter of design choice. In certain embodiments, the EBP 638 may likewise associated with an EBP 884 abstraction level. In certain embodiments, the EBP 884 abstraction level may in turn be associated with a corresponding entity behavior hierarchy 870, as described in greater detail herein.

In various embodiments, the resulting EBP 638 may be used in the performance of security risk use case association 850 operations to identify one or more security risk use cases that match certain entity behavior information stored in the EBP 638. As used herein, a security risk use case broadly refers to a set of security related activities that create a security risk narrative that can be used to adaptively draw inferences, described in greater detail herein, from entity behavior enacted by a particular entity. In certain of these embodiments, the entity behavior information may be stored within the EBP 638 in the form of an EBP element, a security related activity, an observable, or an event, or a combination thereof. In certain embodiments, the security risk use case association operations may be performed by the security risk use case management 128 module of the EBC system 120 described in the text associated with FIG. 6a. In certain embodiments, identified security risk use cases may then be associated with a security risk use case 886 abstraction level. In certain embodiments, the security risk use case 886 abstraction level may in turn be associated with a corresponding entity behavior hierarchy 870, as described in greater detail herein.

In certain embodiments, the results of the security risk use case association 850 operations may in turn be used to perform security vulnerability scenario inference 860 operations to associate one or more security risk use cases with one or more security vulnerability scenarios. As used herein, a security vulnerability scenario broadly refers to a grouping of one or more security risk use cases that represent a particular class of security vulnerability. In certain embodiments, the security vulnerability scenario association operations may be performed by the security vulnerability scenario management 126 module of the EBC system 120 described in the text associated with FIG. 6*a*. In certain embodiments, the associated security vulnerability scenarios may then be associated with a security vulnerability scenario 888 abstraction level. In certain embodiments, the security vulnerability scenario 888 abstraction level may in turn be associated with a corresponding entity behavior hierarchy 870, as described in greater detail herein.

In various embodiments, certain event information associated with events i+n 812, j+n 814, and k+n 816 and certain observable information associated with observables i+n 822, j+n 824, and k+n 826 may be stored in a repository of EBC data 690. In various embodiments, certain security related activity information associated with security related activities i 832, j 834, and k 836 and EBP elements i 842, j 844, and k 846 may likewise be stored in the repository of EBC data 690. Likewise, in various embodiments, certain security risk use case association and security vulnerability scenario association information respectively associated with the performance of security risk use case association 850 and security vulnerability scenario inference 860 operations may be stored in the repository of EBC data 690.

Figure 9:
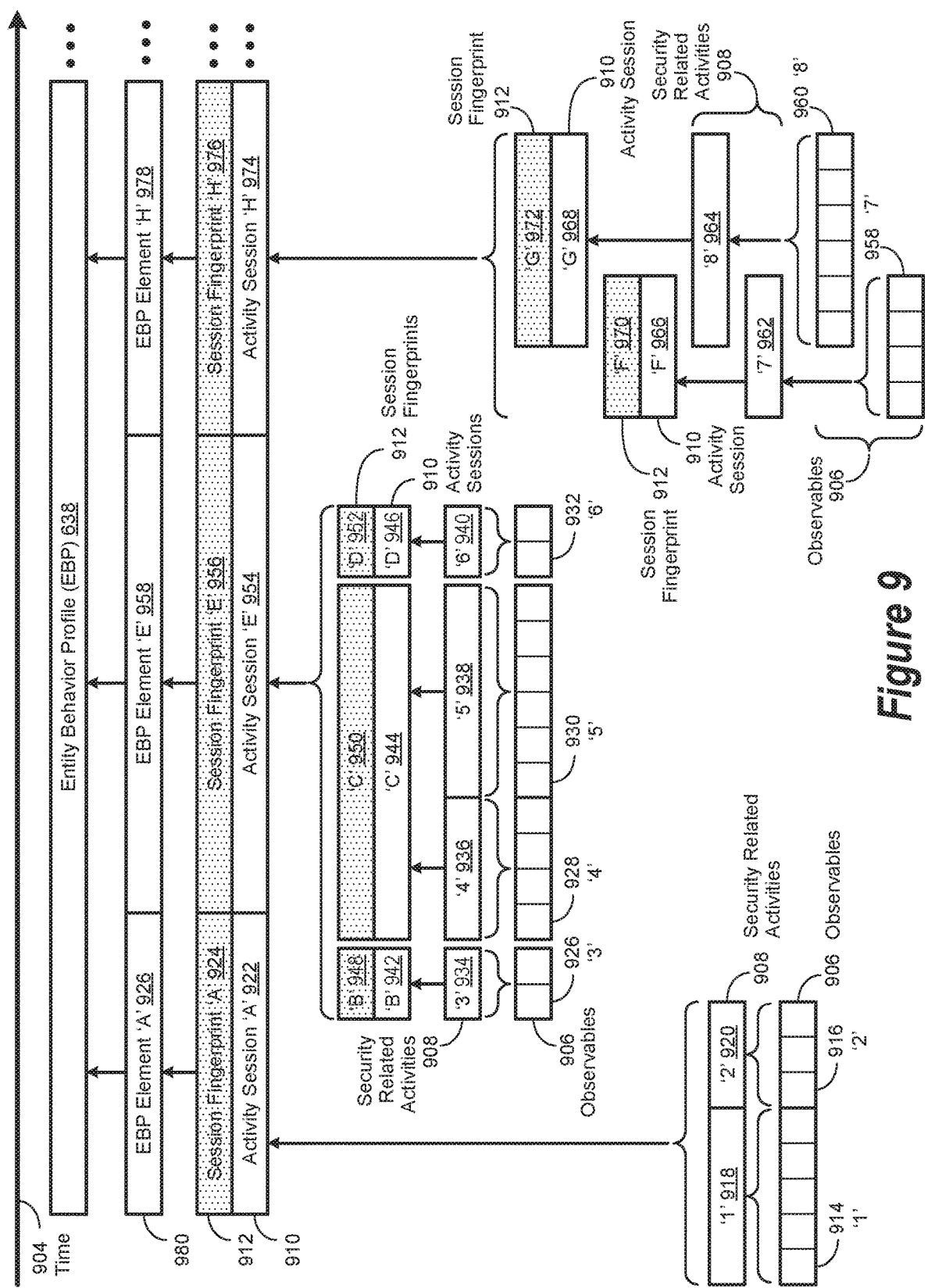
FIG. 9 is a simplified block diagram of the generation of a session and a corresponding session-based fingerprint.

FIG. 9 is a simplified block diagram of the generation of a session and a corresponding session-based fingerprint implemented in accordance with an embodiment of the invention. In certain embodiments, an observable 906 may be derived from an associated event, as described in greater detail herein. In certain embodiments, one or more observables 906 may be processed to generate a corresponding security related activity 908. In certain embodiments, one or more security related activities 908 may then be respectively processed to generate a corresponding activity session 910. In turn, the session 910 may be processed in certain embodiments to generate a corresponding session fingerprint 912. In certain embodiments, the resulting activity session 910 and its corresponding session fingerprint 912, individually or in combination, may then be associated with a particular entity behavior profile (EBP) element 980. In certain embodiments the EBP element 980 may in turn be associated with an EBP 638.

In certain embodiments, intervals in time 904 respectively associated with various security related activities 908 may be contiguous. For example, as shown in FIG. 9, the intervals in time 904 associated with observables 906 '1' 914 and '2' 916 may be contiguous. Accordingly, the intervals in time 904 associated with the security related activities 908 '1' 918 and '2' 920 respectively generated from observables 906 '1' 914 and '2' 916 would likewise be contiguous.

As likewise shown in FIG. 9, the resulting security related activities 908 '1' 918 and '2' 920 may be processed to generate an associated activity session 'A' 922, which then may be processed to generate a corresponding session fingerprint 'A' 924. In certain embodiments, activity session 'A' 922 and its corresponding session fingerprint 'A' 924 may be used to generate a new entity behavior profile (EBP) element 980 'A' 926. In certain embodiments, EBP element 980 'A' 926 generated from activity session 910 'A' 922 and its corresponding session fingerprint 912 'A' 924 may be associated with an existing EBP 638.

To provide an example, a user may enact various observables 906 '1' 914 to update sales forecast files, followed by the enactment of various observables 906 '2' 1016 to attach the updated sales forecast files to an email, which is then sent to various co-workers. In this example, the enactment of observables 906 '1' 914 and '2' 916 result in the generation of security related activities 908 '1' 918 and '2' 920, which in turn are used to generate activity session 910 'A' 922. In turn, the resulting activity session 910 'A' 922 is then used to generate its corresponding session-based fingerprint 912 'A' 924. To continue the example, activity session 910 'A' 922 is associated with security related activities 908 '1' 918 and '2' 920, whose associated intervals in time 904 are contiguous, as they are oriented to the updating and distribution of sales forecast files via email.

Various aspects of the invention reflect an appreciation that a user may enact certain entity behaviors on a recurring basis. To continue the preceding example, a user may typically update sales forecast files and distribute them to various co-workers every morning between 8:00 AM and 10:00 AM. Accordingly, the activity session 910 associated with such a recurring activity may result in a substantively similar session fingerprint 912 week-by-week. However, a session fingerprint 912 for the same session 910 may be substantively different should the user happen to send an email with an attached sales forecast file to a recipient outside of their organization. Consequently, a session fingerprint 912 that is inconsistent with session fingerprints 912 associated with past activity sessions 910 may indicate anomalous, abnormal, unexpected or malicious behavior.

In certain embodiments, two or more activity sessions 910 may be noncontiguous, but associated. In certain embodiments, an activity session 910 may be associated with two or more sessions 910. In certain embodiments, an activity session 910 may be a subset of another activity session 910. As an example, as shown in FIG. 9, the intervals in time 904 respectively associated with observables 906 '3' 914 and '6' 932 may be contiguous. Likewise, the intervals in time 904 associated with observables 906 '4' 936 and '5' 938 may be contiguous.

Accordingly, the intervals in time 904 associated with the security related activities 908 '4' 936 and '5' 938 respectively generated from observables 906 '4' 928 and '5' 930 would likewise be contiguous. However, the intervals in time 904 associated with security related activities 908 '4' 936 and '5' 938 would not be contiguous with the intervals in time respectively associated with security related activities 908 '3' 934 and '6' 940.

As likewise shown in FIG. 9, the resulting security related activities 908 '3' 934 and '6' 940 may be respectively processed to generate corresponding sessions 'B' 942 and 'D' 946, while security related activities 908 '4' 936 and '5' 938 may be processed to generate activity session 910 'C' 944. In turn, activity sessions 910 'B' 942, 'C' 944, and 'D' 946 are then respectively processed to generate corresponding session-based fingerprints 912 'B' 948, 'C' 950 and 'D' 952.

Accordingly, the intervals of time 904 respectively associated with activity sessions 910 'B' 942, 'C' 944, and 'D' 946, and their corresponding session fingerprints 912 'B' 948, 'C' 950 and 'D' 952, are not contiguous. Furthermore, in this example activity sessions 910 'B' 942, 'C' 944, and 'D' 946, and their corresponding session fingerprints 912 'B' 948, 'C' 950 and 'D' 952, are not associated with the EBP 638. Instead, as shown in FIG. 9, activity sessions 910 'B'

942, 'C' 944, and 'D' 946 are processed to generate activity session 910 'E' 954 and session fingerprints 912 'B' 948, 'C' 950 and 'D' 952 are processed to generate session fingerprint 912 'E' 956. In certain embodiments, activity session 'E' 954 and its corresponding session fingerprint 'E' 956 may be used to generate a new EBP element 980 'E' 958. In certain embodiments, EBP element 980 'E' 958 generated from activity session 910 'E' 954 and its corresponding session fingerprint 912 'E' 956 may be associated with an existing EBP 638.

Accordingly, session 910 'E' 1054 is associated with activity sessions 910 'B' 942, 'C' 944, and 'D' 946. Likewise, sessions 910 'B' 942, 'C' 944, and 'D' 946 are subsets of session 910 'E' 954. Consequently, while the intervals of time respectively associated with activity sessions 910 'B' 942, 'C' 944, and 'D' 946, and their corresponding session fingerprints 912 'B' 948, 'C' 950 and 'D' 952 may not be contiguous, they are associated as they are respectively used to generate session 910 'E' 954 and its corresponding session fingerprint 912 'E' 1056.

To provide an example, a user plans to attend a meeting scheduled for 10:00 AM at a secure facility owned by their organization to review a project plan with associates. However, the user wishes to arrive early to prepare for the meeting. Accordingly, they arrive at 9:00 AM and use their security badge to authenticate themselves and enter the facility. In this example, the enactment of observables 906 '3' 926 may correspond to authenticating themselves with their security badge and gaining access to the facility. As before, observables 906 '3' 926 may be used to generate a corresponding security related activity 908 '3' 934. In turn, the security related activity 908 '3' 934 may then be used to generate session 910 'B' 942, which is likewise used in turn to generate a corresponding session fingerprint 912 'B' 948.

The user then proceeds to a conference room reserved for the meeting scheduled for 10:00 AM and uses their time alone to prepare for the upcoming meeting. Then, at 10:00 AM, the scheduled meeting begins, followed by the user downloading the current version of the project plan, which is then discussed by the user and their associate for a half hour. At the end of the discussion, the user remains in the conference room and spends the next half hour making revisions to the project plan, after which it is uploaded to a datastore for access by others.

In this example, observables 906 '4' 928 may be associated with the user downloading and reviewing the project plan and observables 906 '5' 930 may be associated with the user making revisions to the project plan and then uploading the revised project plan to a datastore. Accordingly, behavior elements 906 '4' 928 and '5' 930 may be respectively used to generate security related activities 908 '4' 936 and '5' 938. In turn, the security related activities 908 '4' 936 and '5' 938 may then be used to generate session 910 'C' 944, which may likewise be used in turn to generate its corresponding session-based fingerprint 912 'C' 950.

To continue the example, the user may spend the next half hour discussing the revisions to the project plan with a co-worker. Thereafter, the user uses their security badge to exit the facility. In continuance of this example, observables 906 '6' 932 may be associated with the user using their security badge to leave the secure facility. Accordingly, observables 906 '6' 932 may be used to generate a corresponding security related activity 908 '6' 940, which in turn may be used to generate a corresponding session 910 'D' 946, which likewise may be used in turn to generate a corresponding session fingerprint 912 'D' 952.

In this example, the intervals of time 904 respectively associated with activity sessions 910 'B' 942, 'C' 944, and 'D' 946, and their corresponding session fingerprints 912 'B' 948, 'C' 950, and 'D' 952, are not contiguous. However they may be considered to be associated as their corresponding observables 906 '3' 926, '4' 928, '5' 930, and '6' 932, all have the common attribute of having been enacted within the secure facility. Furthermore, security related activities 908 '4' 936 and '5' 938 may be considered to be associated as their corresponding observables 906 have the common attribute of being associated with the project plan.

Accordingly, while the intervals of time 904 respectively associated with activity sessions 910 'B' 942, 'C' 944, and 'D' 946, and their corresponding session-based fingerprints 912 'B' 948, 'C' 950, and 'D' 952, may not be contiguous, they may be considered to be associated. Consequently, sessions 910 'B' 942, 'C' 944, and 'D' 946 may be considered to be a subset of session 910 'E' 954 and session-based fingerprints 912 'B' 948, 'C' 950, and 'D' 952 may be considered to be a subset of session-based fingerprint 912 'E' 956.

In certain embodiments, the interval of time 904 corresponding to a first activity session 910 may overlap an interval of time 904 corresponding to a second activity session 910. For example, observables 906 '7' 958 and '8' 960 may be respectively processed to generate security related activities 908 '7' 962 and '8' 964. In turn, the resulting security related activities 908 '7' 962 and '8' 964 are respectively processed to generate corresponding activity sessions 910 'F' 966 and 'G' 968. Sessions The resulting activity sessions 910 'F' 966 and 'G' 968 are then respectively processed to generate corresponding session-based fingerprints 912 'F' 970 and 'G' 972.

However, in this example activity sessions 910 'F' 966 and 'G' 968, and their corresponding session fingerprints 912 'F' 970 and 'G' 972, are not associated with the EBP 638. Instead, as shown in FIG. 9, activity sessions 910 'F' 966 and 'G' 968 are processed to generate activity session 910 'E' 954 and session fingerprints 912 'F' 970 and 'G' 972 are processed to generate session fingerprint 912 'H' 976. In certain embodiments, activity session 'H' 974 and its corresponding session fingerprint 'H' 976 may be used to generate a new EBP element 980 'H' 978. In certain embodiments, EBP element 980 'H' 978 generated from activity session 910 'E' 974 and its corresponding session fingerprint 912 'E' 976 may be associated with an existing EBP 638.

Accordingly, the time 904 interval associated with activity session 910 'F' 966 and its corresponding session fingerprint 912 'F' 970 overlaps with the time interval 904 associated with activity session 910 'G' 968 and its corresponding session fingerprint 912 'G' 972. As a result, activity sessions 910 'F' 966 and 'G' 968 are subsets of activity session 910 'H' 974. Consequently, while the intervals of time respectively associated with activity sessions 910 'F' 966 and 'G' 968, and their corresponding session fingerprints 912 'F' 970 and 'G' 972 may overlap, they are associated as they are respectively used to generate activity session 910 'H' 974 and its corresponding session fingerprint 912 'H' 976.

To provide an example, a user may decide to download various images for placement in an online publication. In this example, observables 906 '7' 958 may be associated with the user iteratively searching for, and downloading, the images they wish to use in the online publication. However, the user may not begin placing the images into the online publication until they have selected and downloaded the first few images they wish to use.

To continue the example, observables 906 '8' may be associated with the user placing the downloaded images in the online publication. Furthermore, the placement of the downloaded images into the online publication may begin a point in time 904 subsequent to when the user began to download the images. Moreover, the downloading of the images may end at a point in time 904 sooner than when the user completes the placement of the images in the online publication.

In continuance of the example, observables 906 '7' 958 and '8' 960 may be respectively processed to generate security related activities 908 '7' 962 and '8' 964, whose associated intervals of time 904 overlap one another. Accordingly, the intervals in time 904 associated with activity sessions 910 'F' 966 and 'G' 968 will likewise overlap one another as they are respectively generated from security related activities 908 '7' 962 and '8' 964.

Consequently, while the intervals of time 904 respectively associated with activity sessions 910 'F' 966 and 'G' 968, and their corresponding session fingerprints 912 'F' 970 and 'G' 972, may overlap, they may be considered to be associated as they both relate to the use of images for the online publication. Accordingly, activity sessions 910 'F' 1066 and 'G' 968 may be considered to be a subset of activity session 910 'H' 974 and session fingerprints 912 'F' 970 and 'G' 972 may be considered to be a subset of session fingerprint 912 'H' 976.

Figure 10:
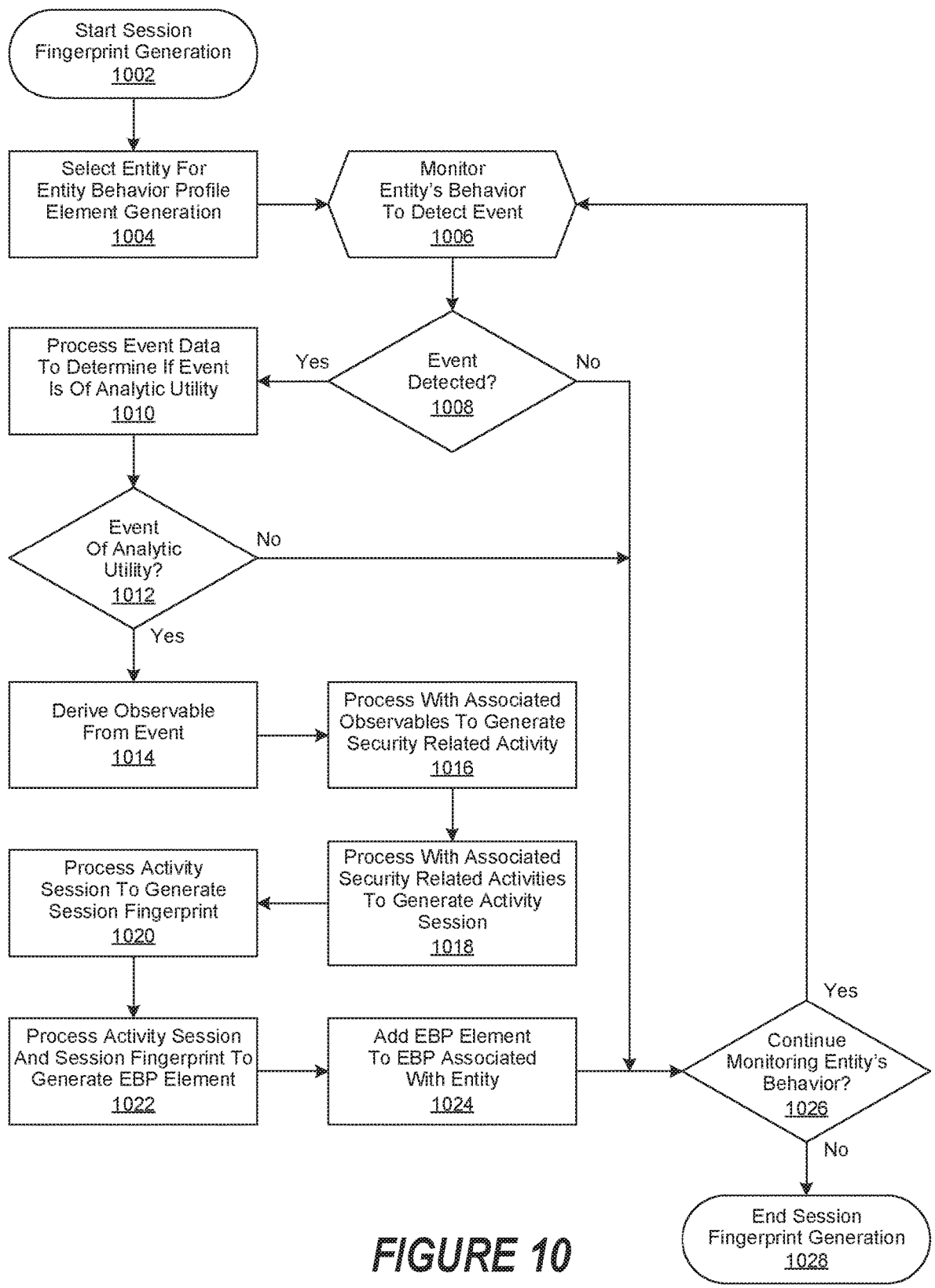
FIG. 10 is simplified block diagram of process flows associated with the operation of an entity behavior catalog (EBC) system.

FIG. 10 is a generalized flowchart of session fingerprint generation operations performed in accordance with an embodiment of the invention. In this embodiment, activity session fingerprint generation operations are begun in step 1002, followed by the selection of an entity in step 1004 for associated entity behavior profile (EBP) element generation. As used herein, an EBP element broadly refers to any data element stored in an EBP, as described in greater detail herein. In various embodiments, an EBP element may be used to describe a particular aspect of an EBP, such as certain entity behaviors enacted by an entity associated with the EBP. Ongoing monitoring operations are then performed in step 1006 to monitor the selected entity's behavior to detect the occurrence of an event, described in greater detail herein.

A determination is then made in step 1008 whether an event has been detected. If not, then a determination is made in step 1026 whether to continue monitoring the entity's behavior to detect an event. If so, then the process is continued, proceeding with step 1006. Otherwise, session fingerprint generation operations are ended in step 1028. However, if it was determined in step 1008 that an event was detected, then event data associated with the detected event is processed to determine whether the event is of analytic utility, as described in greater detail herein.

A determination is then made in step 1012 to determine whether the event is of analytic utility. If not, then the process is continued, proceeding with 1026. Otherwise, an observable, described in greater detail herein, is derived from the event in step 1014. The resulting observable is then processed with associated observables in step 1016, as likewise described in greater detail herein, to generate a security related activity. As likewise described in greater detail herein, the resulting security related activity is then processed in step 1018 with associated security related activities to generate an activity session.

In turn, the resulting activity session is then processed in step 1020 to generate a corresponding session fingerprint. The resulting session fingerprint is then processed with its corresponding activity session in step 1022 to generate an associated EBP element. The resulting EBP element is then added to an EPB associated with the entity in step 1024 and the process is then continued, proceeding with step 1026.

Figure 11:
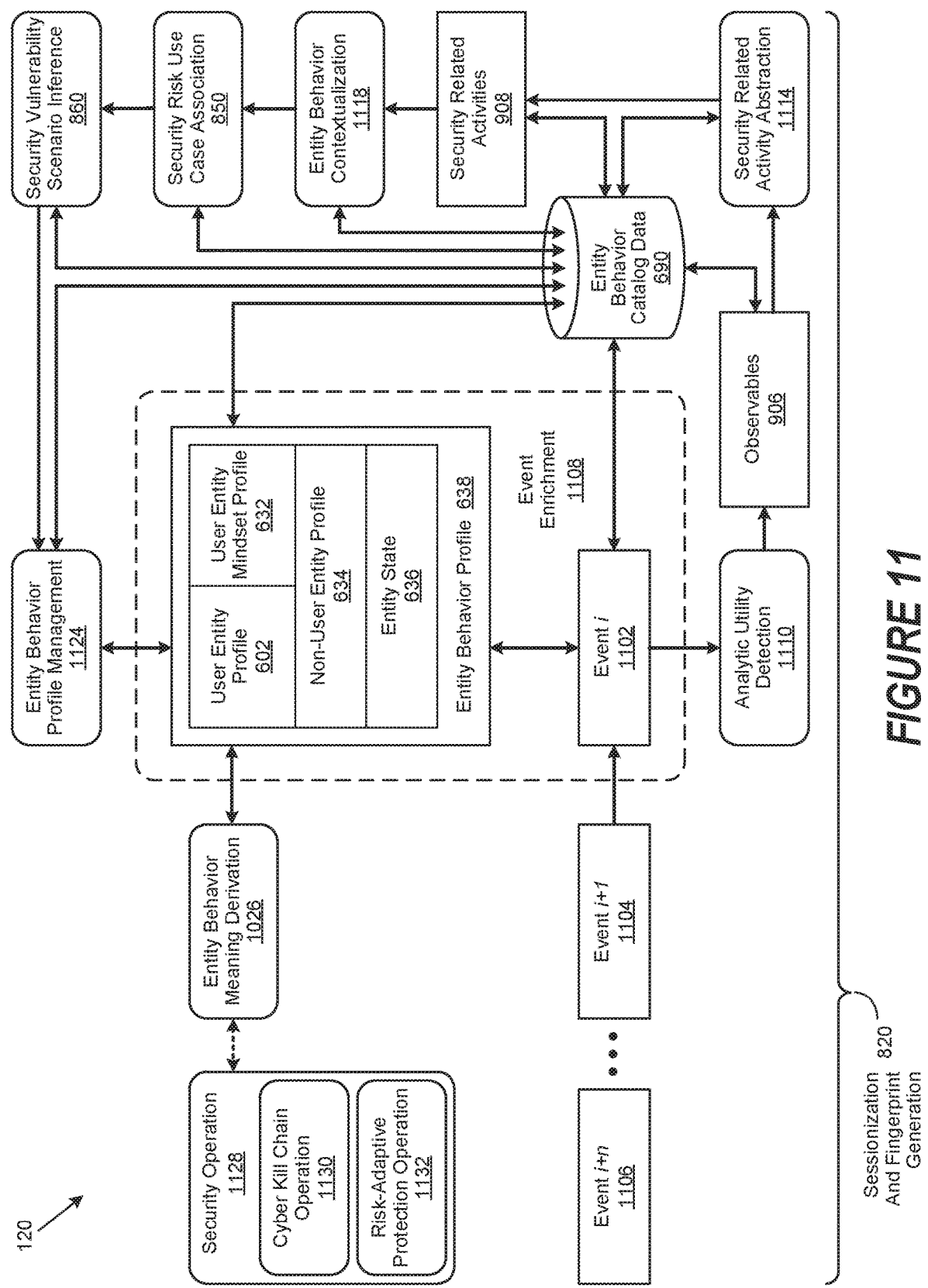
FIG. 11 is a generalized flowchart of the performance of session-based fingerprint generation operations.

FIG. 11 is simplified block diagram of process flows associated with the operation of an entity behavior catalog (EBC) system implemented in accordance with an embodiment of the invention. In certain embodiments, the EBC system 120 may be implemented to define and manage an entity behavior profile (EBP) 638, as described in greater detail herein. In certain embodiments, the EBP 638 may be implemented to include a user entity profile 602, a user entity mindset profile 632, a non-user entity profile 634, and an entity state 636, or a combination thereof, as likewise described in greater detail herein.

In certain embodiments, the EBC system 120 may be implemented use a particular user entity profile 602 in combination with a particular entity state 638 to generate an associated user entity mindset profile 632, likewise as described in greater detail herein. In certain embodiments, the EBC system 120 may be implemented to use the resulting user entity mindset profile 632 in combination with its associated user entity profile 602, non-user entity profile 634, and entity state 638, or a combination thereof, to detect entity behavior of analytic utility. In various embodiments, the EBC system 120 may be implemented to perform EBP management 1124 operations to process certain entity attribute and entity behavior information, described in greater detail herein, associated with defining and managing an EBP 638. In various embodiments, the EBC management operations 1124 may be performed by the EBP management 124 module described in the descriptive text associated with FIG. 6a.

As used herein, entity attribute information broadly refers to information associated with a particular entity. In various embodiments, the entity attribute information may include certain types of content. In certain embodiments, such content may include text, unstructured data, structured data, graphical images, photographs, audio recordings, video recordings, biometric information, and so forth. In certain embodiments, the entity attribute information may include metadata. In certain embodiments, the metadata may include entity attributes, which in turn may include certain entity identifier types or classifications.

In certain embodiments, the entity attribute information may include entity identifier information. In various embodiments, the EBC system 120 may be implemented to use certain entity identifier information to ascertain the identity of an associated entity at a particular point in time. As used herein, entity identifier information broadly refers to an information element associated with an entity that can be used to ascertain or corroborate the identity of its corresponding entity at a particular point in time. In certain embodiments, the entity identifier information may include user authentication factors, user entity 602 and non-user entity 634 profile attributes, user and non-user entity behavior factors, user entity mindset factors, information associated with various endpoint and edge devices, networks, and resources, or a combination thereof.

In certain embodiments, the entity identifier information may include temporal information. As used herein, temporal information broadly refers to a measure of time (e.g., a date, timestamp, etc.), a measure of an interval of time (e.g., a minute, hour, day, etc.), or a measure of an interval of time (e.g., two consecutive weekdays days, or between Jun. 3, 2017 and Mar. 4, 2018, etc.). In certain embodiments, the temporal information may be associated with an event associated with a particular point in time. As used herein, such a temporal event broadly refers to an occurrence, action or activity enacted by, or associated with, an entity at a particular point in time.

Examples of such temporal events include making a phone call, sending a text or an email, using a device, such as an endpoint device, accessing a system, and entering a physical facility. Other examples of temporal events include uploading, transferring, downloading, modifying, or deleting data, such as data stored in a datastore, or accessing a service. Yet other examples of temporal events include interactions between two or more users, interactions between a user and a device, interactions between a user and a network, and interactions between a user and a resource, whether physical or otherwise. Yet still other examples of temporal events include a change in name, address, physical location, occupation, position, role, marital status, gender, association, affiliation, or assignment.

As likewise used herein, temporal event information broadly refers to temporal information associated with a particular event. In various embodiments, the temporal event information may include certain types of content. In certain embodiments, such types of content may include text, unstructured data, structured data, graphical images, photographs, audio recordings, video recordings, and so forth. In certain embodiments, the temporal event information may include metadata. In various embodiments, the metadata may include temporal event attributes, which in turn may include certain entity identifier types or classifications, described in greater detail herein.

In certain embodiments, the EBC system 120 may be implemented to use information associated with such temporal resolution of an entity's identity to assess the risk associated with a particular entity, at a particular point in time, and respond with a security operation 1128, described in greater detail herein. In certain embodiments, the EBC system 120 may be implemented to respond to such assessments in order to reduce operational overhead and improve system efficiency while maintaining associated security and integrity. In certain embodiments, the response to such assessments may be performed by a security administrator. Accordingly, certain embodiments of the invention may be directed towards assessing the risk associated with the affirmative resolution of the identity of an entity at a particular point in time in combination with its behavior and associated contextual information. Consequently, the EBC system 120 may be more oriented in various embodiments to risk adaptation than to security administration.

Referring now to FIG. 11, in certain embodiments, EBC system 120 operations are begun with the receipt of information associated with an initial event i 1102. In certain embodiments, information associated with an initial event i 1102 may include user entity profile 602 attributes, user behavior factors, user entity mindset factors, entity state information, contextual information, all described in greater detail herein, or a combination thereof. In various embodiments, certain user entity profile 602 data, user entity mindset profile 632 data, non-user entity profile 634 data, entity state 636 data, contextual information, and temporal information stored in a repository of EBC data 690 may be retrieved and then used to perform event enrichment 1108 operations to enrich the information associated with event i 1102. In certain embodiments, event enrichment 1108 operations may be performed by the event enrichment 680 module of the EBC system 120 described in the text associated with FIG. 6a.

Analytic utility detection 1112 operations are then performed on the resulting enriched event i 1102 to determine whether it is of analytic utility. If so, then it is derived as an observable 906, described in greater detail herein. In certain embodiments, event i+1 1104 through event i+n 1106, may in turn be received by the EBC system 120 and be enriched 1008. Analytic utility detection 1112 operations are then performed on the resulting enriched event i+1 1104 through event i+n 1106 to determine whether they are of analytic utility. Observables 906 are then derived from those that are. In certain embodiments, the analytic utility detection 1112 operations may be performed by the analytic utility detection module 682 of the EBC system 120 described in the text associated with FIG. 6a.

In certain embodiments, security related activity abstraction 1114 operations may be performed on the resulting observables 906 corresponding to events i 1102, i+1 1104, i+n 1106 to generate an associated security related activity 908, described in greater detail herein. In various embodiments, a security related activity 908 may be expressed in a Subject Action Object format and associated with observables 906 resulting from event information provided by various received from certain EBC data sources, likewise described in greater detail herein. In certain embodiments, a security related activity abstraction 1114 operation may be performed to abstract away EBC data source-specific knowledge and details when expressing an entity behavior. For example, rather than providing the details associated with a "Windows:4624" non-user entity event, its details may be abstracted to "User Login To Device" security related activity 908.

In various embodiments, sessionization and fingerprint 820 operations, described in greater detail herein, may be performed on event information corresponding to events i 1102, i+1 1104, i+n 1106, their corresponding observables 906, and their associated security related activities 908, or a combination thereof, to generate session information. In various embodiments, the resulting session information may be used to associate certain events i 1102, i+1 1104, i+n 1106, or their corresponding observables 906, or their corresponding security related activities 908, or a combination thereof, with a particular session.

In certain embodiments, as likewise described in greater detail herein, one or more security related activities 908 may in turn be associated with a corresponding EBP element. In various embodiments, the previously-generated session information may be used to associate the one or more security related activities 908 with a particular EBP element. In certain embodiments, the one or more security related activities 908 may be associated with its corresponding EBP element through the performance of an EBP management 1124 operation. Likewise, in certain embodiments, one or more EBP elements may in turn be associated with the EBP 638 through the performance of an EBP management 1124 operation. In certain embodiments, the EBP management 1024 operations may be performed by the EBP management 124 module of the EBC system 120 described in the text associated with FIG. 6a.

In various embodiments, certain contextualization information stored in the repository of EBC data 690 may be retrieved and then used to perform entity behavior contextualization 1118 operations to provide entity behavior context, based upon the entity's user entity profile 602, or non-user entity profile 634, and its associated entity state 638. In certain embodiments, the entity behavior contextualization 1118 operations may be performed by the entity behavior contextualization module 684 of the EBC system 120, described in the text associated with FIG. 6a. In various embodiments, security risk use case association 1118 operations may be performed to associate an EBP 638 with a particular security risk use case. In certain embodiments, the results of the previously-performed entity behavior contextualization 1118 operations may be used to perform the security risk use case association 850 operations. In certain embodiments, the security risk use case association 850 operations may be performed by the security risk use case management 128 module of the EBC system 120 described in the text associated with FIG. 6a.

In various embodiments, security vulnerability scenario inference 860 operations may be performed to associate a security risk use case with a particular security vulnerability scenario, described in greater detail herein. In various embodiments, certain observables 906 derived from events of analytical utility may be used to perform the security vulnerability scenario inference 860 operations. In various embodiments, certain entity behavior contexts resulting from the performance of the entity behavior contextualization 1118 operations may be used to perform the security vulnerability scenario inference 860 operations. In certain embodiments, the security vulnerability scenario inference 860 operations may be performed by the security vulnerability scenario management module 126 of the EBC system 120 described in the text associated with FIG. 6a.

In certain embodiments, entity behavior meaning derivation 1126 operations may be performed on the security vulnerability behavior scenario selected as a result of the performance of the security vulnerability scenario inference 860 operations to derive meaning from the behavior of the entity. In certain embodiments, the entity behavior meaning derivation 1126 operations may be performed by analyzing the contents of the EBP 638 in the context of the security vulnerability behavior scenario selected as a result of the performance of the security vulnerability scenario inference 860 operations. In certain embodiments, the derivation of entity behavior meaning may include inferring the intent of an entity associated with event i 1102 and event i+1 1104 through event i+n 1106. In certain embodiments, the entity behavior meaning derivation 1126 operations may be performed by the entity behavior meaning derivation module 686 of the EBC system 120 described in the text associated with FIG. 6.

In various embodiments, performance of the entity behavior meaning derivation 1126 operations may result in the performance of a security operation 1128, described in greater detail herein. In certain embodiments, the security operation 1128 may include a cyber kill chain 1130 operation, or a risk-adaptive protection 1132 operation, or both. In certain embodiments, the cyber kill chain 1130 operation may be performed to disrupt the execution of a cyber kill chain, described in greater detail herein. In certain embodiments, the risk-adaptive protection 1132 operation may include adaptively responding with an associated risk-adaptive response, as described in greater detail herein.

In various embodiments, the security operation 1128 may include certain risk mitigation operations being performed by a security administrator. As an example, performance of the security operation 1128 may result in a notification being sent to a security administrator alerting them to the possibility of suspicious behavior. In certain embodiments, the security operation 1128 may include certain risk mitigation operations being automatically performed by a security analytics system or service. As an example, performance of the security operation 1128 may result in a user's access to a particular system being disabled if an attempted access occurs at an unusual time or from an unknown device.

In certain embodiments, meaning derivation information associated with event i 1102 may be used to update the user entity profile 602 or non-user entity profile 634 corresponding to the entity associated with event i 1102. In certain embodiments, the process is iteratively repeated, proceeding with meaning derivation information associated with event i+1 1104 through event i+n 1106. From the foregoing, skilled practitioners of the art will recognize that a user entity profile 602, or a non-user entity profile 634, or the two in combination, as implemented in certain embodiments, not only allows the identification of events associated with a particular entity that may be of analytic utility, but also provides higher-level data that allows for the contextualization of observed events. Accordingly, by viewing individual sets of events both in context and with a view to how they may be of analytic utility, it is possible to achieve a more nuanced and higher-level comprehension of an entity's intent.

Figure 12:
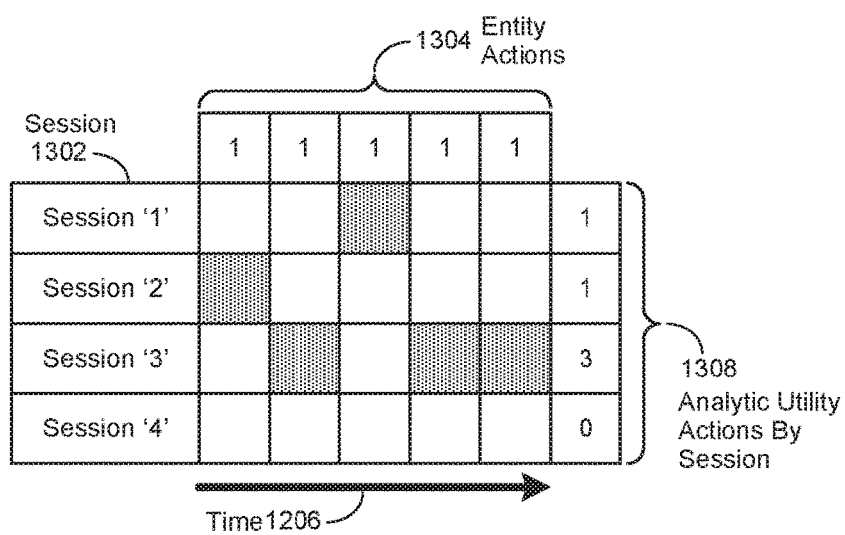
FIG. 12 is a table showing components of an EBP.

FIG. 12 is a table showing components of an entity behavior profile (EBP) implemented in accordance with an embodiment of the invention. In various embodiments, an EBP 638 may be implemented to certain include entity attributes 1204 behavioral models 1206, and inferences 1208, along with entity state 636. In certain embodiments, an EBP's 638 entity state 636 may be short-term, or reflect the state of an entity at a particular point or interval in time. In certain embodiments, an EBP's 638 entity state 636 may be long-term, or reflect the state of an entity at recurring points or intervals in time.

In certain embodiments, an EBP's 638 associated entity attributes 1204 may be long-lived. As an example, a particular user entity may have a name, an employee ID, an assigned office, and so forth, all of which are facts rather than insights. In certain embodiments, a particular entity state 636 may be sufficiently long-termed to be considered an entity attribute 1204. As an example, a first user and a second user may both have an entity state 636 of being irritable. However, the first user may have a short-term entity state 636 of being irritable on an infrequent basis, while the second user may have a long-term entity state 636 of be irritable on a recurring basis. In this example, the long-term entity state 636 of the second user being irritable may be considered to be an entity attribute 1204. In various embodiments, the determination of what constitutes an entity state 636 and an entity attribute 1204 is a matter of design choice. In certain embodiments, various knowledge representation approaches may be implemented in combination with an entity behavior catalog (EBC) system to understand the ontological interrelationship of entity attributes 1104 one or more EBP's 638 may contain. In these embodiments, the method by which certain entity attributes 1204 are selected to be tracked by an EBC system, and the method by which they are managed within a corresponding EBP 638, is a matter of design choice.

In certain embodiments, the ATP 638 evolves over time as new events and entity behavior is detected. In certain embodiments, an ATP's 638 associated behavioral models 1206, and thus the ATP 638 itself may evolve over time. In certain embodiments, an ATP's 638 behavioral models 1206 may be used by an ATP system to provide insight into how unexpected a set of events may be. As an example, a behavioral model 1206 may include information related to where a particular user entity works, which devices they may use and locations they may login from, who they may communicate with, and so forth. Certain embodiments of the invention reflect an appreciation that such behavioral models 1206 can be useful when comparing observed user and non-user entity behaviors to past observations in order to determine how unusual a particular entity behavior may be.

For example, a user may have more than one EBP 638 associated with a particular channel, which as used herein broadly refers to a medium capable of supporting the electronic observation of a user or non-user behavior, such as a keyboard, a network, a video stream, and so forth. To continue the example, the user may have a particular set of people he sends emails to from his desktop computer, and does so in an orderly and methodical manner, carefully choosing his words, and writing longer than average messages compared to his peers. Consequently, analysis of such an email message will likely indicate it was authored by the user and not someone else.

However, the same user may also send emails from a second channel, which is his mobile telephone. When using his mobile telephone, the user's emails are typically short, contains typos and emojis, and his writing style is primarily limited to simple confirmations or denials. Consequently, analysis of one such email would likely not reveal whether the user was the author or not, due to its brevity. Accordingly, the use of the same channel, which in this example is email, demonstrates the use of different devices will likely generate different behavioral models 1206, which in turn could affect the veracity of associated inferences 1208.

In certain embodiments, a behavioral model 1206 may be implemented as a session-based fingerprint. As used herein, a session-based fingerprint broadly refers to a unique identifier of an enactor of user or non-user behavior associated with a session. In certain embodiments, the session-based fingerprint may be implemented to determine how unexpected an event may be, based upon an entity's history as it relates to the respective history of their peer entities. In certain embodiments, the session-based fingerprint may be implemented to determine whether an entity associated with a particular session is truly who they or it claims to be or if they are being impersonated. In certain embodiments, the session-based fingerprint may be implemented to determine whether a particular event, or a combination thereof, may be of analytic utility. In certain embodiments, the session-based fingerprint may include a risk score, be used to generate a risk score, or a combination thereof.

As likewise used herein, a fingerprint, as it relates to a session, broadly refers to a collection of information providing one or more distinctive, characteristic indicators of the identity of an enactor of one or more corresponding user or non-user entity behaviors during the session. In certain embodiments, the collection of information may include one or more user or non-user profile elements. A user or non-user profile element, as used herein, broadly refers to a collection of user or non-user entity behavior elements, described in greater detail herein.

As used herein, inferences 1208 broadly refer to things that can be inferred about an entity based upon observations. In certain embodiments the observations may be based upon electronically-observable behavior, described in greater detail herein. In certain embodiments, the behavior may be enacted by a user entity, a non-user entity, or a combination thereof. In certain embodiments, inferences 1108 may be used to provide insight into a user entity's mindset or affective state.

As an example, an inference 1208 may be made that a user is unhappy in their job or that they are facing significant personal financial pressures. Likewise, based upon the user's observed behavior, an inference 1208 may be made that they are at a higher risk of being victimized by phishing schemes due to a propensity for clicking on random or risky website links. In certain embodiments, such inferences 1208 may be implemented to generate a predictive quantifier of risk associated with an entity's behavior.

In certain embodiments, entity state 636, described in greater detail herein, may be implemented such that changes in state can be accommodated quickly while reducing the overall volatility of a particular EBP 638. As an example, a user may be traveling by automobile. Accordingly, the user's location is changing quickly. Consequently, location data is short-lived. As a result, while the location of the user may not be updated within their associated EBP 638 as it changes, the fact their location is changing may prove to be useful in terms of interpreting other location-based data from other sessions. To continue the example, knowing the user is in the process of changing their location may assist in explaining why the user appears to be in two physical locations at once.

Figure 13:
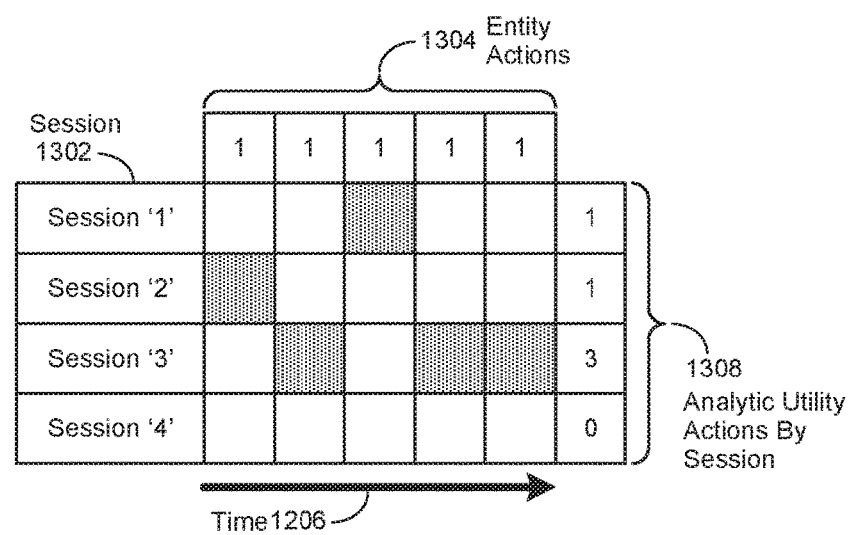
FIG. 13 is an activities table showing analytic utility actions occurring during a session.

FIG. 13 is an activities table showing analytic utility actions occurring during a session implemented in accordance with an embodiment of the invention. In certain embodiments, an entity behavior catalog (EBC) system, described in greater detail herein, may be implemented to capture and record various entity actions 1304 enacted by an entity during a session 1302, likewise described in greater detail herein. In certain embodiments, the actions, and their associated sessions, may be stored in an entity behavior profile (EBP) corresponding to a particular entity. In various embodiments, the EBC system may be implemented to process information stored in an EBP to determine, as described in greater detail herein, which actions 1304 enacted by a corresponding entity during a particular session 1302 may be of analytic utility 1308.

Certain embodiments of the invention reflect an appreciation that multiple sessions 1302, each of which may be respectively associated with a corresponding entity, may occur within the same interval of time 1306. Certain embodiments of the invention likewise reflect an appreciation that a single action of analytic utility 1308 enacted by an entity occurring during a particular interval of time 1306 may not appear to be suspicious behavior by an associated entity. Likewise, certain embodiments of the invention reflect an appreciation that the occurrence of multiple actions of analytic utility 1308 enacted by an entity during a particular session 1302 may be an indicator of suspicious behavior.

Certain embodiments reflect an appreciation that a particular entity may be associated with two or more sessions 1302 that occur concurrently over a period of time 1306. Certain embodiments of the invention likewise reflect an appreciation that a single action of analytic utility 1308 enacted by an entity occurring during a first session 1302 may not appear to be suspicious. Conversely, certain embodiments of the invention reflect an appreciation that multiple actions of analytic utility 1308 during a second session 1302 may be an indicator of suspicious behavior.

As an example, a user may log into the same system from two different IP addresses, one associated with their laptop computer and the other their mobile phone. In this example, entity actions 1204 1304 enacted by the user using their laptop computer may be associated with a first session 1302 (e.g. session '2'), and entity actions 1304 enacted by the user using their mobile phone may be associated with a second session 1202 1302 (e.g., session '3'). To continue the example, only one action of analytic utility 1308 may be associated with the first session 1302, while three actions of analytic utility 1308 may be associated with the second session 1302. Accordingly, it may be inferred the preponderance of actions of analytic utility 1308 enacted by the user during the second session 1302 may indicate suspicious behavior being enacted with their mobile phone.

Figure 14:
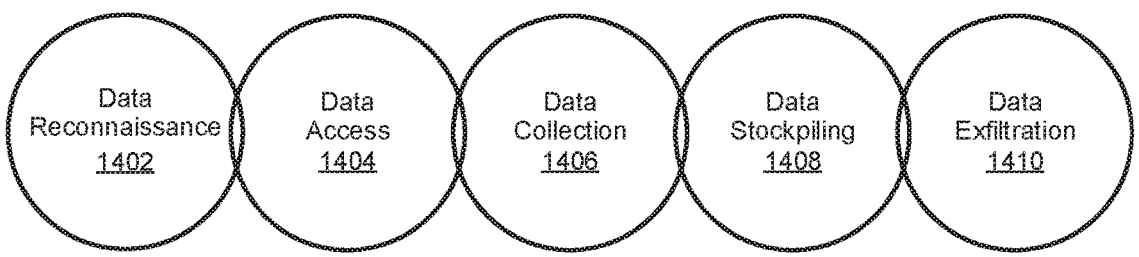
FIG. 14 shows a simplified block diagram of the components of a cyber kill chain associated with the performance of a security operation.

FIG. 14 shows a simplified block diagram of the components of a cyber kill chain associated with a security operation performed in accordance with an embodiment of the invention. As described herein, cyber kill chain is similar to the data theft kill chain. In certain embodiments, a security analytics system, or an entity behavior catalog (EBC) system, or both, may be implemented to monitor the behavior of a particular entity, as described in greater detail herein. In certain embodiments, such monitoring may include observing an electronically-observable data source, such as the EBC data sources shown in FIGS. 6*a*, 8, 16, and 17*b*.

In certain embodiments, an observable, described in greater detail herein, may be derived from the electronically-observable data source. In certain embodiments, the observable is associated with an event of analytic utility, likewise described in greater detail herein. In certain embodiments, one or more derived observables may then be associated with a security related activity, as described in greater detail herein. In various embodiments, a particular security activity may be associated with a component of a cyber kill chain.

Skilled practitioners of the art will be familiar with a kill chain, which was originally used as a military concept related to the structure of an attack. In general, the phases of a military kill chain consisted of target identification, force dispatch to target, decision and order to attack the target, and destruction of the target. Conversely, breaking or disrupting an opponent's kill chain is a method of defense or preemptive action.

Those of skill in the art will likewise be familiar with a cyber kill chain, developed by the Lockheed Martin company of Bethesda, Md., which is an adaptation of the military kill chain concept that is commonly used to trace the stages of a cyberattack. In general, such stages typically consist of, as shown in FIG. 14, data reconnaissance 1402, data access 1404, data collection 1406, data stockpiling 1408, and data exfiltration 1410. However, the cyber kill chain concept is not limited to data exfiltration 1410. It can also be implemented to facilitate the anticipation and recognition of insider threats, social engineering, advanced ransomware, and innovative attacks as they evolve.

In certain embodiments, the cyber kill chain may be implemented to anticipate, recognize, and respond to entity behavior of analytic utility that may be determined to be anomalous, abnormal, unexpected, malicious, or some combination thereof, as described in greater detail herein. In certain embodiments, the response to recognition of a kill chain may be to perform an associated security operation, described in greater detail herein. In certain embodiments, the performance of the security operation may result in disrupting or otherwise interfering with the performance, or execution, of one or more components, steps, or phases of a cyber kill chain by affecting the performance of the security related activity by its associated entity.

In certain embodiments, a cyber kill chain may consist of more components, step, or phases than those shown in FIG. 14. For example, in certain embodiments, the cyber kill chain may likewise include intrusion, exploitation, privilege escalation, lateral movement, obfuscation/anti-forensics, and denial of service (DoS). In such embodiments, the data reconnaissance component 1402 may be executed as an observation stage to identify targets, as well as possible tactics for the attack. In certain embodiments, the data reconnaissance component 1402 may not be limited to data exfiltration. For example, it may be related to other anomalous, abnormal, unexpected, malicious activity, such as identity theft.

In certain embodiments, the data access 1404 component may not be limited to gaining access to data. In certain embodiments, the data access 1404 component of a cyber kill chain may be executed as an intrusion phase. In such embodiments, the attacker may use what was learned in execution of the data reconnaissance 1402 component to determine how to gain access to certain systems, possibly through the use of malware or exploitation of various security vulnerabilities. In certain embodiments, a cyber kill chain may likewise include an exploitation component, which may include various actions and efforts to deliver malicious code and exploit vulnerabilities in order to gain a better foothold with a system, network, or other environment.

In certain embodiments, a cyber kill chain may likewise include a privilege escalation component, which may include various actions and efforts to escalate the attacker's privileges in order to gain access to more data and yet more permissions. In various embodiments, a cyber kill chain may likewise include a lateral movement component, which may include moving laterally to other systems and accounts to gain greater leverage. In certain of these embodiments, the leverage may include gaining access to higher-level permissions, additional data, or broader access to other systems.

In certain embodiments, a cyber kill chain may likewise include an obfuscation/anti-forensics component, which may include various actions and efforts used by the attacker to hide or disguise their activities. Known obfuscation/anti-forensics approaches include laying false trails, compromising data, and clearing logs to confuse or slow down security forensics teams. In certain embodiments, the data collection 1406 of a cyber kill chain may the collection of data with the intent of eventually being able to exfiltrate it. In certain embodiments, collected data may be accumulated during a data stockpiling 1408 component of a cyber kill chain.

In certain embodiments, a cyber kill chain may likewise include a denial of service (DoS) component, which may include various actions and efforts on the part of an attacker to disrupt normal access for users and systems. In certain embodiments, such disruption may be performed to stop a cyberattack from being detected, monitored, tracked, or blocked. In certain embodiments, the data exfiltration 1410 component of a cyber kill chain may include various actions and efforts to get data out of a compromised system.

In certain embodiments, information associated with the execution of a particular cyber kill chain may be associated with a corresponding security vulnerability scenario, described in greater detail herein. In certain embodiments, one of more components of a particular cyber kill chain may be associated with one or more corresponding security related use cases, likewise described in greater detail herein. In certain embodiments, performance or execution of a component of a cyber kill chain may be disrupted by affecting completion of the risk use case. Those of skill in the art will recognize that many such embodiments are possible. Accordingly, the foregoing is not intended to limit the spirit, scope, or intent of the invention.

Figure 15A:
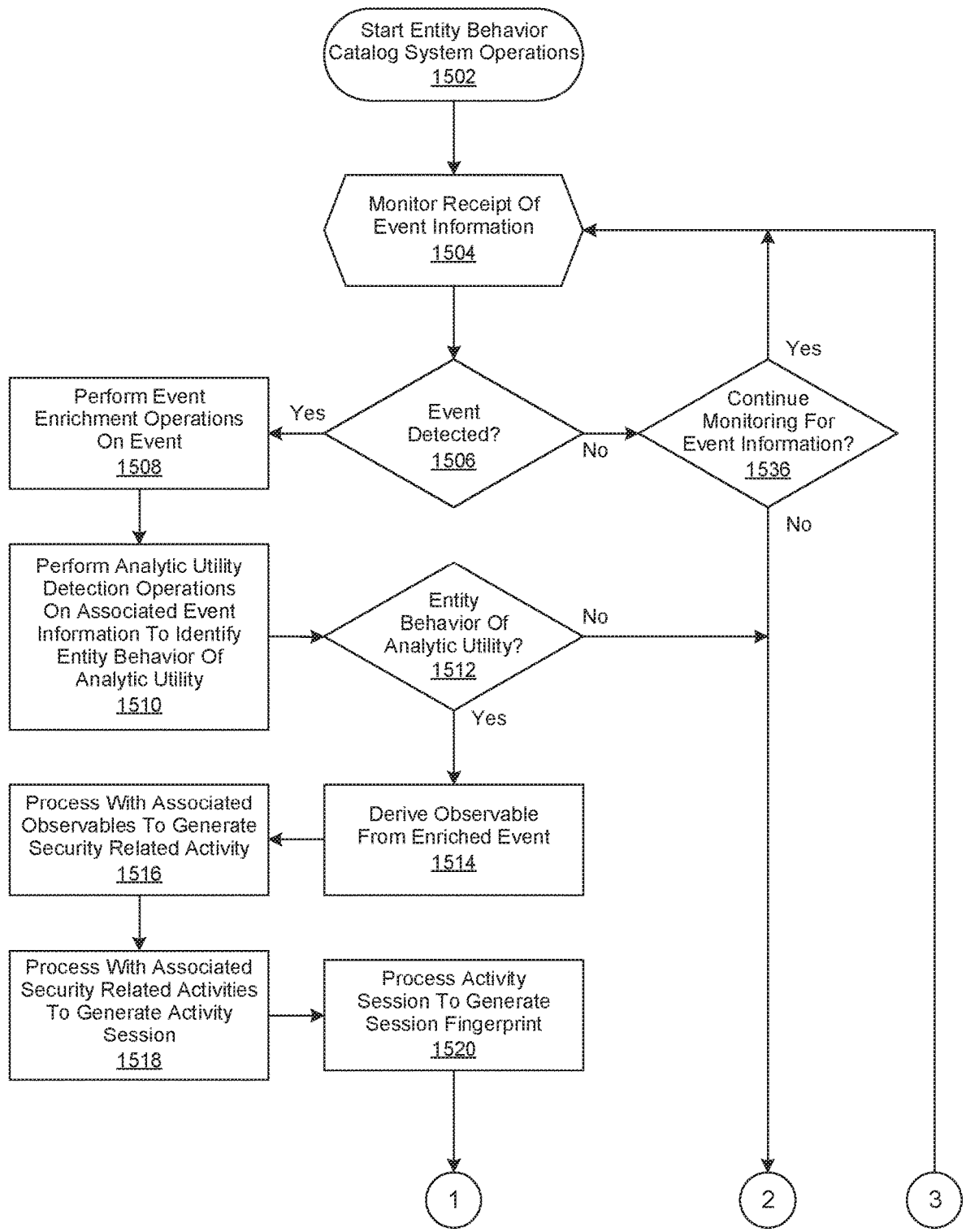
FIGS. 15a and 15b are a generalized flowchart of the performance of EBP definition and management operations.
Figure 15B:
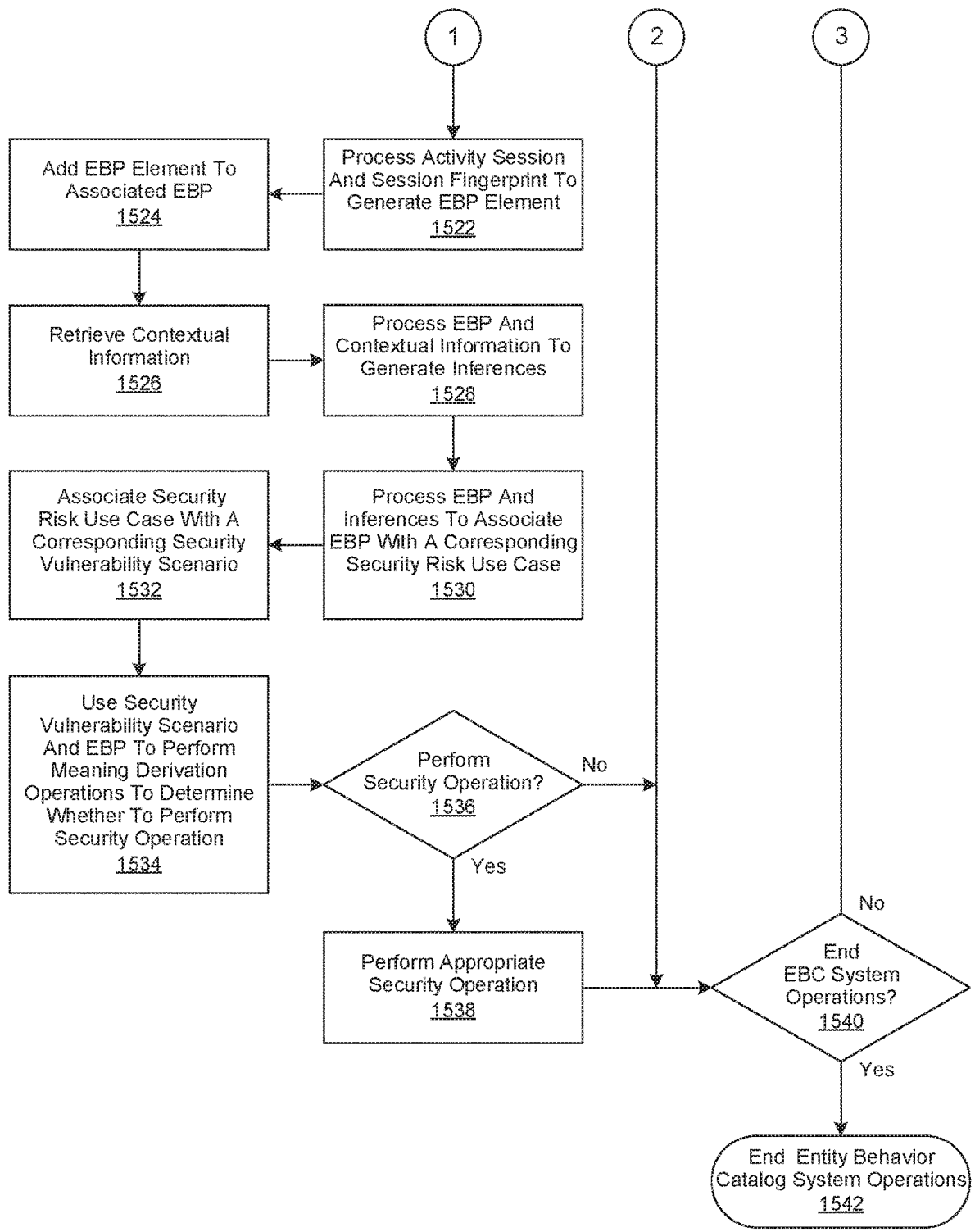

FIGS. 15*a* and 15*b* are a generalized flowchart of the performance of entity behavior catalog (EBC) system operations implemented in accordance with an embodiment of the invention. In this embodiment, EBC system 120 operations are begun with ongoing operations being performed by the EBC system in step 1504 to monitor the receipt of event information to detect the occurrence of an event, described in greater detail herein.

A determination is then made in step 1506 to determine whether an event has been detected. If not, then a determination is made in step 1536 to determine whether to continue monitoring the receipt of event information. If so, then the process is continued, proceeding with step 1504. If not, then a determination is made in step 1540 whether to end EBC system operations. If not, then the process is continued, proceeding with step 1504. Otherwise EBC system operations are ended in step 1542.

However, if it was determined in step 1506 that an event was detected, then event enrichment operations, described in greater detail herein, are performed on the event in step 1508. Analytic utility detection operations are then performed on the resulting enriched event in step 1510 to identify entity behavior of analytic utility, as likewise described in greater detail herein. A determination is then made in step 1512 to determine whether the enriched event is associated with entity behavior of analytic utility. If not, then the process is continued, proceeding with step 1540. Otherwise, an observable is derived from the event in step 1514, as described in greater detail herein.

The resulting observable is then processed with associated observables in step 1516 to generate a security related activity, likewise described in greater detail herein. In turn, the resulting security related activity is processed with associated security related activities in step 1518 to generate an activity session, described in greater detail. Thereafter, as described in greater detail herein, the resulting activity session is processed in step 1520 to generate a corresponding activity session. In turn, the resulting activity session is processed with the activity session in step 1522 to generate an EBP element, which is then added to an associated EBP in step 1524.

Thereafter, in step 1526, certain contextualization information stored in a repository of EBC data may be retrieved and then used in step 1528 to perform entity behavior contextualization operations to generate inferences related to the entity's behavior. The EBP is then processed with resulting entity behavior inferences in step 1530 to associate the EBP with one or more corresponding risk use cases, as described in greater detail herein. In turn, the one or more risk use cases are then associated in step 1532 with one or more corresponding security vulnerability scenarios, as likewise described in greater detail herein.

Then, in step 1534, entity behavior meaning derivation operations are performed on the EBP and each security vulnerability behavior scenario selected in step 1532 to determine whether the entity's behavior warrants performance of a security operation. Once that determination is made, a subsequent determination is made in step 1536 whether to perform a security operation. If not, then the process is continued, proceeding with step 1540. Otherwise, the appropriate security operation, described in greater detail herein, is performed in step 1538 and the process is continued, proceeding with step 1540.

Figure 16:
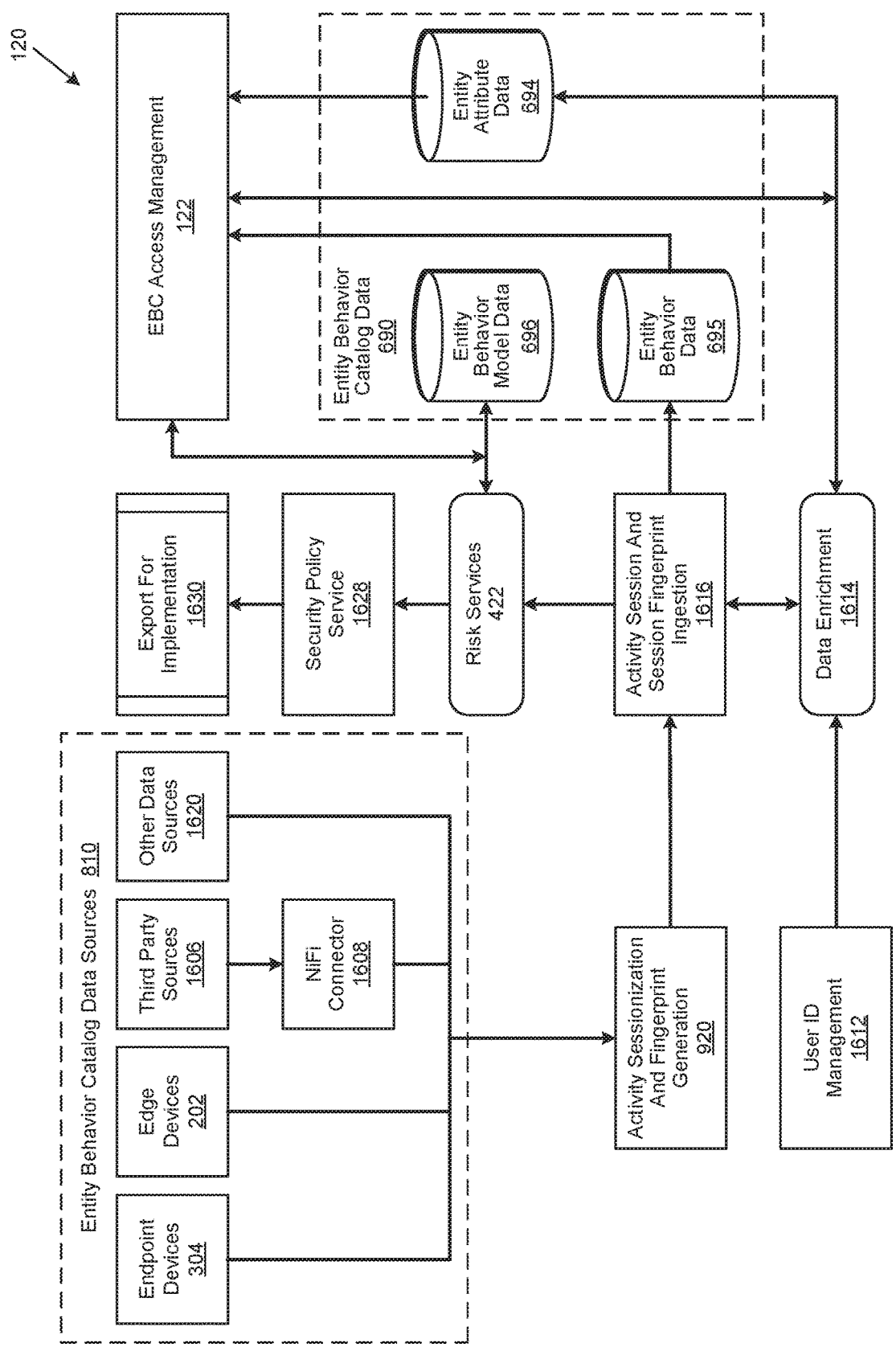
FIG. 16 shows a functional block diagram of the operation of an EBC system.

FIG. 16 shows a functional block diagram of the operation of an entity behavior catalog (EBC) system implemented in accordance with an embodiment of the invention. In various embodiments, certain EBC-related information, described in greater detail herein, may be provided by various EBC data sources 810, likewise described in greater detail herein. In certain embodiments, the EBC data sources 810 may include endpoint devices 304, edge devices 202, third party sources 1606, and other 1620 data sources. In certain embodiments, the receipt of EBC-related information provided by third party sources 1606 may be facilitated through the implementation of one or more Apache NiFi connectors 1608, familiar to skilled practitioners of the art.

In certain embodiments, activity sessionization and session fingerprint generation 1620 operations may be performed on the EBC-related information provided by the EBC data sources 810 to generate discrete sessions. As used herein, activity sessionization broadly refers to the act of turning event-based data into activity sessions, described in greater detail herein. In these embodiments, the method by which certain EBC-related information is selected to be used in the generation of a particular activity session, and the method by which the activity session is generated, is a matter of design choice. As likewise used herein, an activity session broadly refers to an interval of time during which one or more user or non-user behaviors are respectively enacted by a user or non-user entity.

In certain embodiments, the user or non-user behaviors enacted during an activity session may be respectively associated with one or more events, described in greater detail herein. In certain embodiments, an activity session may be implemented to determine whether or not user or non-user behaviors enacted during the session are of analytic utility. As an example, certain user or non-user behaviors enacted during a particular activity session may indicate the behaviors were enacted by an impostor. As another example, certain user or non-user behaviors enacted during a particular activity session may be performed by an authenticated entity, but the behaviors may be unexpected or out of the norm.

In certain embodiments, two or more activity sessions may be contiguous. In certain embodiments, two or more activity sessions may be noncontiguous, but associated. In certain embodiments, an activity session may be associated with two or more other activity sessions. In certain embodiments, an activity session may be a subset of another activity session. In certain embodiments, the interval of time corresponding to a first activity session may overlap an interval of time corresponding to a second activity session. In certain embodiments, an activity session may be associated with two or more other activity sessions whose associated intervals of time may overlap one another. Skilled practitioners of the art will recognize that many such embodiments are possible. Accordingly, the foregoing is not intended to limit the spirit, scope or intent of the invention.

The resulting activity sessions and session fingerprints are then ingested 1616, followed by the performance of data enrichment 1614 operations familiar to those of skill in the art. In certain embodiments, user identifier information (ID) information provided by a user ID management system 1612 may be used to perform the data enrichment 1614 operations. In various embodiments, certain contextual information related to a particular entity behavior or event may be used to perform the data enrichment 1614 operations. In various embodiments, certain temporal information, such as timestamp information, related to a particular entity behavior or event may be used to perform the data enrichment 1614 operations. In certain embodiments, a repository of EBC data 690 may be implemented to include repositories of entity attribute data 694, entity behavior data 695, and behavioral model data 696. In various embodiments, certain information stored in the repository of entity attribute data 694 may be used to perform the data enrichment operations 1614.

In certain embodiments, the resulting enriched sessions may be stored in the repository of entity behavior data 695.

In certain embodiments, the resulting enriched sessions may be provided to a risk services 422 module, described in greater detail herein. In certain embodiments, as likewise described in greater detail herein, the risk services 422 module may be implemented to generate inferences, risk models, and risk scores, or a combination thereof. In certain embodiments, the resulting inferences, risk models, and risk scores, or a combination thereof, may then be stored in the repository of entity behavioral model data 696.

In certain embodiments, the risk services 422 module may be implemented to provide input data associated with the inferences, risk models, and risk scores it may generate to a security policy service 1628. In certain embodiments, the security policy service 1628 may be implemented to use the inferences, risk models, and risk scores to generate security policies. In turn, the security policy service 1628 may be implemented in certain embodiments to export 1630 the resulting security policies to endpoint agents or devices 304, edge devices 202, or other security mechanisms, where they may be used to limit risk, as described in greater detail herein. In certain embodiments, an EBC access module 122 may be implemented to provide administrative access to various components of the EBC system 120, as shown in FIG. 16. In certain embodiments, the EBC access management module 122 may include a user interface (UI), or a front-end, or both, familiar to skilled practitioners of the art.

Figure 17A:
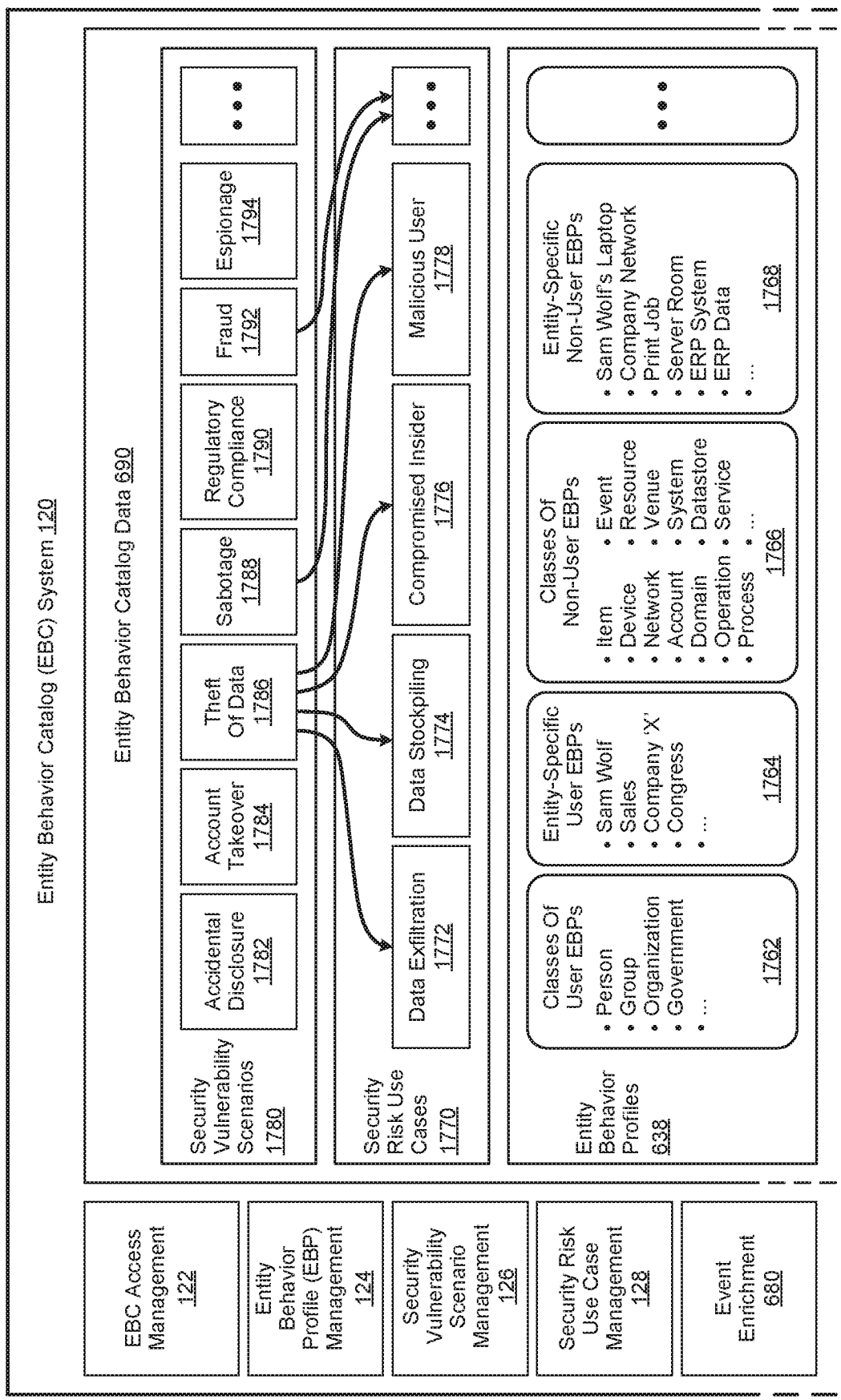
FIGS. 17a and 17b are a simplified block diagram showing components of an EBC system.
Figure 17B:
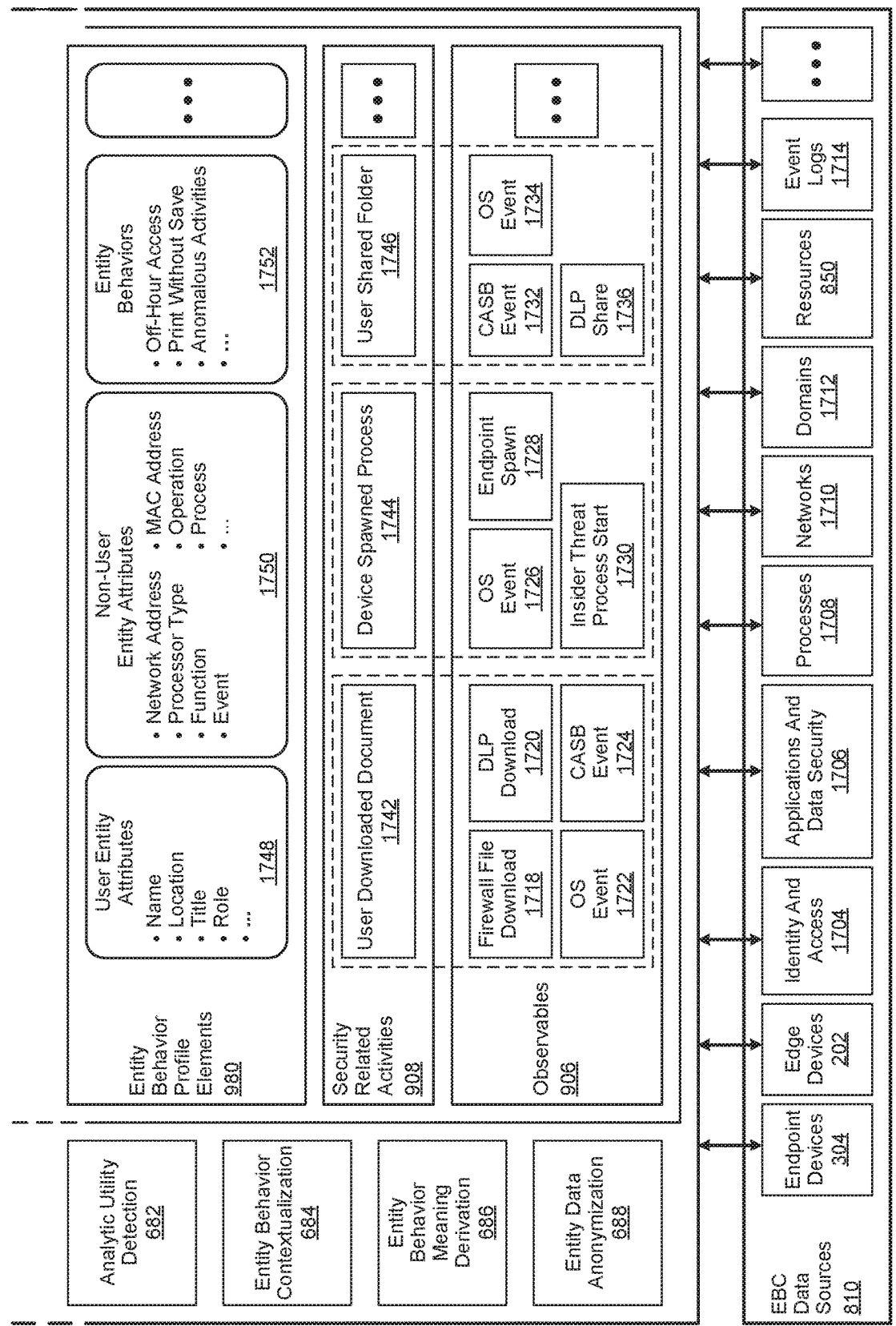

FIGS. 17*a* and 17*b* are a simplified block diagram showing reference architecture components of an entity behavior catalog (EBC) system implemented in accordance with an embodiment of the invention for performing certain EBC operations. In various embodiments, the EBC system 120 may be implemented to generate, manage, store, or some combination thereof, information related to the behavior of an associated entity. In certain embodiments, the EBC system 120 may be implemented to provide an inventory of entity behaviors for use when performing a security operation, described in greater detail herein. In certain embodiments, the EBC system 120 may be implemented to include an EBC access management 122, an EBP management 124, a security vulnerability scenario management 126, a security risk use case management 128, an event enrichment 680, an analytic utility detection 682, an entity behavior contextualization 684, an entity behavior meaning derivation 686 module, an entity data anonymization 688 and a repository of EBC data 690, or a combination thereof.

In various embodiments, the EBC access management 122 module may be implemented to provide access to certain functionalities performed by the EBC system 120. In various embodiments, the EBC access management 122 module may be implemented to perform certain data management operations. In certain embodiments, the data management operations may include storing, indexing, and retrieving data stored in the repository of EBC catalog data 690. In various embodiments, the data management operations may include certain search functionalities familiar to skilled practitioners of the art. In certain embodiments the EBC access management 122 module may be implemented with a user interface (UI), or a front end, likewise familiar to those of skill in the art, to facilitate accessing various functionalities performed by the EBC system 120. In various embodiments, the EBC access management 122, EBP management 124, security vulnerability scenario management 126, security risk use case management 128, event enrichment 680, analytic utility detection 682, entity behavior contextualization 684, entity behavior meaning derivation 686, and entity data anonymization 688 modules, and the repository of EBC data 690, or a combination thereof, may be implemented to provide an EBC reference architecture for performing certain EBC operations, described in greater detail herein.

In certain embodiments, an entity behavior catalog (EBC) system 120 may be implemented to identify a security related activity, described in greater detail herein. In certain embodiments, the security related activity may be based upon an observable, likewise described in greater detail herein. In certain embodiments, the observable may include event information corresponding to electronically-observable behavior enacted by an entity. In certain embodiments, the event information corresponding to electronically-observable behavior enacted by an entity may be received from an electronic data source, such as the EBC data sources 810 shown in FIGS. 6*a*, 8, 16, and 17*b*.

In certain embodiments, as likewise described in greater detail herein, the EBC system 120 may be implemented to identify a particular event of analytic utility by analyzing an observable associated with a particular security related activity. In certain embodiments, the EBC system 120 may be implemented to generate entity behavior catalog data based upon an identified event of analytic utility. In certain embodiments, an observable 906 may be derived, as described in greater detail herein, from an identified event of analytic utility. In various embodiments, the EBC system 120 may be implemented to associate certain entity behavior data it may generate with a predetermined abstraction level, described in greater detail herein.

In various embodiments, the EBC system 120 may be implemented to use certain entity behavior catalog data, and an associated abstraction level, to generate a hierarchical set of entity behaviors, described in greater detail herein. In certain embodiments, the hierarchical set of entity behaviors generated by the EBC system 120 may represent an associated security risk, likewise described in greater detail herein. Likewise, as described in greater detail herein, the EBC system 120 may be implemented in certain embodiments to store the hierarchical set of entity behaviors within a repository of EBC data 690.

In various embodiments, the EBC system 120 may be implemented to receive certain event information, described in greater detail herein, corresponding to an event associated with an entity interaction, likewise described in greater detail herein. In various embodiments, the event information may be generated by, received from, or a combination thereof, certain EBC data sources 810. In certain embodiments, such EBC data sources 810 may include endpoint devices, edge devices 202, identity and access 1704 systems familiar to those of skill in the art, as well as various software and data security 1706 applications. In various embodiments, EBC data sources 810 may likewise include output from certain processes 1708, network 1710 access and traffic logs, domain 1712 registrations and associated entities, certain resources 850, described in greater detail herein, event logs 1714 of all kinds, and so forth.

In certain embodiments, EBC system 120 operations are begun with the receipt of information associated with a particular event. In certain embodiments, information associated with the event may include user entity profile attributes, user behavior factors, user entity mindset factors, entity state information, and contextual information, described in greater detail herein, or a combination thereof. In certain embodiments, the event may be associated with a user/device, a user/network, a user/resource, or a user/user interaction, as described in greater detail herein. In various embodiments, certain user entity profile data, user entity mindset profile data, non-user entity profile data, entity state data, contextual information, and temporal information stored in the repository of EBC data 690 may be retrieved and then used to perform event enrichment operations to enrich the information associated with the event. In certain embodiments, the event enrichment operations may be performed by the event enrichment 680 module.

In certain embodiments, analytic utility detection operations, described in greater detail herein, may be performed on the resulting enriched event to determine whether it is of analytic utility. In certain embodiments, the analytic utility detection operations may be performed by the analytic utility detection module 682. In various embodiments, certain contextualization information stored in the repository of EBC data 690 may be retrieved and then used to perform entity behavior contextualization operations, likewise described in greater detail herein, to provide context, based upon the entity's user entity profile, or non-user entity profile, and its associated entity state. In certain embodiments, the entity behavior contextualization operations may be performed by the entity behavior contextualization module 684.

In various embodiments, an observable 906, described in greater detail herein, may be derived from the resulting enriched, contextualized event. As shown in FIG. 17b, examples of such observables may include firewall file download 1718, data loss protection (DLP) download 1720, and various operating system (OS) events 1722, 1726, and 1734. As likewise shown in FIG. 17b, other examples of such observables may include cloud access security broker (CASB) events 1724 and 1732, endpoint spawn 1728, insider threat process start 1730, DLP share 1736, and so forth. In certain embodiments, the resulting observables 906 may in turn be respectively associated with a corresponding observable abstraction level, described in greater detail herein.

In certain embodiments, security related activity abstraction operations, described in greater detail herein, may be performed on the resulting observables 906 to generate a corresponding security related activity 908. In various embodiments, a security related activity 908 may be expressed in a Subject Action Object format and associated with observables 906 resulting from event information received from certain EBC data sources 810. In certain embodiments, a security related activity abstraction operation, described in greater detail herein, may be performed to abstract away EBC data source-specific knowledge and details when expressing an entity behavior. For example, rather than providing the details associated with a "Windows:4624" non-user entity event, the security related activity 908 is abstracted to a "User Login To Device" OS event 1722, 1726, 1734.

As shown in FIG. 17b, examples of security related activities 908 may include "user downloaded document" 1722, "device spawned process" 1744, "user shared folder" 1746, and so forth. To provide other examples, the security related activity 908 "user downloaded document" 1722 may be associated with observables 906 firewall file download 1718, DLP download 1720, OS event 1722, and CASB event 1724. Likewise, the security related activity 908 "device spawned process" 1744, may be associated with observables 906, OS event 1726, endpoint spawn 1728, and insider threat process start 1730. The security related activity 908 "user shared folder" 1746 may likewise be associated with observables 906 CASB event 1732, OS event 1734, and DLP share 1736.

In certain embodiments, security related activities 908 may in turn be respectively associated with a corresponding security related activity abstraction level, described in greater detail herein. In various embodiments, activity sessionization operations, likewise described in greater detail herein, may be performed to respectively associate certain events and security related activities 908 with corresponding activity sessions, likewise described in greater detail herein. Likewise, as described in greater detail herein, the resulting session information may be used in various embodiments to associate certain events of analytic utility, or their corresponding observables 906, or their corresponding security related activities 908, or a combination thereof, with a particular activity session.

In certain embodiments, the resulting security related activities 908 may be processed to generate an associated EBP element 980, as described in greater detail herein. In various embodiments, the EBP element 980 may include user entity attribute 1748 information, non-user entity attribute 1750 information, entity behavior 1752 information, and so forth. In certain of these embodiments, the actual information included in a particular EBP element 980, the method by which it is selected, and the method by which it is associated with the EBP element 980, is a matter of design choice. In certain embodiments, the generation of a particular EBP element 980, and its subsequent management, may be performed by the EBP management 124 module. In certain embodiments, the EBP elements 980 may in turn be respectively associated with a corresponding EBP element abstraction level, described in greater detail herein.

In various embodiments, certain EBP elements 980 may in turn be associated with a particular EBP 638. In certain embodiments, the EBP 638 may be implemented as a class of user 1762 EBPs, an entity-specific user 1762 EBP, a class of non-user 1766 EBPs, an entity-specific non-user 1768 EBP, and so forth. In certain embodiments, classes of user 1762 and non-user 1766 EBPs may respectively be implemented as a prepopulated EBP, described in greater detail herein.

In certain embodiments, the association of EBP elements 980 with a particular EBP 638 may be performed by the EBP management 124 module. In various embodiments, certain entity data associated with EBP elements 980 associated with the classes of user 1762 and non-user 1766 EBPs may be anonymized. In certain embodiments, the anonymization of the entity data may be performed by the entity data anonymization 688 module. In certain embodiments, the EBP 638 may in turn be associated with an EBP abstraction level, described in greater detail herein.

In certain embodiments, security risk use case association operations may be performed to associate an EBP 638 with a particular security risk use case 1770. As shown in FIG. 17a, examples of such security risk use cases 1770 include "data exfiltration" 1772, "data stockpiling" 1774, "compromised insider" 1776, "malicious user" 1778, and so forth. In various embodiments, entity behavior of analytic utility resulting from the performance of certain analytic utility detection operations may be used identify one or more security risk use cases 1770 associated with a particular EBP 638. In certain embodiments, identified security risk use cases may in turn be associated with a security risk use case abstraction level, described in greater detail herein. In certain embodiments, the security risk use case association, and security risk use case abstraction level association, operations may be performed by the security risk use case management 128 module.

In certain embodiments, the results of the security risk use case association operations may be used to perform security vulnerability scenario association operations to associate one or more security risk use cases 1770 to one or more security vulnerability scenarios 1780, described in greater detail herein. As shown in FIG. 17*a*, examples of security vulnerability scenarios 1780 include "accidental disclosure" 1782, "account takeover" 1784, "theft of data" 1786, "sabotage" 1788, "regulatory compliance" 1790, "fraud" 1792, "espionage" 1794, and so forth. To continue the example, the "theft of data" 1786 security vulnerability scenario may be associated with the "data exfiltration" 1772, "data stockpiling" 1774, "compromised insider" 1776, "malicious user" 1778 security risk use cases 1770. Likewise, the "sabotage" 1788 and "fraud" 1792 security vulnerability scenarios may be respectively associated with some other security risk case 1770. In certain embodiments, the associated security vulnerability scenarios may in turn be associated with a security vulnerability scenario abstraction level, described in greater detail herein. In certain embodiments, the security vulnerability scenario association, and the security vulnerability abstraction level association, operations may be performed by the security vulnerability scenario management 126 module.

Figure 18:
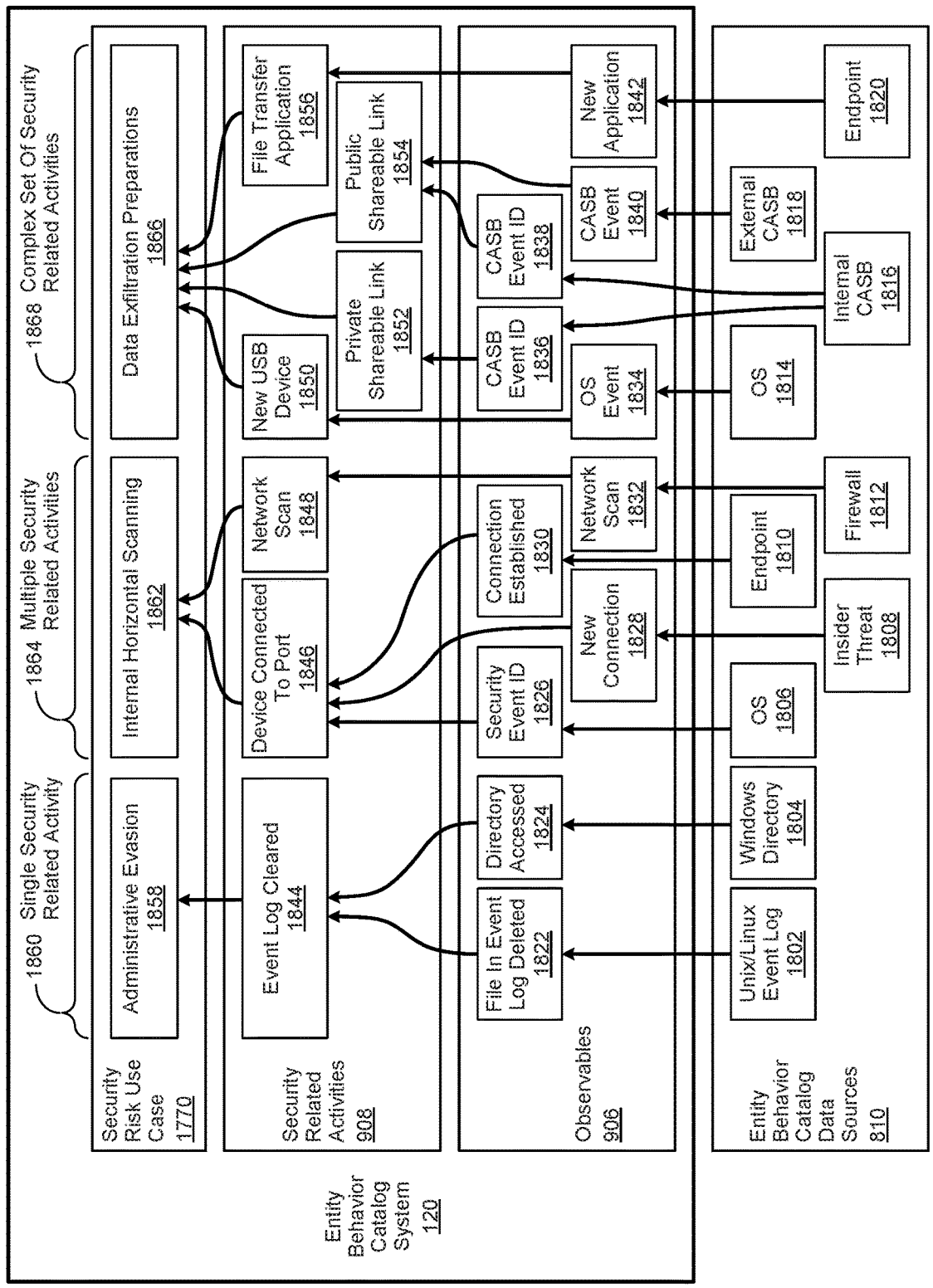
FIG. 18 is a simplified block diagram showing the mapping of entity behaviors to a risk use case scenario.

FIG. 18 is a simplified block diagram showing the mapping of entity behaviors to a risk use case scenario implemented in accordance with an embodiment of the invention. In certain embodiments, an entity behavior catalog (EBC) system 120 may be implemented, as described in greater detail herein, to receive event information from a plurality of EBC data sources 810, which is then processed to determine whether a particular event is of analytic utility. In certain embodiments, the EBC system 120 may be implemented to derive observables 906 from identified events of analytic utility, as likewise described in greater detail herein. In certain embodiments, the EBC system 120 may be implemented, as described in greater detail herein, to associate related observables 906 with a particular security related activity 908, which in turn is associated with a corresponding security risk use case 1770. In various embodiments, certain contextual information may be used, as described in greater detail herein, to determine which security related activities 908 may be associated with which security risk use cases 1770.

In certain embodiments, a single 1860 security related activity 908 may be associated with a particular security risk use case 1770. For example, as shown in FIG. 18, event data may be received from a Unix/Linux® event log 1812 and a Windows® directory 1804. In this example, certain event data respectively received from the Unix/Linux® event log 1812 and Windows® directory 1804 may be associated with an event of analytic utility, which results in the derivation of observables 906 "File In Log Deleted" 1822 and "Directory Accessed" 1824. To continue the example, the resulting observables 906 "File In Log Deleted" 1822 and "Directory Accessed" 1824 may then be associated with the security related activity 908 "Event Log Cleared" 1844. In turn, the security related activity 908 "Event Log Cleared" 1844 may be associated with security risk use case 1770 "Administrative Evasion" 1858.

In certain embodiments, two or more 1864 security related activities 908 may be associated with a particular security risk use case 1770. For example, as shown in FIG. 18, event data may be received from an operating system (OS) 1806, an insider threat 1808 detection system, an endpoint 1810 and a firewall 1812. In this example, certain event data respectively received from the operating system (OS) 1806, an insider threat 1808 detection system, an endpoint 1810 and a firewall 1812 may be associated with an event of analytic utility. Accordingly, observables 906 "Security Event ID" 1826, "New Connection" 1826, may be respectively derived from the event data of analytical utility received from the endpoint 1810 and the firewall 1812 EBC data sources 810. Likewise, observables 906 "Connection Established" 1830 and "Network Scan" 1832 may be respectively derived from the event data of analytical utility received from the OS 1806, the insider threat 1808 detection system, EBC data sources 810.

To continue the example, the resulting observables 906 "Security Event ID" 1826, "New Connection" 1826 and "Connection Established" 1830 may be associated with security related activity 908 "Device Connected To Port" 1846. Likewise, observable 906 "Network Scan" 1832 may be associated with security related activity 908 "Network Scan" 1848. In turn, the security related activities 908 "Device Connected To Port" 1846 and "Network Scan" 1832 may be associated with security risk use case 1770 "Internal Horizontal Scanning" 1862.

In certain embodiments, a complex set 1868 of security related activities 908 may be associated with a particular security risk use case 1770. For example, as shown in FIG. 18, event data may be received from an OS 1814, an internal cloud access security broker (CASB) 1816, an external CASB 1818, and an endpoint 1820. In this example, certain event data respectively received from the OS 1814, the internal cloud access security broker (CASB) 1816, the external CASB 1818, and the endpoint 1820 may be associated with an event of analytic utility.

Accordingly, observables 906 "OS Event" 1834, "CASB Event" 1840, and "New Application" 1842 may be respectively derived from the event data of analytical utility provided by the OS 1814, the external CASB 1818, and the endpoint 1820 EBC data sources 810. Likewise, a first "CASB Event ID" 1836 observable 906 and a second "CASB Event ID" 1838 observable 906 may both be derived from the event data of analytical utility received from the internal CASB 1816 EBC data source 810.

To continue the example, the "OS Event" 1834, the first "CASB Event ID" 1836, and "New Application" 1842 observables 906 may then be respectively associated with security related activities 908 "New USB Device" 1850, "Private Shareable Link" 1852, and "File Transfer Application" 1856. Likewise, second "CASB Event ID" 1838 observable 906 and the "CASB Event" 1840 observable 906 may then be associated with security related activity 908 "Public Shareable Link 1854" 1848. In turn, the security related activities 908 "New USB Device" 1850, "Private Shareable Link" 1852, "Public Shareable Link 1854" 1848, and "File Transfer Application" 1856 may be associated with security risk use case 1770 "Data Exfiltration Preparations" 1866.

Figure 19:
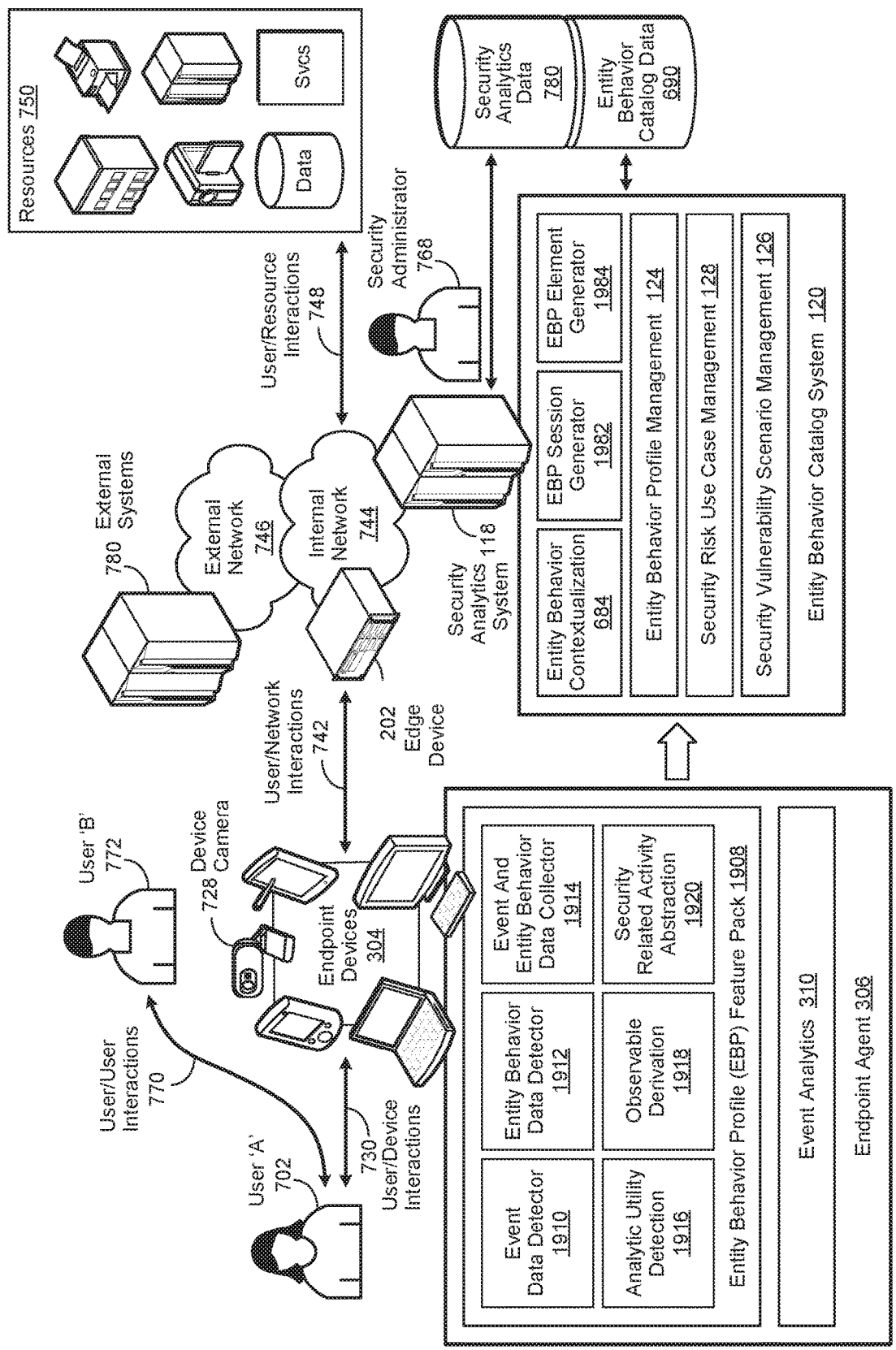
FIG. 19 is a simplified block diagram of an EBC system environment.

FIG. 19 is a simplified block diagram of an entity behavior catalog (EBC) system environment implemented in accordance with an embodiment of the invention. In certain embodiments, the EBC system environment may be implemented to detect user or non-user entity behavior of analytic utility and respond to mitigate risk, as described in greater detail herein. In certain embodiments, the EBC system environment may be implemented to include a security analytics system 118, likewise described in greater detail herein. In certain embodiments, the security analytics system 118 may be implemented to include an EBC system 120.

In certain embodiments, the EBC system 120, as described in greater detail herein, may be implemented to use entity behavior information to generate an entity behavior profile (EBP), likewise as described in greater detail herein. In certain embodiments, the security analytics system 118 may be implemented to use one or more session-based fingerprints to perform security analytics operations to detect such user or non-user entity behavior. In certain embodiments, the security analytics system 118 may be implemented to monitor entity behavior associated with a user entity, such as a user 'A' 702 or user 'B' 772. In certain embodiments, the user or non-user entity behavior may be monitored during user/device 730, user/network 742, user/resource 748, and user/user 770 interactions. In certain embodiments, the user/user 770 interactions may occur between a first user, such as user 'A' 702 and user 'B' 772.

In certain embodiments, as described in greater detail herein, an endpoint agent 306 may be implemented on an endpoint device 304 to perform user or non-user entity behavior monitoring. In certain embodiments, the user or non-user entity behavior may be monitored by the endpoint agent 306 during user/device 730 interactions between a user entity, such as user 'A' 702, and an endpoint device 304. In certain embodiments, the user or non-user entity behavior may be monitored by the endpoint agent 306 during user/network 742 interactions between user 'A' 702 and a network, such as an internal 744 or external 746 network. In certain embodiments, the user or non-user entity behavior may be monitored by the endpoint agent 306 during user/resource 748 interactions between user 'A' 702 and a resource 750, such as a facility, printer, surveillance camera, system, datastore, service, and so forth. In certain embodiments, the monitoring of user or non-user entity behavior by the endpoint agent 306 may include the monitoring of electronically-observable actions respectively enacted by a particular user or non-user entity. In certain embodiments, the endpoint agent 306 may be implemented in combination with the security analytics system 118 and the EBC system 120 to detect entity behavior of analytic utility and perform a security operation to mitigate risk.

In certain embodiments, the endpoint agent 306 may be implemented to include an event analytics 310 module and an EBP feature pack 2008. In certain embodiments, the EBP feature pack 1908 may be further implemented to include an event data detector 1910 module, an entity behavior data detector 1912 module, an event and entity behavior data collection 1914 module, an analytic utility detection 1916 module, an observable derivation 1918 module, and a security related activity abstraction 1920 module, or a combination thereof. In certain embodiments, the event data detector 1910 module may be implemented to detect event data, described in greater detail herein, resulting from user/device 730, user/network 742, user/resource 748, and user/user 770 interactions. In various embodiments, the entity behavior detector 2012 module may be implemented to detect certain user and non-user entity behaviors, described in greater detail herein, resulting from user/device 730, user/network 742, user/resource 748, and user/user 770 interactions.

In various embodiments, the event and entity behavior data collection 1914 module may be implemented to collect certain event and entity behavior data associated with the user/device 730, user/network 742, user/resource 748, and user/user 770 interactions. In certain embodiments, the analytic utility detection 1916 may be implemented to detect entity behavior of analytic utility associated with events corresponding to the user/device 730, user/network 742, user/resource 748, and user/user 770 interactions. In various embodiments, the observable derivation 2018 module may be implemented to derive observables, described in greater detail herein, associated with events of analytical utility corresponding to the user/device 730, user/network 742, user/resource 748, and user/user 770 interactions. In various embodiments, the security related activity abstraction 1918 module may be implemented to generate a security related activity, likewise described in greater detail herein, from the observables derived by the observable derivation 1916 module.

In certain embodiments, the endpoint agent 306 may be implemented to communicate the event and entity behavior collected by the event and entity behavior data collector 1914 module, the observables derived by the observable derivation 1916 module, and the security related activities generated by the security related activity abstraction 1918, or a combination thereof, to the security analytics 118 system. In certain embodiments, the security analytics system 118 may be implemented to receive the event and entity behavior data, the observables, and the security related activities provided by the endpoint agent 306. In certain embodiments, the security analytics system 118 may be implemented to provide the event and entity behavior data, the observables, and the security related activities, or a combination thereof, to the security analytics system 118. In turn, in certain embodiments, the security analytics system 118 may be implemented in certain embodiments to provide the event and entity behavior data, the observables, and the security related activities, or a combination thereof, to the EBC system 120 for processing.

In certain embodiment, the EBC system 120 may be implemented to include an entity behavior contextualization 684 module, an EBP session generator 1982 module, an EBP element generator 1984, or a combination thereof. In certain embodiments, the EBC system 120 may likewise be implemented to include an EBP management 124, a security risk use case management 128 module, and a security vulnerability scenario management 126 module, or a combination thereof. In certain embodiments, the EBP element generator 1982 module may be implemented to process the event and entity behavior data, the observables, and the security related activities provided by the endpoint agent 306 to generate EBP elements, described in greater detail herein. In certain embodiments, the EBP session generator 1984 may be implemented to use the event and entity behavior data, the observables, and the security related activities provided by the endpoint agent 306, to generate session information. In certain embodiments, the EBP session generator 1984 may be implemented to use the resulting session information to generate an activity session, described in greater detail herein.

In various embodiments, the EBP management 124 module may be implemented, as described in greater detail herein, to perform certain EBP management operations, described in greater detail herein. As likewise described in greater detail herein, certain EBP management operations may be performed to associate EBP elements generated by the EBP element generator 1982 module with a corresponding EBP. Likewise, certain EBP management operations may be performed to use the session information generated by the EBP session generator 1984 module to associate a particular EBP element with a particular EBP. In various embodiments, the security risk use case management 128 module may be implemented to perform certain security risk use case association operations, as described in greater detail herein. Likewise, as described in greater detail herein, the security vulnerability management 126 module may be implemented in various embodiments to perform certain security vulnerability scenario inference operations.

In certain embodiments, the EBC system 120 may be implemented as a distributed system. Accordingly, various embodiments of the invention reflect an appreciation that certain modules, or associated functionalities, may be implemented either within the EBC system 120 itself, the EBP feature pack 1908, an edge device 202, an internal 744 or external 746 network, an external system 780, or some combination thereof. As an example, the functionality provided, and operations performed, by the analytic utility detection 1916, observable derivation 2018 and security related activity abstraction 1920 modules may be implemented within the EBC system 120 in certain embodiments. Likewise, the functionality provided, and operations performed, by the entity behavior contextualization 684, EBP session generator 1982, and EBP element generator 1984 may be implemented within the EBP feature pack 1908. Those of skill in the art will recognize that many such implementations are possible. Accordingly, the foregoing is not intended to limit the spirit, scope, or intent of the invention.

Figure 20:
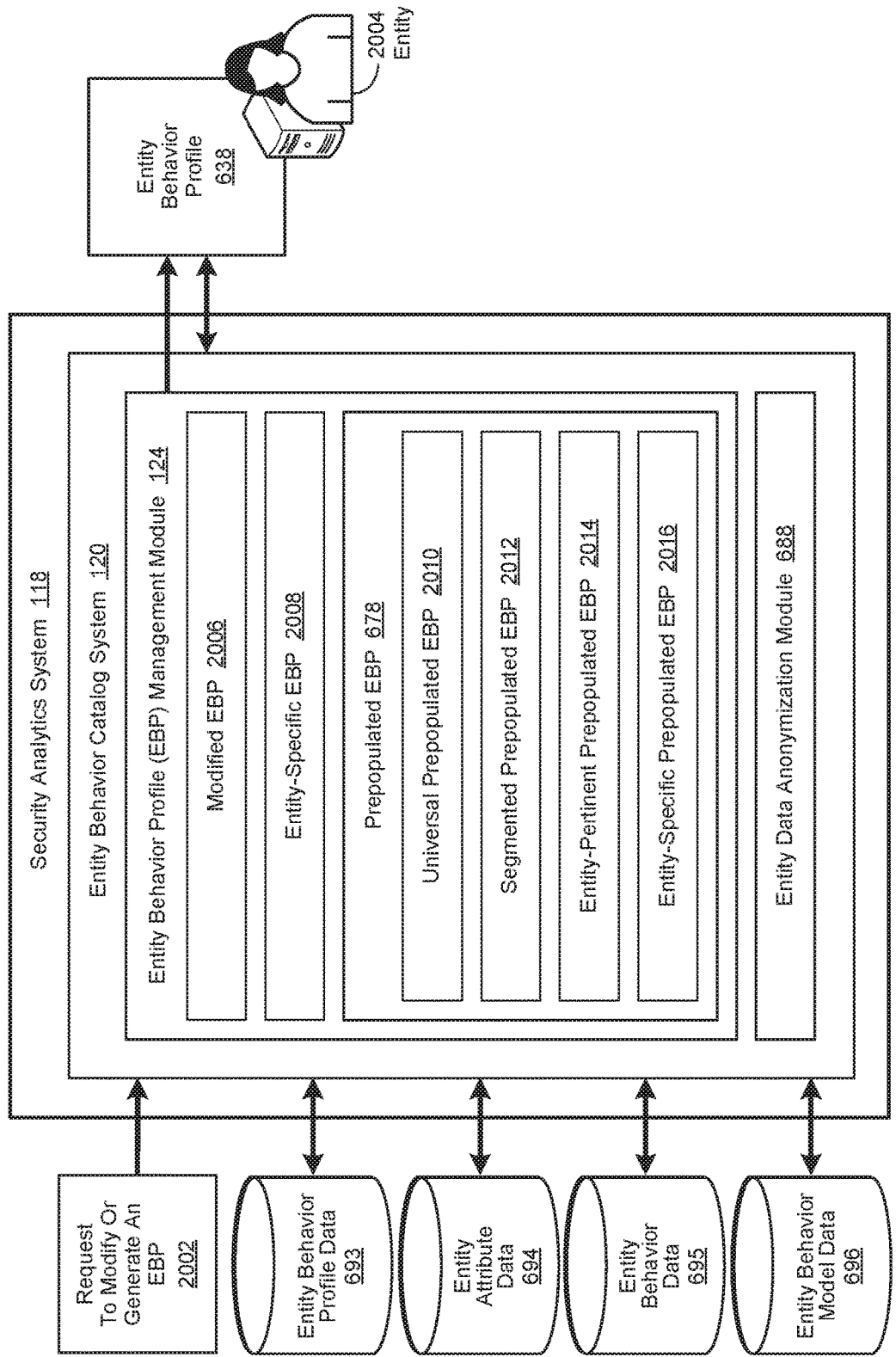
FIG. 20 is a simplified block diagram of an EBC system used to modify an existing, or generate a new EBP.

FIG. 20 is a simplified block diagram of an entity behavior catalog (EBC) system implemented in accordance with an embodiment of the invention to modify an existing, or generate a new, entity behavior profile (EBP). Certain aspects of the invention reflect an appreciation that the block diagram shown in this figure provides additional detail in support of the flowchart steps shown in FIGS. 21a-c and FIGS. 22a-d. In certain embodiments, as described in greater detail herein, a security analytics system 118 may be implemented to include an EBC system 120. In certain embodiments, the EBC system 120 may be implemented to include an EBP management 124 module, or an entity data anonymization 688 module, or both.

In certain embodiments, the EBC system 120 may be implemented to receive a request 2002 to modify an existing, or generate a new, EBP 638. In various embodiments, the request 2002 may be received by the EBP management 124 module, which then performs certain EBP management operations to generate a modified 2006 EBP or an entity-specific 2008 EBP. As used herein, a modified 2006 EBP broadly refers to an existing EBP 638 associated with a particular entity 2004 whose entity behavior information collection parameters have been revised. In certain embodiments, the revisions to the EBP's 638 entity behavior information collection parameters may include increasing, decreasing, or otherwise changing the amount, type, or nature of entity behavior information that is collected.

As an example, a user entity 2004 may be employed as a claims processor for an insurance company and have an associated EBP 638 containing information related to their identity and behavior in that role. In this example, the user entity 2004 may accept a new position as a claims adjustor, which in turn may involve accessing certain additional information resources. As a result, the user entity's 2004 associated EBP 638 may be processed by the EBP management 124 module to generate a modified EBP 2006, which in turn is then processed to contain certain EBP elements associated with the new information resources. Once the modified EBP 2006 is generated, it can then be associated with the user entity 2004 as their current EBP 638.

In various embodiments, the EBP's 638 information collection parameters may be associated with certain EBP elements, described in greater detail herein. In certain of these embodiments, the information collected by, or associated with, a particular EBP 638, whether directly or indirectly, may be related to its associated entity's 2004 identity and entity behavior, as likewise described in greater detail herein. In certain embodiments, a modified EBP 2006 generated by the EBP management 124 module from an existing EBP 638 associated with a particular entity 2004 may be implemented to replace the entity's 2004 existing EBP 638.

In certain embodiments, a modified EBP 2006 generated by the EBP management 124 module from an existing EBP 638 associated with a particular entity 2004 may be implemented to be associated with the same entity 2004 in addition to its existing EBP 638. As an example, a user entity 2004 may have a primary role in an organization, and as a result have a primary EBP 638. However, the same user entity 2004 may be assigned a secondary role. As a result, the user entity's 2004 existing EBP 638 may be processed by the EBP management 124 module to generate a modified EBP 2006, which in turn is revised to accommodate entity behavior information related to the user entity's 2004 secondary role. The resulting modified EBP 2006 can then be associated with the user entity 2004 as a second EBP 638.

In certain embodiments, a modified EBP 2006 generated by the EBP management 124 module from a particular EBP 638 associated with a first entity 2004 may be implemented to be associated with a second entity 2004. For example, a user entity 2004 may be employed by a company as an account executive. As a result, information related to their associated behavior may be stored in an associated EBP 638. In this example, another user entity 2004 may be hired as a second account executive. To continue the example, the first user entity's 2004 existing EBP 638 may be processed by the EBP management 124 module to generate a modified EBP 2006, which in turn can then be associated with the second user entity 2004 as their initial EBP 638.

In various embodiments, a prepopulated EBP 678 may be implemented to contain certain prepopulated EBP elements that have been anonymized. In certain of these embodiments, the entity data anonymization 688 module may be implemented to perform the anonymization of the prepopulated EBP elements. In various embodiments, a modified EBP 2006 generated by the EBP management 124 module from a particular EBP 638 associated with a first entity 2004 may be implemented to contain certain EBP elements that have been anonymized prior to being associated with a second entity 2004. To continue the prior example, any personally-identifiable information (PII) associated with the first user entity 2004 in the modified EBP 2006 is anonymized by the entity data anonymization 688 module. Once all PII has been anonymized, the resulting modified EBP 2006 can then be associated with the second user entity 2004 as a their initial EBP 638.

As likewise used herein, an entity-specific 2008 EBP broadly refers to an EBP 638 that may contain certain EBP elements related to a particular entity 2004, but not yet associated with the entity 2004. For example, a user entity 2004 may join an organization, and as a result, provide certain PII, which in turn may be processed with certain entity attribute data to generate user credentials, authentication factors, access rights and so forth. In this example the resulting EBP elements may then be used to populate an entity-specific EBP 2006, which in turn may then be associated with the user entity 2004 as their initial EBP 638. In this example, information related to the user entity's behavior is then added to their EBP 638 over time.

In various embodiments, an entity-specific 2008 EBP implemented as an EBP 638 may be associated with a user entity 2004 whose identity may not be initially known. As an example, an unknown user entity 2004 may begin navigating the web site of an organization. In this embodiment, an entity-specific 2008 may be implemented as an EBP 638, which is then associated with the unknown user entity 2004.

From that point forward, the unknown user entity's 2004 behavior is captured and stored in its associated EBP 638.

In certain of these embodiments, the identity of an entity 2004 associated with an EBP 638 may be established over time. To continue the prior example, at some point in time, the unknown user entity 2004 may be requested to provide some form of identity information. If there is a positive response to the request, then the identity information is added to the EBP 638 associated with the user entity 2004.

In certain embodiments, the EBP management 124 module may be implemented to generate a prepopulated EBP 678, described in greater detail herein. In various embodiments, the EBP generator 124 module may be implemented to process one or more prepopulated EBPs 678 previously-generated by the EBP management 124 module to in turn generate an EBP 638. In certain of these embodiments, the resulting EBP 638 may then be associated with one or more entities 2004. In these embodiments, the method by which the entity 2004 is selected, and the resulting EBP 638 is associated with it, is a matter of design choice.

In certain embodiments, a prepopulated EBP 678 may be implemented as a universal 2010, a segmented 2012, an entity-pertinent 2014, or entity-specific 2016 prepopulated EBP. As used herein, a universal 2010 prepopulated EBP broadly refers to a prepopulated EBP 678 implemented to accommodate certain prepopulated EBP elements, as described in greater detail herein. In certain embodiments, the universal 2010 prepopulated EBP may be implemented to accommodate prepopulated EBP elements corresponding to EBP elements supported by a particular EBP 638.

As an example, an EBP 638 may be implemented in certain embodiments to include EBP elements associated with a user entity profile, a user entity mindset profile, a non-user entity profile, and an entity state, as described in greater detail herein. Accordingly, a corresponding universal 2010 prepopulated EBP may be implemented in certain embodiments to include prepopulated EBP elements associated with a prepopulated user entity profile, a prepopulated user entity mindset profile, a prepopulated non-user entity profile, and a prepopulated entity state, as likewise described in greater detail herein.

In certain embodiments, prepopulated EBP elements associated with a prepopulated user entity profile may include prepopulated user profile attributes, prepopulated user behavior attributes, and prepopulated user mindset factors, as likewise describe in greater detail herein. In various embodiments, prepopulated EBP elements associated with a prepopulated non-user entity profile may likewise include certain prepopulated non-user profile attributes, as described in greater detail herein. In these embodiments, the prepopulated EBP elements selected for inclusion in a universal 2010 prepopulated EBP, and the method by which they are selected, is a matter of design choice.

As used herein, a segmented 2012 prepopulated EBP broadly refers to a prepopulated EBP 678 implemented to be composed of distinct groups, or segments, of prepopulated EBP elements. In certain embodiments, one or more segments of a segmented 2012 prepopulated EBP may be used, individually or in combination, by the EBP management 124 module to generate an EBP 638. In various embodiments, the prepopulated EBP elements selected for use as segment of a segmented 2012 EBP, and the method by which they are selected, is a matter of design choice.

As an example, in certain embodiments, the segments of a prepopulated EBP 678 selected for use as a segmented 2012 prepopulated EBP may include prepopulated EBP elements associated with a prepopulated user entity profile, a prepopulated user entity mindset profile, a prepopulated non-user entity profile, or a prepopulated entity state, or a combination thereof. As another example, in certain embodiments, the segments of a prepopulated EBP 678 selected for use as a segmented 2012 prepopulated EBP may include prepopulated EBP elements associated with prepopulated user profile attributes, prepopulated user behavior attributes, prepopulated user mindset factors, and prepopulated non-user profile attributes. Those of skill in the art will recognize many such embodiments are possible. Accordingly, the foregoing is not intended to limit the spirit, scope, or intent of the invention.

As used herein, an entity-pertinent 2014 prepopulated EBP broadly refers to a prepopulated EBP 678 that contains one or more prepopulated EBP elements commonly associated with a particular type or class of entity 2004. As an example, a cloud service provider may currently have three servers of the same manufacturer and configuration providing email service. Over time, the number of email accounts being serviced may grow and the capacity of the three current servers may begin to surpass their optimum operational parameters. As a result, the service provider may decide to purchase and deploy two additional servers from the same manufacturer with the same configuration to maintain optimum service levels.

In this example, all five servers are from the same manufacturer, have the same configuration, and are used for the same purpose. As a result, they can be considered a class of non-user entities, described in greater detail herein. To continue the example, the three original servers may each have an associated EBP 638. In further continuance of this example, certain EBP elements contained in the original EBPs 638 may be processed by the EBP management 124 module to generate a normalized set of EBP elements. In this example, the resulting set of normalized EBP elements can then be used as prepopulated EBP elements, likewise described in greater detail herein, by the EBP management 124 module to generate an entity-pertinent 2014 prepopulated EBP. In turn, the resulting entity-pertinent 2014 prepopulated EBP can be associated with the two new servers as their respective EBPs 638.

As used herein, an entity-specific 2016 prepopulated EBP broadly refers to a prepopulated EBP 678 that contains one or more prepopulated EBP elements associated with a particular entity 2004. As an example, a company may have a vice president of sales, a senior sales executive, and an inside sales associate, all of which have an associated EBP 638 reflecting their associated user entity's identity, access rights, and behavior. In this example, the company decides to hire an additional inside sales associate. Since there is only one other inside sales associate, their current EBP 638 may be retrieved and processed to generate an entity-specific 2016 prepopulated EBP. In certain embodiments, the entity data anonymization 688 module may be implemented to anonymize PII in the resulting entity-specific 2016 prepopulated EBP. Once any PII the entity-specific 2016 prepopulated EBP may contain has been anonymized, it can be associated with the newly-hired inside sales associate as their EBP 638.

In certain embodiments, the EBP management 124 module may be implemented to process a particular modified 2010 EBP for conversion into a prepopulated 678 EBP. In various embodiments, the EBP management 124 module may be implemented to use the entity data anonymization 688 module when converting a modified EBP 2010 into a prepopulated EBP 678 to anonymize certain entity behavior profile 693 entity attribute 694, entity behavior 695, or entity behavior model 696 data associated with an entity 2004. In certain embodiments, the EBP elements contained in a prepopulated EBP 678 may be implemented to contain, or reference, structured data, non-structured data, or a combination thereof.

In various embodiments, prepopulated EBP 678 modification and generation operations may be initiated by the receipt of a request 2002 to perform certain EBP operations to modify an existing, or generate a new, prepopulated EBP 678. In certain of these embodiments, the request 2002 is processed by the EBP management 124 module to retrieve relevant EBP 693, entity attribute 694, entity behavior 695, and entity behavior model 696 data associated with one or more entities 2004. If the request 2002 is to modify an existing prepopulated EBP 678, then the request 2002 may be processed in certain embodiments with the security vulnerability scenario data 691, security risk use case data 692 and EBP catalog data 690, and the existing prepopulated EBP 678, to determine which modifications are to be made. If it is decided to use one or more other prepopulated EBPs 678 relevant to making the modifications, then the request 2002, the retrieved EBP 693, entity attribute 694, entity behavior 695, and entity behavior model 696 data, and the existing prepopulated EBP 678, is processed to identify other relevant prepopulated EBPs 678 that may be used to make the modifications.

Once identified, the identified prepopulated EBPs 678 are retrieved and then processed with the request 2002, the retrieved EBP 693, entity attribute 694, entity behavior 695, and entity behavior model 696 data, and the existing prepopulated EBP 678, to generate a modified prepopulated EBP 678. In certain embodiments, the modified prepopulated EBP 678 may be generated as a universal 2010, a segmented 2012, an entity-pertinent 2014, or an entity-specific 2016 prepopulated EBP. The resulting prepopulated EBP 678 may then be stored in the repository of EBP data 693.

In certain embodiments, it may be decided to not use one or more other prepopulated EBPs 678 relevant to making the modifications. If so, then the request 2002, the retrieved EBP 693, entity attribute 694, entity behavior 695, and entity behavior model 696 data, and the existing prepopulated EBP 678 are processed to generate a modified prepopulated EBP 678 as previously described. As likewise previously described, the resulting prepopulated EBP 678 may then be stored in the repository of EBP data 693.

In various embodiments, it may be decided to use a universal 2010 EBP to generate a new prepopulated EBP 678 instead of modifying an existing prepopulated EBP 678. In certain of these embodiments, the request 2002, the retrieved EBP 693, entity attribute 694, entity behavior 695, and entity behavior model 696 data, and a target universal 2010 prepopulated EBP are then processed to generate a new prepopulated EBP 678. As previously described, the resulting prepopulated EBP 678 may then be stored in the repository of EBP data 693.

In various embodiments, it may be decided to use a segmented 2012 EBP to generate a new prepopulated EBP 678 instead of modifying an existing prepopulated EBP 678. In certain of the embodiments, the request 2002, along with relevant EBP 693, entity attribute 694, entity behavior 695, and entity behavior model 696 data is processed to identify relevant segments of one or more target segmented 2012 prepopulated EBPs. In turn, the request 2002, the relevant EBP 693, entity attribute 694, entity behavior 695, and entity behavior model 696 data, and the identified relevant EBP segments, are then processed to generate a new prepopulated EBP 678. As previously described, the resulting prepopulated EBP 678 may then be stored in the repository of EBPs 693 data.

In various embodiments, it may be decided to use an entity-pertinent 2014 EBP to generate a new prepopulated EBP 678 instead of modifying an existing prepopulated EBP 678. In certain of these embodiments, the request 2002, the retrieved EBP 693, entity attribute 694, entity behavior 695, and entity behavior model 696 data, and a target entity-pertinent 2014 prepopulated EBP, are then processed to generate a new prepopulated EBP 678. As previously described, the resulting prepopulated EBP 678 may then be stored in a repository of EBP 693 data.

In various embodiments, it may be decided to use an entity-specific 2016 EBP to generate a new prepopulated EBP 678 instead of modifying an existing prepopulated EBP 678. In certain of these embodiments, the request 2002, the retrieved EBP 693, entity attribute 694, entity behavior 695, and entity behavior model 696 data, and a target entity-specific 2016 prepopulated EBP, are then processed to generate a new prepopulated EBP 678. As previously described, the resulting prepopulated EBP 678 may then be stored in a repository of EBP 693 data.

In various embodiments, EBP 638 modification and generation operations may be initiated by the receipt of a request 2002 to perform certain EBP management operations to modify an existing, or generate a new, prepopulated EBP 638 for a target entity 2004. In certain of these embodiments, the request 2002 is processed to retrieve relevant EBP 693, entity attribute 694, entity behavior 695, and entity behavior model 696 data associated with one or more entities 2004.

If the request 2002 is to modify an existing EBP 638, then the request 2002 may be processed in certain embodiments with the retrieved EBP 693, entity attribute 694, entity behavior 695, and entity behavior model 696 data, and the existing EBP 638, to determine which modifications are to be made. If it is decided to use one or more other EBPs 638 relevant to making the modifications, then the request 2002, the retrieved EBP 693, entity attribute 694, entity behavior 695, and entity behavior model 696 data, and the existing EBP 638, is processed to identify other relevant EBPs 638 that may be used to make the modifications. In certain embodiments, the relevant EBPs 638 that may be used to make the modifications may be stored in the repository of EBP 693 data.

Once identified, the identified other EBPs 638 are retrieved and then processed with the request 2002, the retrieved EBP 693, entity attribute 694, entity behavior 695, and entity behavior model 696 data, and the existing EBP 638, to generate a modified EBP 638. The resulting modified EBP 638 may then be associated with the entity 2004. In certain embodiments, it may be decided to not use one or more other EBPs 638 relevant to making the modifications. If so, then the request 2002, the retrieved EBP 693, entity attribute 694, entity behavior 695, and entity behavior model 696 data, and the existing EBP 638, are processed to generate a modified EBP 2006 as previously described. As previously described, the resulting modified EBP 2006 may then be associated with the entity 2004.

In various embodiments, it may be decided to use a universal 2010 EBP to generate a new EBP 638 instead of modifying an existing EBP 638. In certain of these embodiments, the request 2002, the retrieved EBP 693, entity attribute 694, entity behavior 695, and entity behavior model 696 data, and a target universal 2010 prepopulated EBP, are then processed to generate a new EBP 638. As previously described, the resulting new EBP 638 may then be associated with the entity 2004.

In various embodiments, it may be decided to use a segmented 2012 EBP to generate a new EBP 638 instead of modifying an existing EBP 638. In certain embodiments, the request 2002, along with relevant EBP 693, entity attribute 694, entity behavior 695, and entity behavior model 696 data is processed to identify relevant segments of one or more target segmented 2012 prepopulated EBPs. In turn, the request 2002, the relevant EBP 693, entity attribute 694, entity behavior 695, and entity behavior model 696 data, and the identified relevant EBP segments, are then processed to generate a new EBP 638. As previously described, the resulting new EBP 638 may then be associated with the entity 2004.

In various embodiments, it may be decided to use an entity-pertinent 2014 EBP to generate a new EBP 638 instead of modifying an existing EBP 638. In certain of these embodiments, the request 2002, the retrieved EBP 693, entity attribute 694, entity behavior 695, and entity behavior model 696 data, and a target entity-pertinent 2014 prepopulated EBP, are then processed to generate a new EBP 638. As previously described, the resulting new EBP 638 may then be associated with the entity 2004.

In various embodiments, it may be decided to use an entity-specific 2016 prepopulated EBP to generate a new EBP 638 instead of modifying an existing EBP 638. In certain of these embodiments, the request 2008, the retrieved EBP 693, entity attribute 694, entity behavior 695, and entity behavior model 696 data, and a target entity-specific 2016 prepopulated EBP are then processed to generate a new EBP 638. As previously described, the resulting new EBP 638 may then be associated with the entity 2004.

Figure 21A:
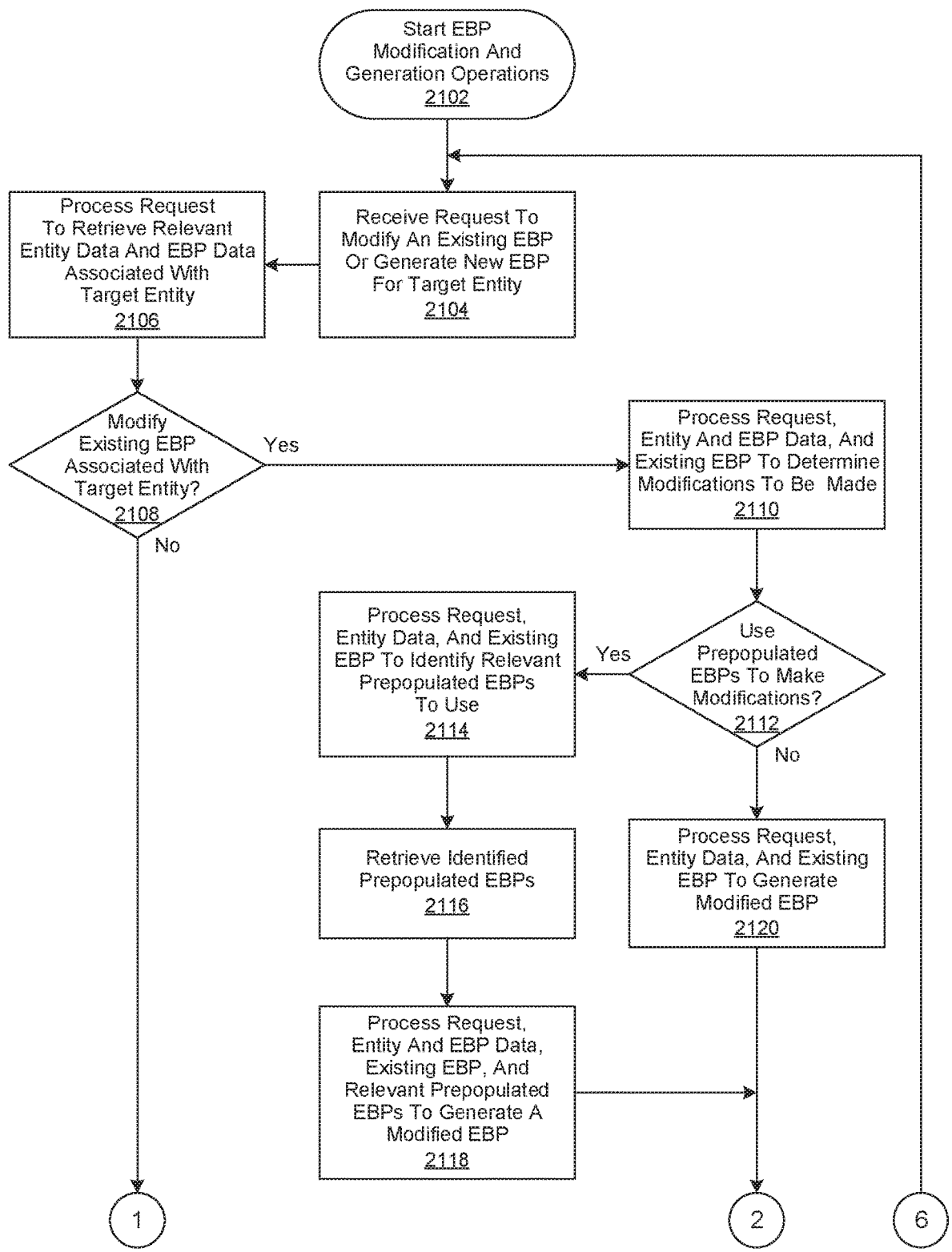
FIGS. 21a through 21c are a generalized flowchart of the performance of EBP system operations to generate a new, or modify an existing, EBP for an associated entity.
Figure 21B:
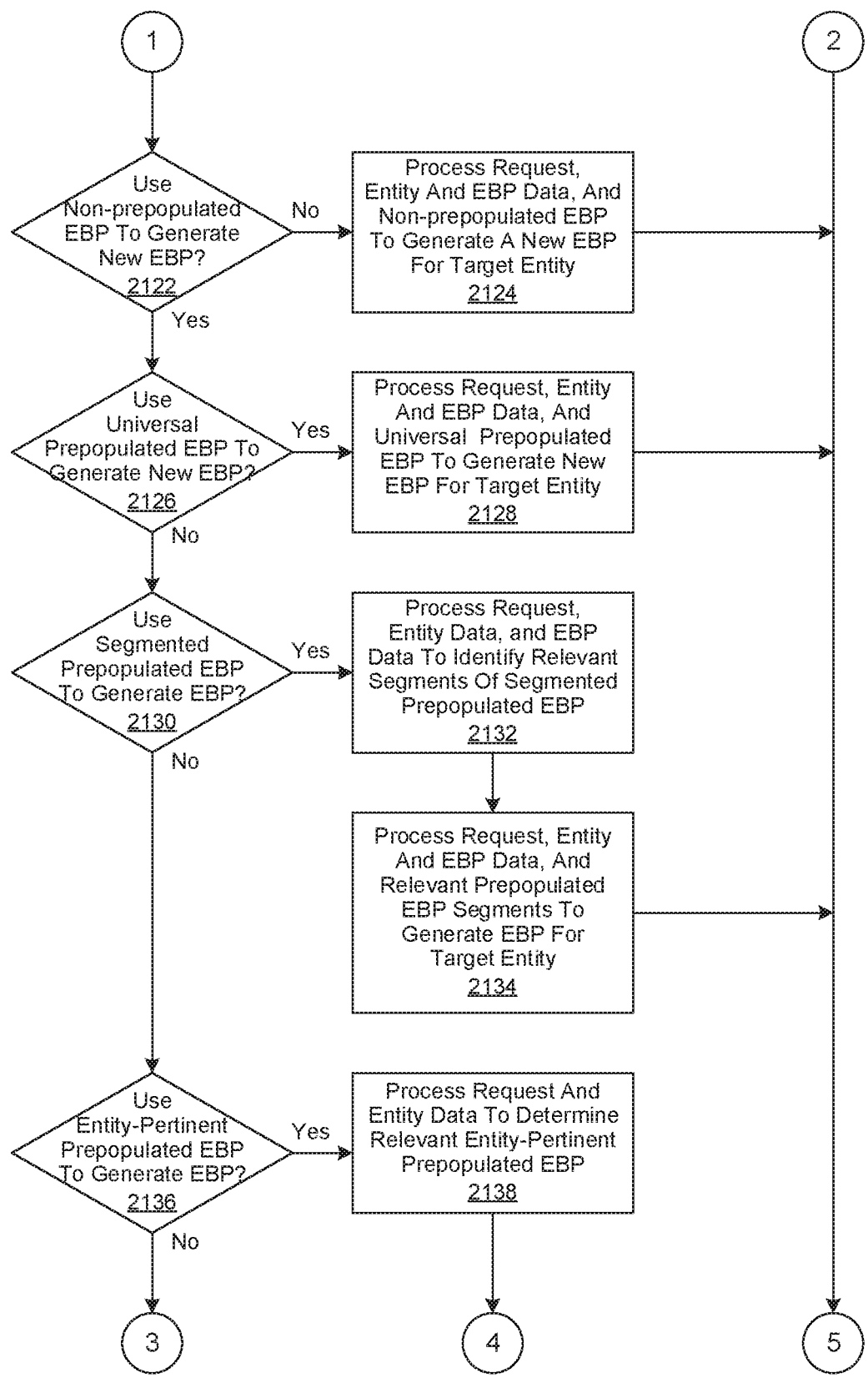
Figure 21C:
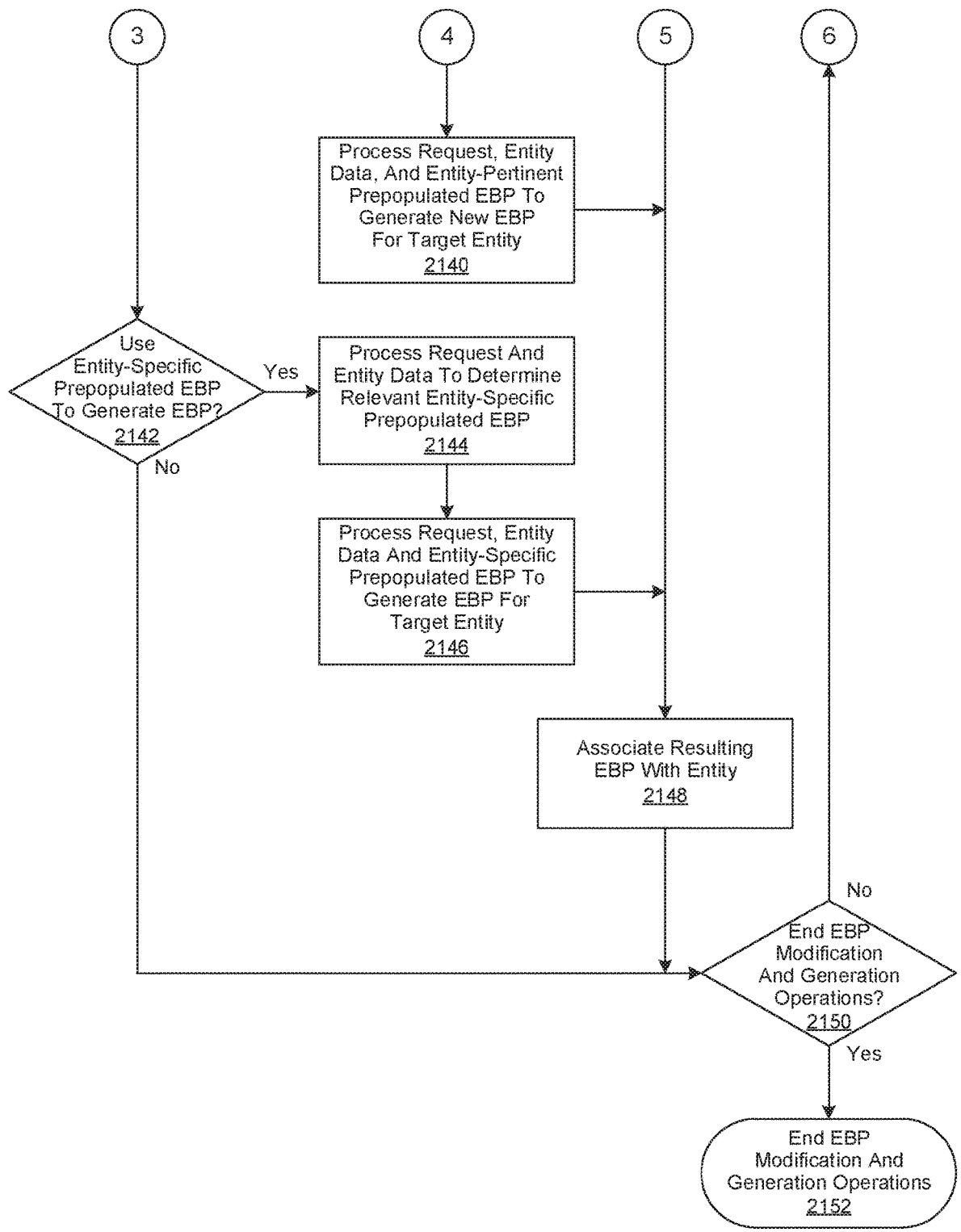
Figure 22A:
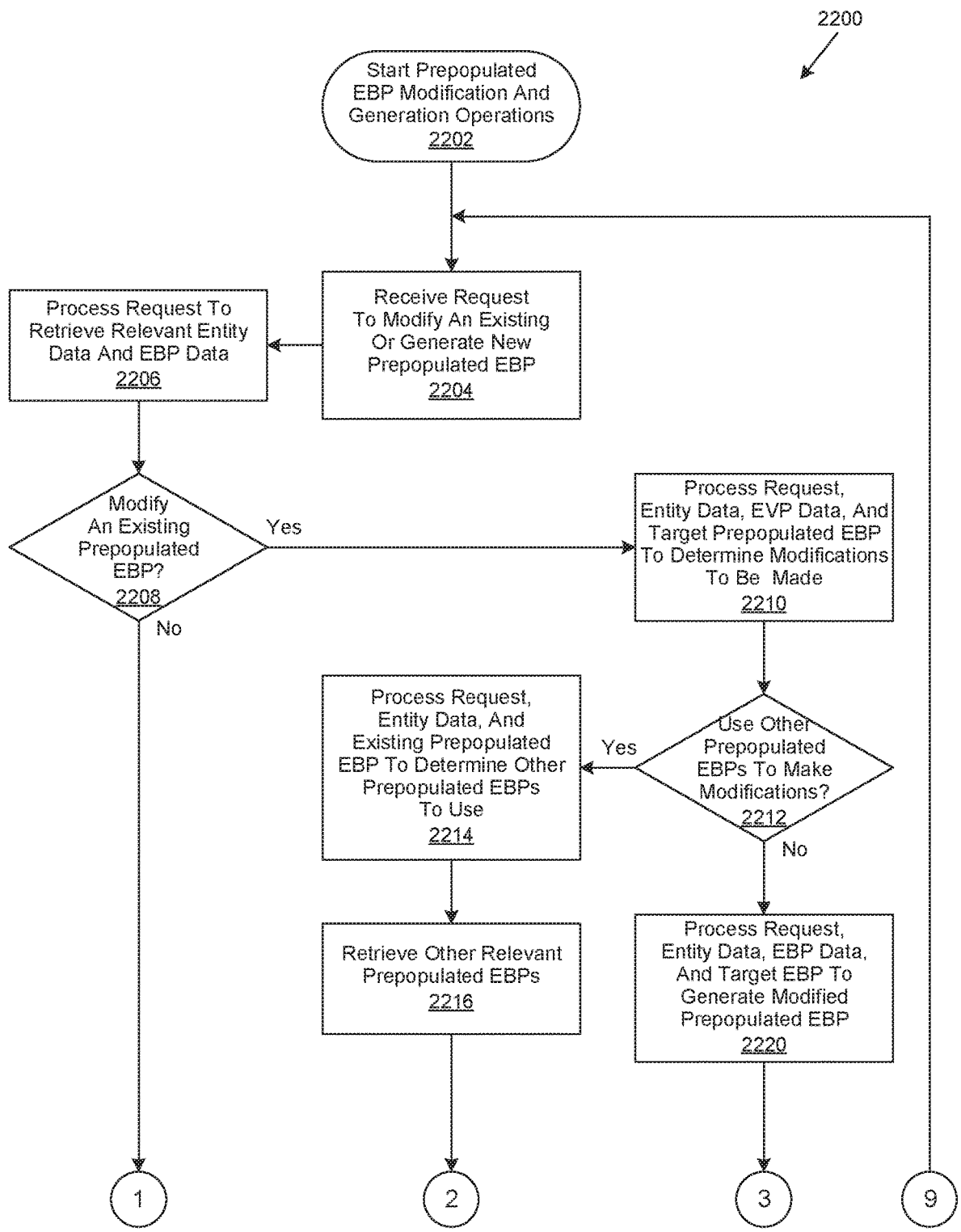
FIGS. 22a through 22d are a generalized flowchart of the performance of EBP system operations to generate a new, or modify an existing, prepopulated EBP.
Figure 22B:
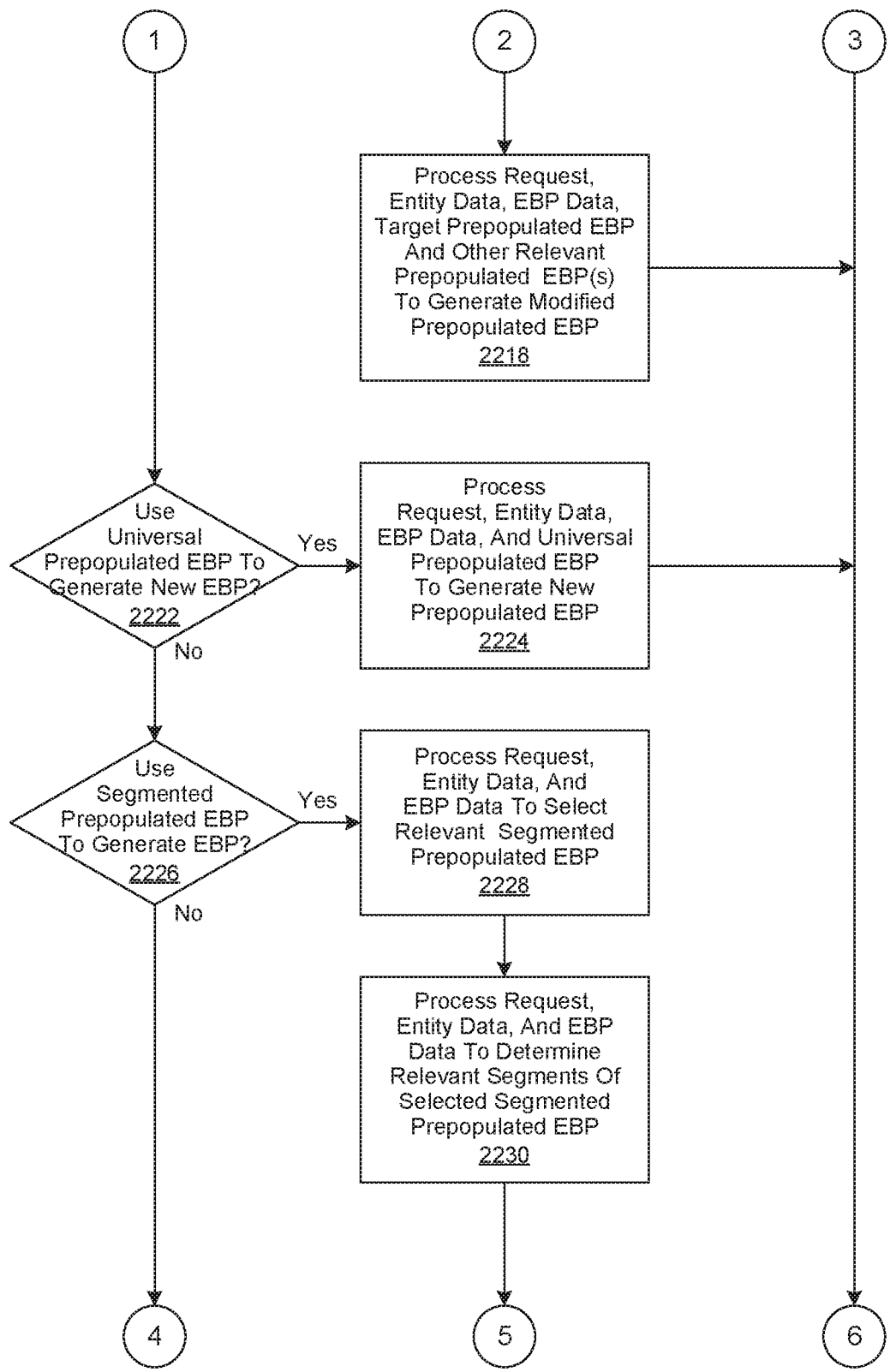
Figure 22C:
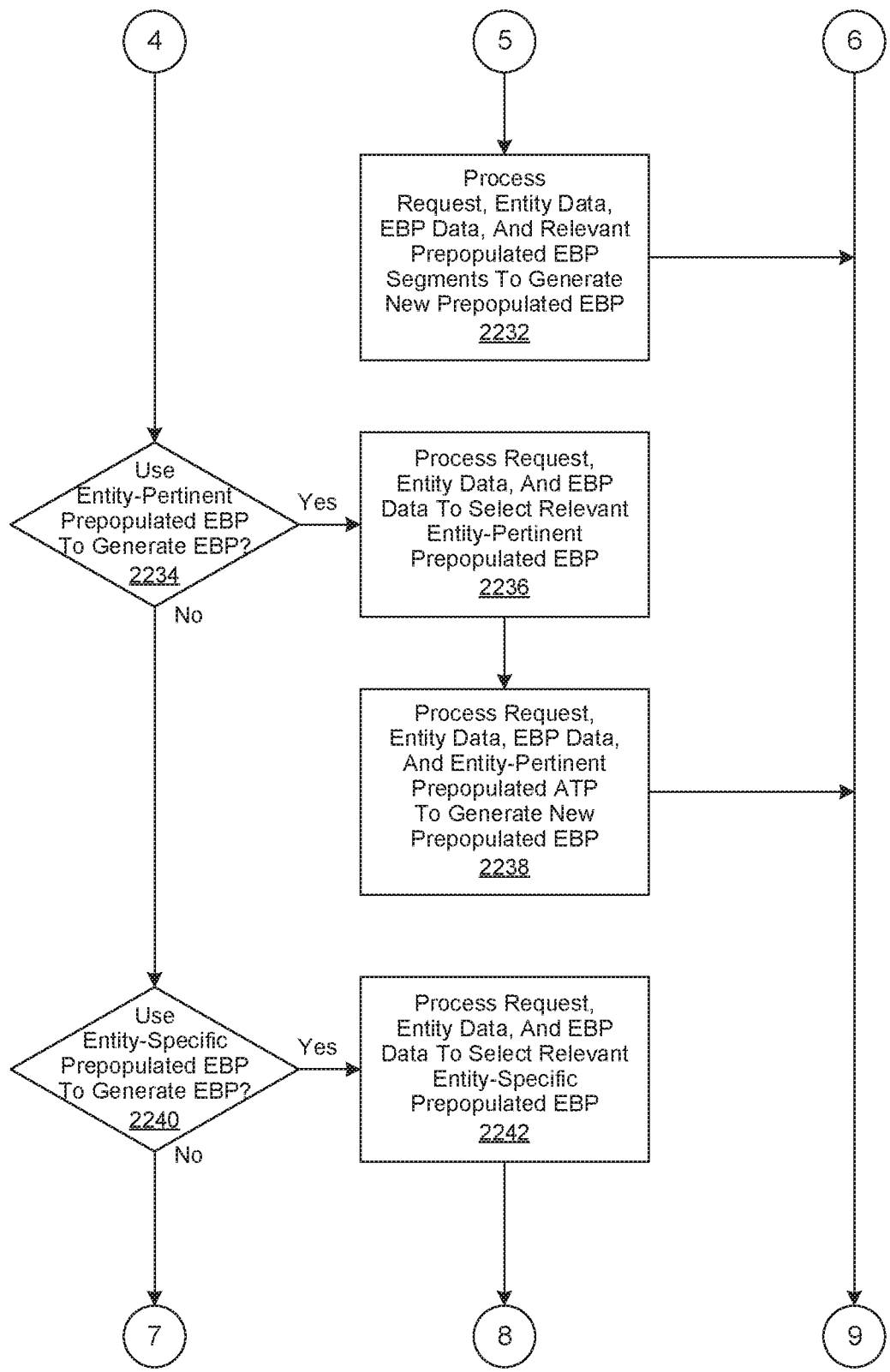
Figure 22D:
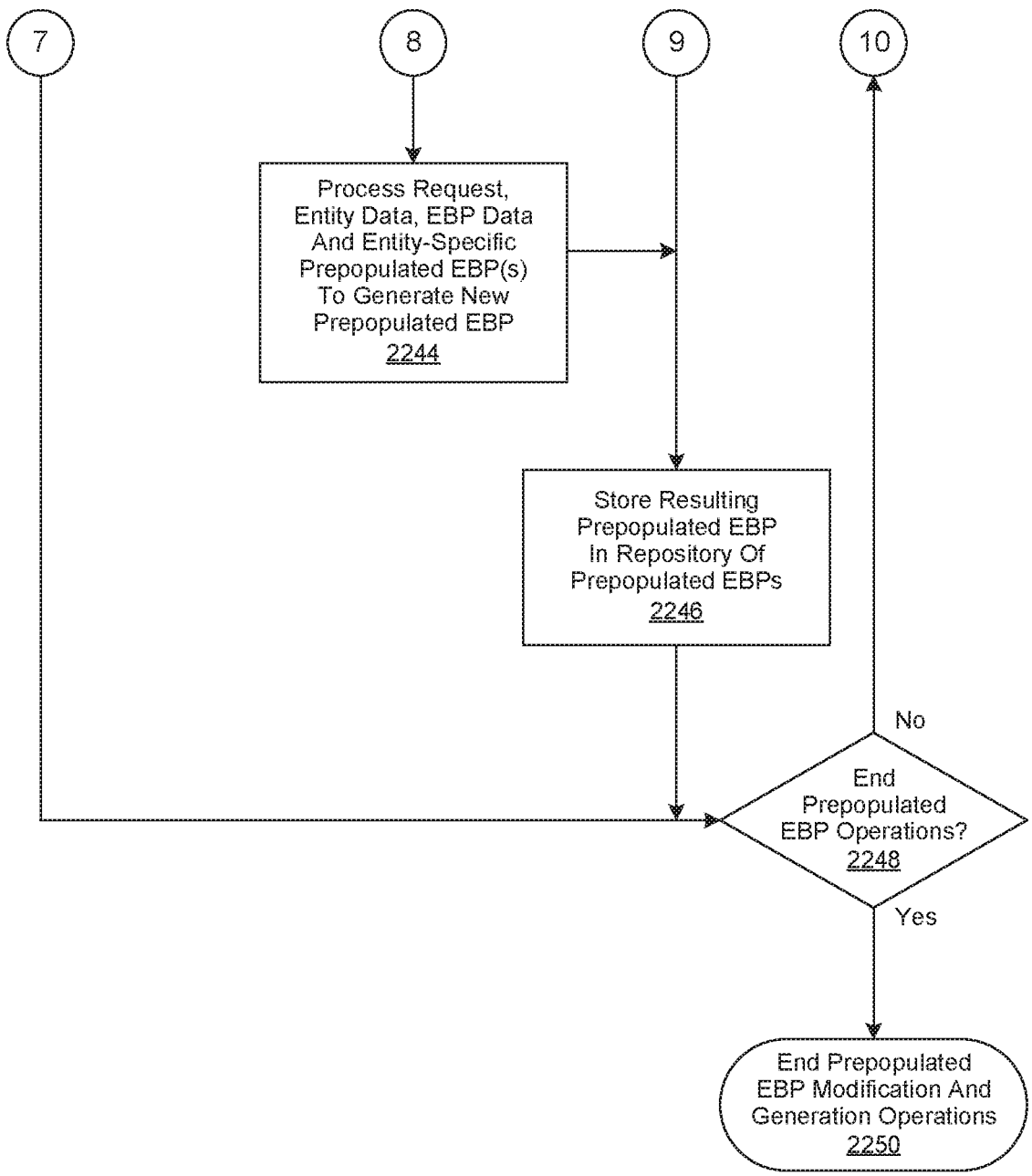

FIGS. 21*a* through 21*c* are a generalized flowchart of entity behavior profile (EBP) system operations performed in accordance with an embodiment of the invention to generate a new, or modify an existing, ATP for an associated entity. In this embodiment, EBP modification and generation operations are begun in step 2102, followed by the receipt of a request in step 2104 to perform certain EBP operations to modify an existing, or generate a new, EBP for a target entity. In turn, the request is processed in step 2106 to retrieve relevant entity and AP data associated with the entity, as described in greater detail herein.

A determination is then made in step 2108 whether the request received in step 2104 is to modify an existing EBP associated with the target entity. If so, then the request is processed in step 2110 with the retrieved entity and EBP data, and the existing EBP, to determine which modifications are to be made. A determination is then made in step 2112 whether to use one or more other prepopulated EBPs relevant to making the modifications. If so, the request, the retrieved entity and EBP data, and the existing EBP is processed in step 2114 to identify other relevant prepopulated EBPs that may be used to make the modifications.

Once identified, the identified prepopulated EBPs are retrieved in step 2216 and then processed in step 2218 with the request, the retrieved entity and EBP data, and the existing EBP, to generate a modified EBP. The resulting modified EBP is then associated with the entity in step 2148, followed by a determination being made in step 2150 whether to continue operations to modify an existing, or generating a new, EBP. If not, then the process is continued, proceeding with step 2104. Otherwise, operations to modify an existing, or generating a new, EBP are ended in step 2152.

However, if it was determined in step 2108 not to modify an existing EBP associated with an entity, then a determination is made in step 2122 whether to use a non-prepopulated EBP to generate a new EBP for the target entity. If so, the request, the retrieved entity and EBP data, and a target non-prepopulated EBP are processed in step 2124 to generate a new EBP for the target entity. The process is then continued, proceeding with step 2148.

However, if it was determined in step 2122 not to use a non-prepopulated EBP, then a determination is made in step 2126 whether to use a universal prepopulated EBP to generate a new EBP for the target entity. If so, the request, the retrieved entity and EBP data, and a target universal prepopulated EBP are processed in step 2128 to generate a new EBP for the target entity. The process is then continued, proceeding with step 2148.

However, if it was determined in step 2126 not to use a universal prepopulated EBP, then a determination is made in step 2130 whether to use a segmented prepopulated EBP to generate a new EBP for the target entity. If so, the request, along with the retrieved entity and EBP data, is then processed in step 2132 to identify relevant segments of one or more segmented prepopulated EBPs. The request, the retrieved entity and EBP data, and the identified relevant EBP segments are then processed in step 2134 to generate a new EBP for the target entity. The process is then continued, proceeding with step 2148.

However, if it was determined in step 2130 not to use a segmented prepopulated EBP, then a determination is made in step 2136 whether to use an entity-pertinent prepopulated EBP to generate a new EBP for the target entity. If so, the request, along with the retrieved entity and EBP data, is processed in step 2138 to identify one or more entity-pertinent prepopulated EBPs. The request, along with the retrieved entity and EBP data, and the one or more identified entity-pertinent prepopulated EBPs are processed in step 2140 to generate a new EBP for the target entity. The process is then continued, proceeding with step 2148.

However, if it was determined in step 2136 not to use an entity-pertinent prepopulated EBP, then a determination is made in step 2142 whether to use an entity-specific prepopulated EBP to generate a new EBP for the target entity. If so, the request, along with the retrieved entity and EBP data, is processed in step 2144 to identify one or more entity-specific prepopulated EBPs. The request, along with the retrieved entity and EBP data, and the one or more identified entity-specific prepopulated EBPs are processed in step 2146 to generate a new EBP for the target entity. The process is then continued, proceeding with step 2148.

FIGS. 22*a* through 22*d* are a generalized flowchart of entity behavior profile (EBP) system operations performed in accordance with an embodiment of the invention to generate a new, or modify an existing, prepopulated EBP. In this embodiment, prepopulated EBP modification and generation operations are begun in step 2202, followed by the receipt of a request in step 2204 to perform certain EBP operations to modify an existing, or generate a new, prepopulated EBP. In turn, the request is processed in step 2206 to retrieve relevant entity and EBP data, as described in greater detail herein.

A determination is then made in step 2208 whether the request received in step 2204 is to modify an existing prepopulated EBP. If so, then the request is processed in step 2210 with the retrieved entity and EBP data, and the existing prepopulated EBP, to determine which modifications are to be made. A determination is then made in step 2212 whether to use one or more other prepopulated EBPs relevant to making the modifications. If so, the request, the retrieved entity and EBP data, and the existing prepopulated EBP is processed in step 2214 to identify other relevant prepopulated EBPs that may be used to make the modifications.

Once identified, the identified prepopulated EBPs are retrieved in step 2216 and then processed in step 2218 with the request, the retrieved entity and EBP data, and the existing prepopulated EBP, to generate a modified prepopulated EBP. The resulting prepopulated EBP is then stored in a repository of prepopulated EBPs in step 2246, followed by a determination being made in step 2248 whether to continue operations to modify an existing, or generating a new, prepopulated EBP. If not, then the process is continued, proceeding with step 2204.

Otherwise, operations to modify an existing, or generating a new, prepopulated EBP are ended in step 2250. However, if it was determined in step 2212 not to use one or more other prepopulated EBPs relevant to making the modifications, then the request, the retrieved entity and EBP data, and the existing prepopulated EBP are processed in step 2220 to generate a modified prepopulated EBP. The process is then continued, proceeding with step 2246.

However, if it was determined in step 2208 not to modify an existing prepopulated EBP, then a determination is made in step 2222 whether to use a universal prepopulated EBP to generate a new prepopulated EBP. If so, the request, the retrieved entity and EBP data, and a target universal prepopulated EBP are processed in step 2224 to generate a new prepopulated EBP. The process is then continued, proceeding with step 2246.

However, if it was determined in step 2222 not to use a universal prepopulated EBP, then a determination is made in step 2226 whether to use a segmented prepopulated EBP to generate a new prepopulated EBP. If so, the request, along with the retrieved entity and EBP data, is then processed in step 2228 to determine relevant segments of one or more segmented prepopulated EBPs. The request, the retrieved entity and EBP data, and the identified relevant EBP segments are then processed in step 2232 to generate a new prepopulated EBP. The process is then continued, proceeding with step 2246.

However, if it was determined in step 2226 not to use a segmented prepopulated EBP, then a determination is made in step 2234 whether to use an entity-pertinent prepopulated EBP to generate a new prepopulated EBP. If so, the request, along with the retrieved entity and EBP data, is processed in step 2236 to identify one or more entity-pertinent prepopulated EBPs. The request, along with the retrieved entity and EBP data, and the one or more identified entity-pertinent prepopulated EBPs are processed in step 2238 to generate a new EBP for the target entity. The process is then continued, proceeding with step 2246.

However, if it was determined in step 2234 not to use an entity-pertinent prepopulated EBP, then a determination is made in step 2240 whether to use an entity-specific prepopulated EBP to generate a new prepopulated EBP. If so, the request, along with the retrieved entity and EBP data, is processed in step 2244 to identify one or more entity-specific prepopulated EBPs. The request, along with the retrieved entity and EBP data, and the one or more identified entity-specific EBPs are processed in step 2244 to generate a new prepopulated EBP. The process is then continued, proceeding with step 2246.

Figure 23:
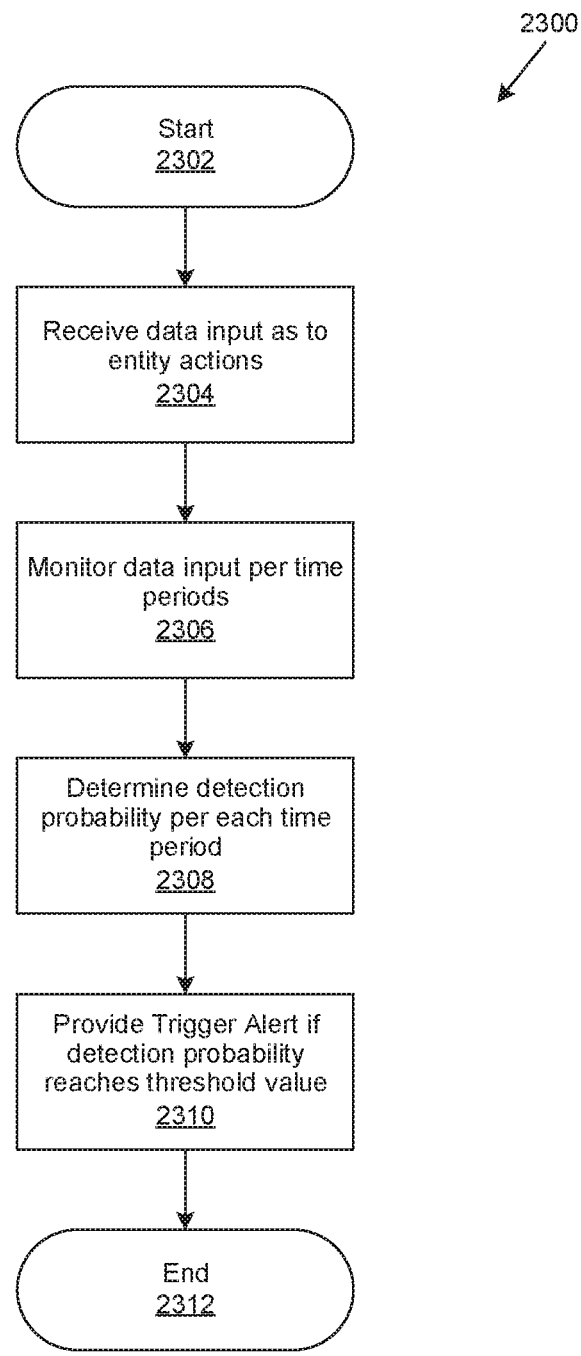
FIG. 23 is a generalized flowchart for detecting entity behavior and triggering indicator of behaviors.

FIG. 23 is generalized process flow 2300 for detecting entity behavior and triggering indicator of behaviors. The order in which the process flow is described is not intended to be construed as a limitation, and any number of the described blocks can be combined in any order to implement the process flow. Additionally, individual blocks may be deleted from the process flow without departing from the spirit and scope of the subject matter described herein. Furthermore, the process flow may be implemented in any suitable hardware, software, firmware, or a combination thereof, without departing from the scope of the invention.

At step 2302, the process 2300 starts. At step 2304, data is received from various sources as to entity actions. The various sources can include network access, social networks, websites, cloud access, etc. At step 2306, the data input is monitored over particular time periods. Entity actions are monitored at particular time periods. At step 2308, based on the monitored data input/entity actions, a detection probability is determined at the time periods. The detection probability can be increase as time progresses. At step 2310, a trigger indicator of behavior is provided if the detection probability reaches a threshold value. The trigger indicator of behavior can be sent to a endpoint device.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for detecting entity behavior, comprising:
   receiving structured or unstructured raw data input by a primary analysis engine of a progressive trigger framework system, from various sources related to actions of an entity, wherein the progressive trigger framework system is implemented to perform detecting entity behavior and triggering indicator of behaviors, wherein the raw data input has been cleaned, transformed and normalized into a Common Information Model (CIM) that includes a user name, wherein the CIM is included in a four layer computational data model incorporating raw data, summary data, observables, and detections;
   monitoring over time by the progressive trigger framework system, the raw data input and associating the actions of the entity to particular time periods, wherein the actions are determined to be normal or malicious activities;
   attaching contextual information to entity behavior when requests are performed as to entity behavior, wherein entity behavior is unpacked from contextual information when the request is received;
   determining by the progressive trigger framework system, a detection probability per each time period as to a triggering an indicator of behavior regarding a malicious activity requiring a response, wherein the detection probability increases over time;
   providing by the progressive trigger framework system, a trigger indicator of behavior if the detection probability reaches a threshold value; and
   triaging detections of malicious activities based on the detection probability.

2. The method of claim 1, wherein the receiving is agnostic as to the various sources.

3. The method of claim 1 further comprising performing one or more of: querying the raw data and writing observables, querying the raw data and writing summary data; querying summary data and writing observables; and querying observable, enrichment, and entity state to write detection.

4. The method of claim 1, wherein the monitoring further comprises determining entity behavior patterns.

5. The method of claim 1 further comprising determining entity behavior patterns based on phase stacking.

6. The method of claim 1, wherein the providing a trigger indicator of behavior comprises sending dynamic risk signals as to dynamic actions, dynamic data protection, and dynamic user protection.

7. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations and comprising instructions executable by the processor and configured for:
   receiving structured or unstructured raw data input by a primary analysis engine of a progressive trigger framework system, from various sources related to actions of an entity, wherein the progressive trigger framework system is implemented to perform detecting entity behavior and triggering indicator of behaviors, wherein the raw data input has been cleaned, transformed and normalized into a Common Information Model (CIM) that includes a user name, wherein the CIM is included in a four layer computational data model incorporating raw data, summary data, observables, and detections;
   monitoring over time by the progressive trigger framework system, the raw data input and associating the actions of the entity to particular time periods, wherein the actions are determined to be normal or malicious activities;
   attaching contextual information to entity behavior when requests are performed as to entity behavior, wherein entity behavior is unpacked from contextual information when the request is received;
   determining by the progressive trigger framework system, a detection probability per each time period as to a triggering an indicator of behavior regarding a malicious activity requiring a response, wherein the detection probability increases over time;
   providing by the progressive trigger framework system, a trigger indicator of behavior if the detection probability reaches a threshold value; and
   triaging detections of malicious activities based on the detection probability.

8. The system of claim 7, wherein the receiving is agnostic as to the various sources.

9. The system of claim 7, further comprising performing one or more of: querying the raw data and writing observables, querying the raw data and writing summary data; querying summary data and writing observables; and querying observable, enrichment, and entity state to write detection.

10. The system of claim 7, wherein the monitoring further comprises determining entity behavior patterns.

11. The system of claim 7 further comprising determining entity behavior patterns based on phase stacking.

12. The system of claim 11, wherein the providing a trigger indicator of behavior comprises sending dynamic risk signals as to dynamic actions, dynamic data protection, and dynamic user protection.

13. A non-transitory, computer-readable storage medium embodying computer program code, the computer program code comprising computer executable instructions configured for:
   receiving structured or unstructured raw data input by a primary analysis engine of a progressive trigger framework system, from various sources related to actions of an entity, wherein the progressive trigger framework system is implemented to perform detecting entity behavior and triggering indicator of behaviors, wherein the raw data input has been cleaned, transformed and normalized into a Common Information Model (CIM) that includes a user name, wherein the CIM is included in a four layer computational data model incorporating raw data, summary data, observables, and detections;
   monitoring over time by the progressive trigger framework system, the raw data input and associating the actions of the entity to particular time periods, wherein the actions are determined to be normal or malicious activities;
   attaching contextual information to entity behavior when requests are performed as to entity behavior, wherein entity behavior is unpacked from contextual information when the request is received;
   determining by the progressive trigger framework system, a detection probability per each time period as to a triggering an indicator of behavior regarding a malicious activity requiring a response, wherein the detection probability increases over time;
   providing by the progressive trigger framework system, a trigger indicator of behavior if the detection probability reaches a threshold value; and
   triaging detections of malicious activities based on the detection probability.

14. The non-transitory, computer-readable storage medium of claim 13, wherein the receiving is agnostic as to the various sources.

15. The non-transitory, computer-readable storage medium of claim 13 further comprising performing one or more of: querying the raw data and writing observables, querying the raw data and writing summary data; querying summary data and writing observables; and querying observable, enrichment, and entity state to write detection.

16. The non-transitory, computer-readable storage medium of claim 13, wherein the monitoring further comprises determining entity behavior patterns.

17. The non-transitory, computer-readable storage medium of claim 13 further comprising determining entity behavior patterns based on phase stacking.

18. The non-transitory, computer-readable storage medium of claim 13, wherein the providing a trigger indicator of behavior comprises sending dynamic risk signals as to dynamic actions, dynamic data protection, and dynamic user protection.

19. The non-transitory, computer-readable storage medium of claim 13, wherein: the computer executable instructions are deployable to a client system from a server system at a remote location.

20. The non-transitory, computer-readable storage medium of claim 13, wherein: the computer executable instructions are provided by a service provider to a user on an on-demand basis.

* * * * *